(12) United States Patent
Reznik

(10) Patent No.: US 11,841,912 B2
(45) Date of Patent: *Dec. 12, 2023

(54) SYSTEM FOR APPLYING NATURAL LANGUAGE PROCESSING AND INPUTS OF A GROUP OF USERS TO INFER COMMONLY DESIRED SEARCH RESULTS

(71) Applicant: Alan Mark Reznik, Milford, CT (US)

(72) Inventor: Alan Mark Reznik, Milford, CT (US)

(73) Assignee: TWITTLE SEARCH LIMITED LIABILITY COMPANY, Milford, CT (US)

(*) Notice: Subject to any disclaimer, the term of this patent is extended or adjusted under 35 U.S.C. 154(b) by 245 days.

This patent is subject to a terminal disclaimer.

(21) Appl. No.: 16/776,439

(22) Filed: Jan. 29, 2020

(65) Prior Publication Data

US 2021/0026906 A1  Jan. 28, 2021

Related U.S. Application Data

(63) Continuation-in-part of application No. 14/719,315, filed on May 21, 2015, now Pat. No. 10,572,556, (Continued)

(51) Int. Cl.
*G06F 16/9535* (2019.01)
*G06F 16/951* (2019.01)
(Continued)

(52) U.S. Cl.
CPC ........ *G06F 16/9535* (2019.01); *G06F 16/248* (2019.01); *G06F 16/24578* (2019.01); *G06F 16/951* (2019.01)

(58) Field of Classification Search
CPC ........... G06F 16/9535; G06F 16/24578; G06F 16/248; G06F 16/951
See application file for complete search history.

(56) References Cited

U.S. PATENT DOCUMENTS

| 4,504,907 A | 3/1985 | Manning et al. |
| 5,247,627 A | 9/1993 | Murakami et al. |

(Continued)

FOREIGN PATENT DOCUMENTS

WO    WO0077689    12/2000

OTHER PUBLICATIONS

Franciso Tanudjaja, and Lik Mui: "Persona: A Contextualized and Personalized Web Search", Laboratory of Computer Science at MIT, Cambridge, MA 02139; dated Jun. 1, 2001; Annual Hawaii International Conference on System Sciences (HICSS'02)—vol. 3, 2002; 34 pp.

(Continued)

*Primary Examiner* — Miranda Le
(74) *Attorney, Agent, or Firm* — RowanTree Law Group, PLLC; Magdalena M. Fincham

(57) ABSTRACT

In accordance with some embodiments, processes and interfaces provide for refining a list of search results output by a search tool. In accordance with some embodiments, Natural Language Processing models are utilized to process an initial list of search results and the system is operable to identify additional search results that may be considered unwanted by the user based on input from the user for a sub-set of the search results and a word feature characteristic that the search results reviewed by the user have in common with search results not yet reviewed by the user. In one embodiment, a group search feature provides for facilitating a search involving a plurality of users that resorts a list of search results based on inputs from the plurality of users.

21 Claims, 32 Drawing Sheets

Related U.S. Application Data which is a continuation of application No. 13/326,593, filed on Dec. 15, 2011, now abandoned.

(60) Provisional application No. 61/481,236, filed on May 1, 2011, provisional application No. 62/877,533, filed on Jul. 23, 2019, provisional application No. 62/798,462, filed on Jan. 29, 2019.

(51) Int. Cl.
*G06F 16/2457* (2019.01)
*G06F 16/248* (2019.01)

(56) References Cited

U.S. PATENT DOCUMENTS

| | | |
|---|---|---|
| 5,454,105 A | 9/1995 | Hatakeyama et al. |
| 5,894,462 A | 4/1999 | Hwangbo |
| 5,982,369 A | 11/1999 | Sciammarella et al. |
| 5,991,721 A | 11/1999 | Asano et al. |
| 5,999,653 A | 12/1999 | Rucklidge et al. |
| 6,055,535 A | 4/2000 | Suzuoka et al. |
| 6,092,035 A | 7/2000 | Kurachi et al. |
| 6,163,782 A | 12/2000 | Singhal |
| 6,167,090 A | 12/2000 | Iizuka |
| 6,229,840 B1 | 5/2001 | Ichihara |
| 6,247,010 B1 | 6/2001 | Doi et al. |
| 6,259,398 B1 | 7/2001 | Riley |
| 6,321,228 B1 | 11/2001 | Crandall et al. |
| 6,335,950 B1 | 1/2002 | Kohn |
| 6,366,907 B1 | 4/2002 | Fanning et al. |
| 6,415,281 B1 | 7/2002 | Anderson |
| 6,442,540 B2 | 8/2002 | Sako et al. |
| 6,449,256 B1 | 9/2002 | Varghese et al. |
| 6,519,648 B1 | 2/2003 | Eyal |
| 6,526,440 B1 | 2/2003 | Bharat |
| 6,546,388 B1 | 4/2003 | Edlund et al. |
| 6,601,061 B1 | 7/2003 | Holt et al. |
| 6,643,641 B1 | 11/2003 | Snyder |
| 6,947,924 B2 | 9/2005 | Bates et al. |
| 7,031,961 B2 | 4/2006 | Pitkow et al. |
| 7,072,888 B1 | 7/2006 | Perkins |
| 7,120,615 B2 | 10/2006 | Sullivan et al. |
| 7,190,121 B2 | 3/2007 | Rose et al. |
| 7,200,226 B2 | 4/2007 | Bace |
| 7,243,102 B1 | 7/2007 | Naam et al. |
| 7,373,351 B2 | 5/2008 | Wu et al. |
| 7,389,265 B2 | 6/2008 | Lawrence et al. |
| 7,461,061 B2 | 12/2008 | Aravamudan et al. |
| 7,502,783 B2 | 3/2009 | Palmon et al. |
| 7,519,587 B2 | 4/2009 | Lawrence et al. |
| 7,539,673 B2 | 5/2009 | Trowbridge |
| 7,565,630 B1 | 7/2009 | Kamvar et al. |
| 7,574,426 B1 | 8/2009 | Ortega |
| 7,584,185 B2 | 9/2009 | Jatowt et al. |
| 7,596,558 B2 | 9/2009 | Brewer et al. |
| 7,599,918 B2 | 10/2009 | Shen et al. |
| 7,617,193 B2 | 11/2009 | Bitan et al. |
| 7,634,472 B2 | 12/2009 | Thrall |
| 7,669,179 B2 | 2/2010 | Gupta et al. |
| 7,716,223 B2 | 5/2010 | Haveliwala et al. |
| 7,739,274 B2 | 6/2010 | Curtis et al. |
| 7,756,887 B1 | 7/2010 | Haveliwala |
| 7,801,885 B1 | 9/2010 | Verma |
| 7,818,315 B2 | 10/2010 | Cucerzan et al. |
| 7,819,898 B2 | 10/2010 | Stone et al. |
| 7,827,125 B1 | 11/2010 | Rennison |
| 7,831,609 B1 | 11/2010 | Alexander |
| 7,856,434 B2 | 12/2010 | Guzman et al. |
| 7,875,064 B2 | 1/2011 | Donnelly et al. |
| 7,962,461 B2 | 6/2011 | Ruhl et al. |
| 7,962,477 B2 | 6/2011 | Hu et al. |
| 7,979,414 B2 | 7/2011 | George et al. |
| 8,041,715 B2 | 10/2011 | Gnanamani et al. |
| 8,051,128 B2 | 11/2011 | Seshasai |
| 8,060,463 B1 | 11/2011 | Spiegel |
| 8,060,513 B2 | 11/2011 | Basco et al. |
| 8,082,511 B2 | 12/2011 | Sobotka et al. |
| 8,095,582 B2 | 1/2012 | Cramer |
| 8,095,891 B2 | 1/2012 | Sugiyama et al. |
| 8,117,197 B1 * | 2/2012 | Cramer ................ G06F 16/248 707/731 |
| 8,117,198 B2 | 2/2012 | Herlocker et al. |
| 8,140,518 B2 * | 3/2012 | Dasdan ................ G06F 16/951 707/719 |
| 8,150,843 B2 | 4/2012 | Chitiveli et al. |
| 8,185,523 B2 * | 5/2012 | Lu ....................... G06F 16/9535 707/723 |
| 8,244,721 B2 * | 8/2012 | Morris ................ G06F 16/9032 707/723 |
| 8,326,829 B2 | 12/2012 | Gupta |
| 8,332,430 B2 | 12/2012 | Koide et al. |
| 8,341,146 B1 | 12/2012 | Bleckner et al. |
| 8,566,327 B2 | 10/2013 | Carrico et al. |
| 8,577,893 B1 * | 11/2013 | Patterson ............ G06F 16/3344 707/748 |
| 8,620,915 B1 | 12/2013 | Brukman et al. |
| 8,661,029 B1 * | 2/2014 | Kim .................... G06F 16/9535 707/723 |
| 8,719,251 B1 * | 5/2014 | English ................ G06F 16/954 707/713 |
| 8,775,437 B2 | 7/2014 | Weitz et al. |
| 8,825,636 B2 | 9/2014 | Mach |
| 8,874,586 B1 * | 10/2014 | Sommers ............ G06F 16/9535 707/758 |
| 8,874,591 B2 * | 10/2014 | Dai .................... G06F 16/24578 707/751 |
| 8,886,637 B2 | 11/2014 | Bennett |
| 8,938,463 B1 * | 1/2015 | Kim .................... G06F 16/9535 707/751 |
| 8,954,420 B1 | 2/2015 | Khan et al. |
| 8,965,875 B1 | 2/2015 | Popovici |
| 9,069,843 B2 * | 6/2015 | Chitiveli ............ G06F 16/3326 |
| 9,158,856 B2 | 10/2015 | LeBaron |
| 9,195,739 B2 * | 11/2015 | Imig .................... H04L 12/1818 |
| 9,223,868 B2 | 12/2015 | Battle et al. |
| 9,519,716 B2 * | 12/2016 | Athsani ............ G06Q 30/0256 |
| 2002/0069190 A1 | 6/2002 | Geiselhart |
| 2002/0094083 A1 | 7/2002 | Bhattacharya et al. |
| 2003/0009295 A1 | 1/2003 | Markowitz et al. |
| 2004/0103122 A1 | 5/2004 | Irving et al. |
| 2005/0125390 A1 | 6/2005 | Hurst-Hiller et al. |
| 2005/0222989 A1 | 10/2005 | Haveliwawa et al. |
| 2005/0240580 A1 | 10/2005 | Zamir et al. |
| 2006/0020593 A1 | 1/2006 | Ramsaier et al. |
| 2006/0047643 A1 | 3/2006 | Chaman |
| 2006/0253428 A1 | 11/2006 | Katariya et al. |
| 2007/0016583 A1 | 1/2007 | Lempel et al. |
| 2007/0162547 A1 | 7/2007 | Ross |
| 2007/0174319 A1 * | 7/2007 | Chou .................. G06F 16/3326 |
| 2007/0233621 A1 | 10/2007 | Oztekin et al. |
| 2007/0260601 A1 | 11/2007 | Thompson et al. |
| 2008/0016053 A1 | 1/2008 | Frieden et al. |
| 2008/0033915 A1 | 2/2008 | Chen et al. |
| 2008/0040674 A1 | 2/2008 | Gupta |
| 2008/0104045 A1 | 5/2008 | Cohen et al. |
| 2008/0168037 A1 | 7/2008 | Kapadia et al. |
| 2008/0215504 A1 | 9/2008 | Issen et al. |
| 2008/0243779 A1 | 10/2008 | Behnen et al. |
| 2009/0024612 A1 * | 1/2009 | Tang .................... G06F 16/951 |
| 2009/0070128 A1 | 3/2009 | McCauley et al. |
| 2009/0234834 A1 | 9/2009 | Cozzi |
| 2009/0248656 A1 | 10/2009 | Blinnikka |
| 2009/0282021 A1 | 11/2009 | Bennett |
| 2010/0131494 A1 | 5/2010 | Venolia |
| 2010/0185611 A1 | 7/2010 | Liao et al. |
| 2010/0191726 A1 | 7/2010 | Haveliwala |
| 2010/0306224 A1 | 12/2010 | Ciemiewicz et al. |
| 2010/0306249 A1 | 12/2010 | Hill et al. |
| 2011/0004588 A1 | 1/2011 | Leitersdorf et al. |
| 2011/0015996 A1 | 1/2011 | Kassoway et al. |
| 2011/0029622 A1 | 2/2011 | Walker et al. |
| 2011/0103699 A1 | 5/2011 | Ke et al. |

(56) References Cited

U.S. PATENT DOCUMENTS

| | | |
|---|---|---|
| 2011/0191327 A1* | 8/2011 | Lee .................... G06F 16/00 |
| | | 707/723 |
| 2011/0196875 A1 | 8/2011 | Vadlamani et al. |
| 2011/0196896 A1 | 8/2011 | Smetters et al. |
| 2011/0225139 A1 | 9/2011 | Wang et al. |
| 2011/0264754 A1 | 10/2011 | Gidugu |
| 2011/0289076 A1 | 11/2011 | Boyle et al. |
| 2012/0084283 A1* | 4/2012 | Chiliveli ............. G06F 16/3326 |
| | | 707/E17.014 |
| 2012/0158685 A1 | 6/2012 | White et al. |
| 2012/0254076 A1 | 10/2012 | Yang et al. |
| 2012/0278316 A1 | 11/2012 | Reznik |
| 2012/0278318 A1 | 11/2012 | Reznik |
| 2013/0132886 A1 | 5/2013 | Mangini et al. |
| 2015/0294014 A1 | 10/2015 | Reznik |

OTHER PUBLICATIONS

Aditya Pal, and Jaya Kawale; "Leveraging Query Associations in Federated Search", Workshop on Aggregates Search, ACM (International Conference on Research and Development in Information Retrieval; (SIGIR), 2008; 9 pp.

Schenkel, Ralf and Theobald,Martin; "Structural Feedback for Keyword-Based XML Retrieval", Max-Planck-Institut fur Informatik, Saarbrucken, Germany; Lecture Notes in Computer Science, 2006, vol. 3936/2006; 326-337; 12 pp.

Banks, Sarah; "How the Internet Killed Creativity", The Weekly Pennsylvanian, Apr. 3, 2011; 1 pg.

Office Action for U.S. Appl. No. 13/326,461 dated Feb. 27, 2012; 26 pps.

Notice of Allowance for U.S. Appl. No. 13/326,461 dated Aug. 15, 2012; 15 pps.

Office Action for U.S. Appl. No. 13/326,593 dated Nov. 6, 2012; 16 pps.

Final Office Action for U.S. Appl. No. 13/326,593 dated May 17, 2013; 18 pps.

Office Action for U.S. Appl. No. 13/326,593 dated Jul. 9, 2014; 24 pps.

Final Office Action for U.S. Appl. No. 13/326,593 dated Jan. 21, 2015; 26 pps.

S. Chung and D. McLeod, "Dynamic pattern matching: an incremental data clustering approach," Journal of Data Semantics, pp. 85-112, 2005.

S. Chung, J. Jun, D. McLeod, "A Web-Based Novel Term Similarity Famework for Ontology Learning," OTM 2006, pp. 1092-1109, Springer-Verlag.

Egele, Manuel et al., Removing web spam links from search engine results,: Springer-Verlag, 2009, pp. 1-12.

Office Action for U.S. Appl. No. 14/719,315 dated Aug. 28, 2017; 19 pps.

Final Office Action for U.S. Appl. No. 14/719,315 dated Jan. 30, 2018; 17 pps.

Office Action for U.S. Appl. No. 14/719,315 dated Aug. 16, 2018; 24 pps.

Final Office Action for U.S. Appl. No. 14/719,315 dated Feb. 21, 2019; 14 pps.

Notice of Allowance for U.S. Appl. No. 14/719,315 dated Oct. 18, 2019; 16 pps.

\* cited by examiner

FIG. 3B president clinton first year in white house — Search https://www.searchtool.com ☆ Favorites president clinton first year in white...

Web  Images  Videos  Maps  News  Shopping  More ▼

President Clinton first year in the white house

| Search | About 1,460,000 results (0.21 seconds) |
|---|---|
| Everything | 1. *Bill Clinton - Wikipedia, the free encyclopedia* The Clinton administration launched the first official *White House* website ... That same year Hillary Clinton shepherded through Congress the Adoption and ... However, *Clinton* was the *first President* to pardon a death-row inmate since ... |
| Images | en.wikipedia.org/wiki/Bill_Clinton - Cached - Similar |
| Videos | 2. *Presidency of Bill Clinton - Wikipedia, the free encyclopedia*Jump to *First Term (1993–1997)*: *President Clinton* issued Executive Order 13011 - Federal ... en.wikipedia.org/wiki/Presidency_of_Bill_Clinton - Cached - SimilarShow more results from wikipedia.org |
| Maps | 3. *William J. Clinton | The White House**President Clinton* was born William Jefferson Blythe III on August 19, 1946, ... For the first time in 12 years both the *White House* and Congress were held ... |
| News | www.whitehouse.gov/about/presidents/williamjclinton - Cached - Similar |
| Shopping | 4. *Remarks by President Obama and Former President Clinton | The ...*Dec 10, 2010 ... The *White House*. Office of the Press Secretary ... |
| More... | www.whitehouse.gov/.../remarks-president-obama-and-former-president-clinton - Cached Show more results from whitehouse.gov |
| Hartford, CT | |
| Change Location | 5. *President Clinton* Later that same year, she married an automobile salesman named Roger *Clinton*. ... Girls Nation were invited to the *White House* to meet *President* Kennedy. Bill *Clinton* was one of the first in line to shake *President* Kennedy's hand in |
| Show Search Tools | the ... Governor *Clinton* lost the race for a second term to Republican Frank White. ... clinton4.nara.gov/WH/EOP/OP/html/Hope.html - Cached - Similar |

FIG. 3D

President Clinton first year in the white house with some subtraction

About 2,270,000 results (0.21 seconds)

1. *President Clinton*
Later that same year, she married an automobile salesman named Roger Clinton. ... Girls Nation were invited to the White House to meet President Kennedy. Bill Clinton was one of the first in line to shake President Kennedy's hand in the ... Governor Clinton lost the race for a second term to Republican Frank White. ...
clinton4.nara.gov/WH/EOP/OP/html/Hope.html - Cached - Similar 2. *Bill Clinton News - The New York Times*
There he shook hands with President John F. Kennedy in the White House Rose Garden ... in foreign policy. Mr. Clinton's first year was symbolized by searing ...
topics.nytimes.com › Times Topics › People › C - Cached - Similar 3. *The Book - White House Doctor*
Mariano served nine years as White House doctor, first for the final year of ... She talks about the time she raced to get President Clinton and his family ...
www.whitehousedoctor.com/the-book.html - Cached - Similar 4. *Clinton - Reagan, Bush, Clinton, Kennedy & Other Presidential ...*
Oct 3, 2010 ... This was the pen that President Clinton used during his first year in The White House. It is an Alexander pen with a black barrel and a gold ...
hailtothechiefs.com/itemsBC.htm - Cached 5. *Bill Clinton Biography - Forty-second President of the United States*
Bill Clinton's Career Before the Presidency in 1974, Clinton was a first year law professor and ran for the House of Representatives.
americanhistory.about.com › ... › William J Clinton - Cached - Similar

FIG. 3E

SYSTEM FOR APPLYING NATURAL LANGUAGE PROCESSING AND INPUTS OF A GROUP OF USERS TO INFER COMMONLY DESIRED SEARCH RESULTS

The present Application claims the benefit of, and priority to, the following Provisional Applications: (i) U.S. Provisional Application No. 62/798,462 filed on Jan. 29, 2019 in the name of Alan M. Reznik and entitled SYSTEM FOR APPLYING NLP AND INPUTS OF A GROUP OF USERS TO INFER COMMONLY DESIRED SEARCH RESULTS; and (ii) U.S. Provisional Application No. 62/877,533 filed on Jul. 23, 2019 in the name of Alan M. Reznik and entitled SYSTEM FOR APPLYING NLP AND USER INPUT FOR SOME SEARCH RESULTS TO INFER ADDITIONAL UNWANTED SEARCH RESULTS. Each of the foregoing applications is incorporated by reference herein for all purposes.

The present Application is also a Continuation-in-Part of U.S. application Ser. No. 14/719,315 filed on May 21, 2015 in the name of Alan M. Reznik and entitled SYSTEMS AND METHODS FOR FACILITATING ENHANCEMENTS TO SEARCH RESULTS BY REMOVING UNWANTED SEARCH RESULTS, which Application is a Continuation Application of U.S. application Ser. No. 13/326,593, filed on Dec. 15, 2011 in the name of Alan Reznik and entitled SYSTEMS AND METHODS FOR FACILITATING ENHANCEMENTS TO ELECTRONIC GROUP SEARCHES, which application claims the benefit of U.S. Provisional Application Ser. No. 61/481,236, filed on May 1, 2011 in the name of Alan Reznik and entitled METHODS AND SYSTEMS FOR SEARCH ENGINE ENHANCEMENTS. The entirety of each of these Applications is incorporated by reference herein for all purposes.

The present Application is also related to U.S. Non-Provisional application Ser. No. 13/326,461, filed on Dec. 15, 2011 in the name of Alan M. Reznik and entitled SYSTEMS AND METHODS FOR FACILITATING ENHANCEMENTS TO SEARCH ENGINE RESULTS. The entirety of this application is incorporated by reference herein for all purposes.

BRIEF DESCRIPTION OF THE FIGURES

FIG. 3B is a diagram of one interface via which a user may be provided with search results utilizing a second search engine after inputting the same search term utilized in FIG. 3A, in accordance with the prior art.

FIG. 3D is a diagram of one interface via which a user may be provided search results utilizing the first search engine of FIG. 3A but after inputting a different search term, in accordance with the prior art.

FIG. 3E is a diagram of one interface via which a user may be provided with search results utilizing the search engine of FIGS. 3A and 3D, the search utilizing a method available in the prior art to refine the search for the term utilized in FIG. 3D.

DETAILED DESCRIPTION OF VARIOUS EMBODIMENTS

Figure 1:
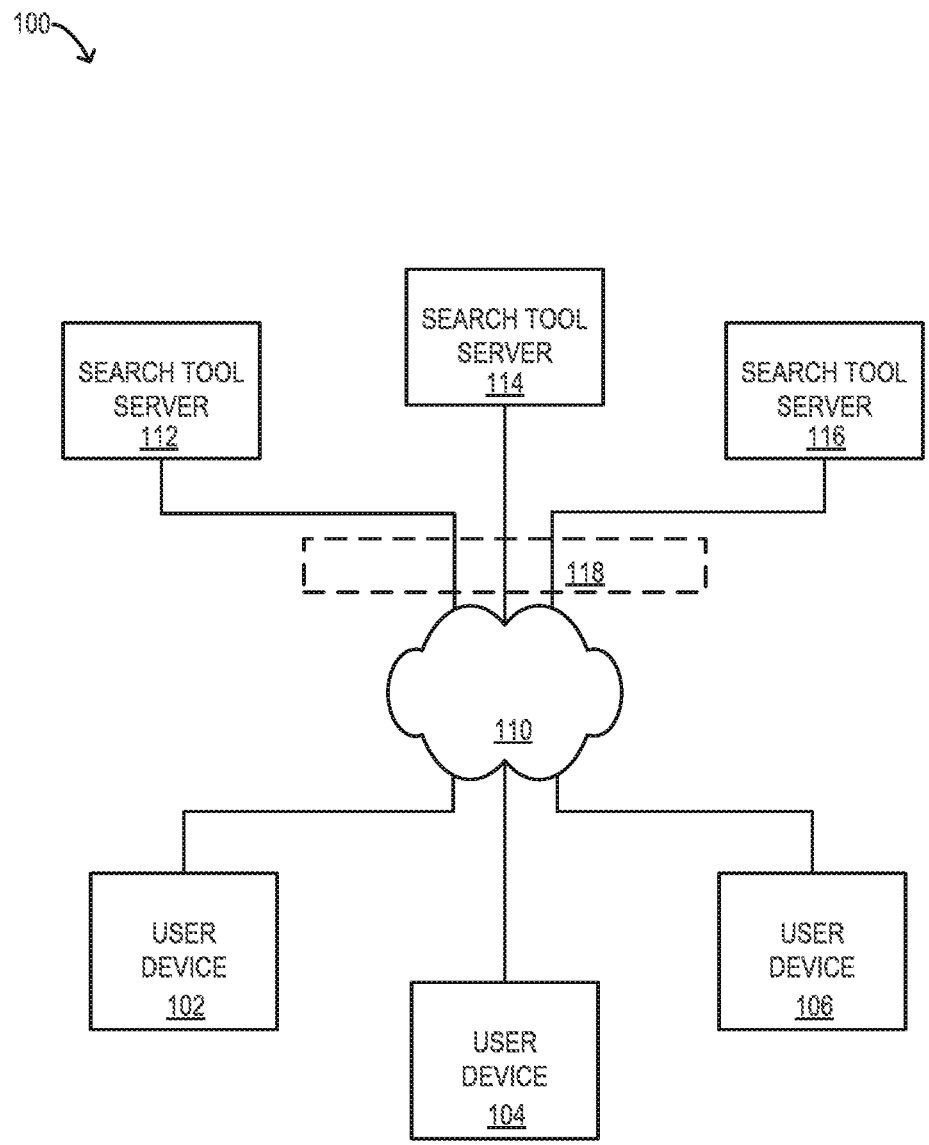
FIG. 1 is a schematic diagram of one embodiment of a system operable to facilitate some methods described herein.

Certain aspects, advantages, and novel features of the various invention embodiments are described herein. It is to be understood that not necessarily all such advantages may be achieved in accordance with any particular embodiment. Thus, for example, those skilled in the art will recognize that the invention(s) described herein may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention(s) described herein extends beyond the specifically disclosed embodiments, examples and illustrations and includes other uses and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Embodiments described herein are directed to methods, systems and interfaces for providing one or more enhancements to a search engine, search algorithm, search result output interface or other search tool that may enhance functionality of a search engine, search algorithm or search result output interface (all of the foregoing referred to collectively as a "search tool" herein), such that results output by the search tool may be processed, modified, refined and/or filtered based on an input from a user, such as an input indicating which of the results are unwanted or undesired by the user. It should be understood that a search tool may, in some embodiments, comprise functionality integrated with other functionalities of a search engine that performs a search the search results of which are processed, modified, refined and/or filtered by the search tool. In other embodiments, the search tool may comprise software external to such a search engine (e.g., the search tool may comprise an additional interface or layer of functionality that receives or obtains search results determined by a search engine and provides enhanced functionality and/or interfaces via which the user may realize additional benefits or extract additional value from the search).

In some embodiments an input from a user that is utilized by a search tool as described herein may be an affirmative input (e.g., user selects or actuates a virtual mechanism on a user interface to indicate that a particular search result is undesirable or unwanted such that it should not be included in the search results or does not adequately reflect what the user is looking for from the search). In other embodiments, such an input from a user may be passive (e.g., software is programmed to infer that a particular search result or search results having particular characteristics are not wanted or not desirable based on which search results the user is selecting or clicking on as compared to which search results the user is not selecting or clicking on). Such methods, systems and interfaces further provide for, in accordance with at least one embodiment, allowing a user to more efficiently identify wanted but unknown information which may be buried in a deluge of search results. For example, a search engine may perform a search of available information based on one or more search terms input by a user and present an initial list of search results to a user via an interface. This interface may allow the user to "check off" or otherwise indicate which one or more of the results which have insufficient current value to the user. The search tool may then (i) rerun (or cause another application to rerun) the search based on that "negative feedback" to identify a modified list of results, which presumably will not include the one or more results indicated by the user as unwanted or undesired (and/or other similar results); and/or (ii) modify the initial list of search results by removing (removing including a re-sorting or re-organizing of a list of search results such that unwanted or undesired search results are moved lower on the list or associated with a lower ranking) not only the result(s) indicated by the user as unwanted or undesired but also other similar results. In either case, the goal is to shorten the list of results the user needs to consider or review or to bring to the top of the list the results the user is more likely to be interested in. In scenario (ii), the other similar results may be identified based on a characteristic they share with the particular result the identified by the user as being unwanted or undesirable.

In another example, a user requesting a search (e.g., by inputting one or more search terms) may further indicate (e.g., prior to launching or initiating the search) one or more rules or criteria defining unwanted or undesired search results. For example, the user may indicate that he/she considers the top 5 most popular results to be undesirable. Such an indication of one or more rules or criteria may be utilized by a search tool, in one embodiment, as a filter for any search results found based on one or more search terms input by the user, the filter for filtering out which search results are not to be output to the user. For example, in one such an embodiment, a search tool (e.g., software operable to perform some of the methods described herein) may remove any search results that satisfy the rule or criteria identified by the user. In some embodiments, the removal may be done prior to outputting to the user the search results, such that the user is not shown the removed search results as part of listing of search results (e.g., unless the user selects an option to view such removed search results, as may be available in some embodiments) or such that the user is shown the list after it has been re-sorted or re-ranked (in embodiments in which removing comprises re-sorting or re-ranking) based on the user's input of the one or more rules or criteria.

In yet another example, the search tool may learn or determine which search results, types of search results or characteristic(s) of search results are unwanted or undesirable by the user based on interactions of the user with the initial list of search results. For example, the software may be programmed to (i) track or monitor which search results the user is selecting, viewing or clicking on vs. which search results the user is passing over or not selecting, viewing or clicking on, (ii) identify one or more common characteristic(s) shared by the unwanted or undesirable search results, thereby identifying one or more unwanted or undesirable characteristic(s); and perform at least one of (iii) identifying a manner in which the search may be re-run such that the unwanted or undesirable search results (or search results that comprise the unwanted or undesirable characteristic) are not included in a list of search results or are presented lower on such a list or (iv) re-sorting, re-ordering or modifying the initial list of search results such that unwanted search results are either moved lower in the list or no longer shown on the list. As example implementations of (iii), the software may be operable to (a) identify one or more search terms that should be included in a new search (or search terms that should be excluded), or (b) generate search instructions defining one or more types of search results or a characteristic of search results that should be excluded from the re-run search, either of the foregoing being options for configuring the search engine such that the unwanted or undesirable search results do not show up in the search results resulting from the re-run search or such that search results comprising the unwanted or undesirable search results are not included in the search results resulting from the re-run search.

In one embodiment the software may automatically re-run the search using the one or more search terms that should be included or excluded from the search while in another embodiment the software may suggest to the user the new search terms identified via step (iii). For example, in one embodiments, after learning or inferring the types of search results a user is interested in based on the search results the user is clicking on or selecting vs. the types of search results the user is passing over without clicking on them or selecting them, the software may output one or more suggested search terms or a suggested search string that may be helpful to the user such that a search run using the suggested search terms or the suggested search string is likely to return a list of search results that do not include undesirable search results, include fewer undesirable search results or include undesirable search results ranked or placed lower in the list of search results.

In accordance with some embodiments, a search string may comprise search criteria or search parameters for searching a data set. In some embodiments, a search string may comprise a category of data (e.g., the category being one of a plurality of categories available for selection by the user. In other embodiments, a search string may comprise a combination of characters and words that direct a search engine or search algorithm to conduct a search. In some embodiments, a search string may comprise a Boolean search string, which combines words or terms with operators (or modifiers) such as AND, NOT and OR to further produce more relevant results. For example, a Boolean search could be "restaurant" AND "San Francisco" AND "Italian", which would limit the search results to only those documents containing the three terms or words in the search string. In still other embodiments, a search string may comprise instructions provided by a user for how a processor is to generate a list of data (e.g., instructions for how an AI program is to generate a list of data).

It should be noted that an unwanted or undesired search result need not be a result that is not relevant or appropriate based on the search term(s) provided by the user for the initial search. In fact, it may be that a result that the user indicates as undesirable or unwanted may be a result ranked as highly relevant and/or popular by the search engine being used for the search. An unwanted or undesired search result is simply a result that the user prefers not to have included in the list of search results for a particular search, for any reason. Applicant has recognized that the results of searches carried out by use of search engines, tools and algorithms available today comprise such a large set of results that in many circumstances it is unlikely that a user who requested the search will have the time, desire or ability to view each of the results in the set. Applicant has further recognized that this inability or unwillingness to view all of the search results may result in the user missing out on learning some important information that may be "buried" in the large amount of search results. Embodiments described herein provide for a strategy and interface to allow a user of a search tool or resource (e.g., the common search engine user) better access and control over search queries and the results. Applicant has recognized that most users have an intuitive ability to better discern what is not wanted more quickly and decisively than what is wanted. In recognition of this human ability, at least some embodiments described herein comprise a process which provides one or more mechanisms for removing unwanted results efficiently as a method of obtaining a better result. Further, in at least some embodiments described herein a modified set of search results is obtained for a user who indicates which results of an initial set of search results are unwanted by not only removing the specifically selected results but further modifying the search to remove other similar results that are determined by the system to also be unwanted or likely to be unwanted based on the user input. Such embodiments may be contrasted with prior art search methodologies which rely on positive feedback ("more like this") from a user or which only allow a user to modify a search by removing a single search result at a time or by manually modifying the specific search terms used and rerunning the search. This is further contrasted from prior art that uses the aggregate of what other users found desirable when they have searched for a similar term or query to determine the information the current user values. This ubiquitous process further limits a given user from finding new or novel information in a given search when new and novel information or associations are desired by the user.

It should be noted that in some embodiments an identification of a particular search result may be received from a user to whom an initial list of search results is output in response to search terms provided, and a determination may be made by a processor (e.g., a processor running a search algorithm or search engine or a processor of another device that is operable to communicate with a search engine) of additional search results to be removed based on an identification of the particular search result. Such a determination of additional search results to be removed may be made, in accordance with some embodiments, based on a characteristic of the particular search result identified by the user. The characteristic may be derived or identified by the processor without input from the user as to the characteristic or, alternatively, the characteristic may be identified (e.g., selected from a menu of possible characteristics, typed in or otherwise specified) by the user.

In accordance with one embodiment, a method provides for (i) determining a first plurality of search results of a search performed by a search tool; (ii) receiving an input of a user associated with the first plurality of search results, the input indicating at least one result of the first plurality of search results to be removed from the first plurality of search results, thereby receiving an indication of at least one first undesired search result of the first plurality of search results; (iii) determining a remainder of the first plurality of search results to be the first plurality of search results less the first undesired search result; (iv) identifying a characteristic of the at least one first undesired search result; (v) analyzing the remainder of the first plurality of search results to determine whether any search results of the first plurality of search results correspond to the characteristic; (vi) determining at least one search result of the remainder of the first plurality of search results that corresponds to the characteristic to be a second undesired search result; (vii) removing the first undesired search result and the second undesired search result from the first plurality of search results, thereby determining a second plurality of search results; and (viii) causing the second plurality of search results to be output.

In some embodiments, a characteristic of an undesired search result may comprise determining a characteristic that two or more undesired search results have in common (e.g., a user may select two or more undesired search results and the software may be programmed to identify at least one characteristic these two or more undesired search results have in common). In one scenario, more than one common characteristic may be identified. In such a scenario, the software may, for example, (i) wait for the user to identify at least one additional undesired search result and attempt to whittle down or minimize the number of common characteristics among the new set of undesired search results (the search results the user previously identified as undesired plus the at least one additional search result the user identified as undesired), which process may be iterative such that as the user selects more and more search results as being undesired the software continues to iteratively identify any characteristics the undesired search results have in common in order to more precisely identify a relevant undesired characteristic; or (ii) present the user with the list of identified undesired characteristics and prompt the user to select which undesired characteristic(s) the user does not want a modified list of search results to include (in some embodiments this list of undesired common characteristics may be dynamically modified based on additional input or selections of undesired search results received from the user).

In some embodiments, a characteristic of an undesired search result may comprise determining a characteristic that two or more undesired search results have in common (e.g., a user may select two or more undesired search results and the software may be programmed to identify at least one characteristic these two or more undesired search results have in common). Furthermore the commonality of desired or undesired features in selected results can be used to increase or decrease the rating of user value of all the results and cause a reordering of the search results. This may occur in an interactive way. In one scenario, more than one common characteristic may be identified. In such a scenario, the software may, for example, (i) wait for the user to identify at least one additional undesired search result and combine that information with other prior feedback on results to create parameters to evaluate other results, which process may be iterative such that as the user selects more and more search results as being undesired or desired the software continues to iteratively identify any characteristics the undesired or implied desired search results have in common in order to more precisely identify a relevant undesired characteristic; or (ii) present the user with the list of identified undesired or inferred desired characteristics and prompt the user to select which undesired characteristic(s) the user does not want a modified list of search results to include (in some embodiments this list of undesired or inferred desired common characteristics may be dynamically modified based on additional input or selections of undesired search results received from the user). The software can thus be programmed to identify or anticipate characteristics of undesired results based on commonality of other selections and this ability can be enhanced using natural language processing methods such as Word to Vec and other algorithms that help enhance the processes ability to compare words with similar meanings. For example, if a user were to search the term "heavy metal" and then the characteristic or context of "heavy metal toxicity" is determined as undesirable, the software engine or app may be programmed to understand through NLP techniques that "heavy metal safety" would also be undesirable because of the word relationship between "toxicity" and "safety." The engine or app then may "infer," or at the least appear to understand, by pushing those result to a lower evaluation, or with or without one or more NLP algorithms a lack of commonality of "music" with the undesired results, that results containing "heavy metal music" should be in the more preferred in the search results.

In accordance with another embodiment, a method provides for (i) determining a first plurality of search results of a search performed by a search tool; (ii) receiving an input of a user associated with the first plurality of search results, the input indicating a preference for a maximum popularity ranking of a search result, in accordance with a ranking scheme in which a higher popularity ranking indicates a more popular search result than does a lower popularity ranking; (iii) analyzing the first plurality of search results to identify any search results corresponding to a popularity ranking higher than the maximum popularity ranking; (iv) removing from the first plurality of search results, any search results that correspond to a popularity ranking higher than the maximum popularity ranking, thereby determining a second plurality of search results; and (v) causing the second plurality of search results to be output.

In accordance with another embodiment, a method for facilitating a group research project to be managed in a manner that encourages more diverse search results than may otherwise be obtained using conventional search methods which allow all members of the group to simply search the Internet or another data source without restriction (as is explained in more detail below). Such a method provides for (i) registering a plurality of users as a search group for a search project; (ii) designating one user of the plurality of users as a manager for the search project, wherein the manager for the search project is authorized to set search rules for the search project which govern an output of search results to the remainder of users of the search group; (iii) receiving, by a processor of a computing device operable to modify a set of search results and from one of the plurality of users, an indication of at least one search result to be removed from a set of search results output to another user of the search group, thereby receiving an indication of at least one disallowed search result; (iv) determining, by the processor, a preliminary set of search results based on the search term, the preliminary set of search results comprises results of a search of information available on the internet; (v) determining, by the processor, whether the disallowed search result is included in the preliminary search results; (vi) if the disallowed search result is included in the preliminary search results, removing, by the processor, the disallowed search result from the preliminary search results, thereby determining a modified set of search results; and (vii) causing the modified set of search results to be output to at least the user from whom the search term was received.

In accordance with one embodiment for facilitating a group research project, a method provides for (i) registering a plurality of users as a search group for a search project; (ii) tracking sets of search results output to users of the search group for the search project; and (iii) outputting, to a user of the search group an indication of a plurality of search results included in any of the set of search results along with, for each such search result, at least one of (i) a number of times the search result has been included in a set of search results output to the users of the search group; (ii) a duration of time a single user of the search group has spent reviewing a content of the search result; (iii) a total duration of time all users of the search group who had the search result output to them in a set of search results reviewing the content of the search result; (iv) a number of time the search results has been selected by a user of the search group; and (v) present a mathematical assessment of the search result output or page use (e.g., an average or median time spent by one or more users on a given search result, a a number of repeat views of a given search result by one or more users or an average user).

It should be noted that any of the methods and processes described herein may be performed, in some embodiments, by one or more processors of one or more a computing devices operable to modify search results. For example, in some embodiments, one or more servers of a search engine provider may perform one or more processes described herein. In another embodiment, a server of an intermediary service which serves to facilitate searches requested by a user and performed by a search engine provider may perform one or more of the processes described herein. In yet another embodiment, a software application may be downloaded to a user's computing device (e.g., a mobile device) may be operable to perform one or more processes described herein. For example, a user may download an "app" for allowing the user to filter out or remove search results in accordance with one or more of the embodiments described herein.

Example Systems and Apparatus

Referring now to FIG. 1, illustrated therein is schematic diagram of an example system 100 which may be utilized to provide some of the processes described herein. The system 100 comprises a plurality of user devices 102, 104 and 106 and a plurality of search tool servers 112, 114 and 116. In accordance with some embodiments, the search tool servers 112, 114 and 116 may comprise search engine servers that are operable to perform at least some of the functionality described herein integrated into their search tool services. In some embodiments, however, a search engine server may not comprise some of the functionality described herein and such functionality may reside on a third party server that is operable to enhance a user's experience with the search results output by a search engine by allowing the user to re-sort or modify the search results in accordance with embodiments described herein, in which case the system 100 may further comprise a third party search tool server, such as third party server 118 (which may comprise a server which facilitates search requests from and/or output of search result to any or all of the user devices 102, 104 and 106). Any of the devices 102, 104, 106, 112, 114, 116 and 118 may in accordance with some embodiments be operable to communicate with at least one other device of system 100 via a network 110. The network 110 may comprise, for example, the Internet, a wide area network, another network or a combination of such networks. It should be understood that although not shown in FIG. 1, other networks and devices may be in communication with any of the devices of system 100. For example, a user device 102 may comprise a mobile device which may be in communication with a search tool server 112 via a mobile network (not shown) such as a pager or cellular telephone network that accommodates wireless communication with mobile devices as is generally known to those skilled in the art.

In accordance with some embodiments, a search tool server (whether it be a search tool server 112, 114 or 116 or a third party server 118) may comprise certain components for facilitating the functionality described herein. For example, such a server may comprise one or more databases storing data useful for analyzing search results (e.g., a database of "rare tokens" or "common words" as described below) and/or one or more software modules or engines for facilitating at least some of the functionality described herein. For example, a search tool server may comprise a "A Similarity Measuring Engine" which may comprise a software module or program for performing a process, such as a process of identifying how similar certain search results (e.g., search results for which an input has not been received from a user) to other search results (e.g., search results for which an input has been received from a user), such as described herein (e.g., with respect to process 1600 (FIG. 16) and/or process 1700 (FIG. 17)).

A search tool, as the term is used herein, may comprise a mechanism comprising software, hardware and/or firmware operable to electronically facilitate a search, such as by searching through a large quantity of available data (whether private or publicly available data) to identify or determine subset(s) of the data that may be relevant to one or more search terms or criteria provided by a user of the search tool and/or helping to refine search results output by a search algorithm.

One type of search tool contemplated herein is a search engine, which may comprise an algorithm designed to search through information available on the Internet and/or a private network. Many search engines are designed to index a large number of web pages or other formats of information and provide an interface via which a user may search the indexed information by, for example, inputting one or more terms and/or rules defining a particular search. A search engine may, for example, be operable to utilize a "crawler" mechanism which "crawls" the Internet to locate documents or other formats of information and store data about such documents or other information such that these may be located and/or searched at a later time (e.g., the search engine may store the URL, associated hyperlinks, meta-data, etc.). Many search engines utilize extraction and/or indexing mechanisms for extracting and/or indexing information about the documents, web pages or other formats of information accessible to them. Such indexing may be based on the contents of the documents, web pages or other information and the indexed form of the information may be stored in a database of the search engine. The search engine may comprise a search tool component which allows a user of the search engine to search through the indexed contents of the database.

A search engine may also be operable to output the results of any search of the database (the search having been conducted in accordance with the search terms and/or rules provided by the user), such as in accordance with a particular ranking scheme programmed into the search engine. For example, many search engines rank the most popular search results associated with a particular search term higher than less popular search results.

It should be noted that, in accordance with some embodiments, an algorithm or Artificial Intelligence (AI) method may comprise a search tool, the algorithm or AI method being used to search data and/or to generate data (i.e., a search tool may, in some embodiments, comprise a data generation tool). The algorithm or AI method may comprise a shallow AI or algorithmic method, a deep AI or algorithmic method, a neural network, a plurality of neural networks operating in concert, or a combination of neural networks and algorithms and/or deep and shallow AI.

In accordance with some embodiments, a search tool may comprise software that allows a user to search for information in a proprietary database, such as a database of content specific to a particular topic or category of information (e.g., a database of movies, music, restaurants, medical providers, etc.).

In accordance with some embodiments, a search tool may comprise a software application (e.g., a mobile device app or a software application residing on a user's desktop computer) that is independent from a search engine (e.g., independently developed, made available, functioning and/or managed) but which is operable (when downloaded on a user's device or otherwise accessible to the user device) to detect or monitor an output to a user of a search engine and enhance the results output by the search engine. In some embodiments such a search tool may be integrated with a search engine such that it receives data directly from a search engine or search engine provider to help refine search results output by the search engine while in other embodiments such a search tool may operate independently from a search engine provider and essentially scrape the data from an output of search results of the search engine without receiving data directly from the search engine.

Figure 17:
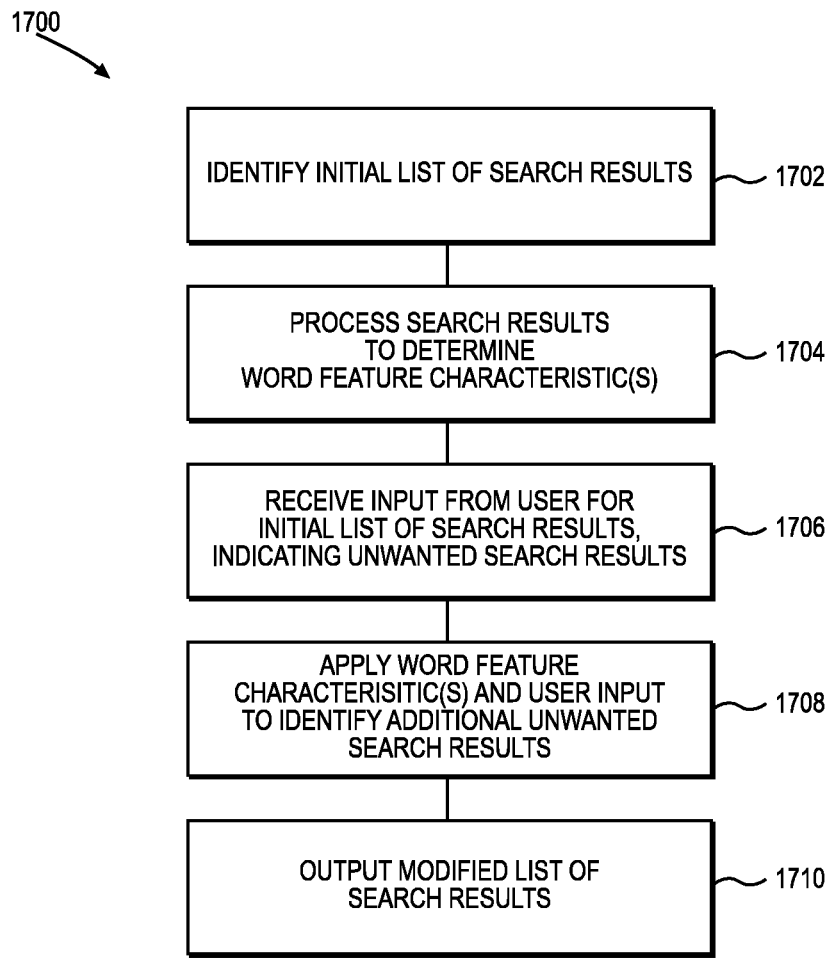
FIG. 17 is a flow diagram illustrating a process which may be performed in accordance with some embodiments described herein.

In accordance with some embodiments, a search tool may be operable to (i) identify the list of search results on one or more pages of search results output by a search engine on a user device in response to a search string input by a user (e.g., in a browser window of the user device; including any summary, context or excerpts for those search results as output with the list of search results), (ii) analyze or process the results (e.g., using a machine learning text-to-vector tool or model, such as "Bag of Words", "Word2Vec", "GloVe", "Word Mover's Distance", or "Word Clusters", as described in more detail with reference to process 1700 of FIG. 17); (iii) detect input (whether passive or active input) from the user responsive to the list of search results (e.g., the search tool may provide to the user an interface via which the user may indicate, on a result by result basis, which search results are unwanted or undesirable, such as by swiping these away or giving them a "thumbs down" or equivalent negative rating); (iv) process at least a subset of the search results using the analysis of the search results and the user's input; and (v) output information based on that analysis to the user. For example, the search tool may be operable to (i) output a re-ordered or modified list of search results in which the search results the search tool determines to be more wanted or desired by the user, based on the user's input, towards the top of the list while search results that the search tool determines to be unwanted by the user are moved towards the bottom of the list of search results or removed from the list; and/or (ii) output one or more suggestions for how the user may improve the search results, such as outputting a modified search string the user may input to be provided with search results that are more relevant to the type of information the user is interested in and fewer unwanted search results.

It should be understood that a list of search results may be output to a user via one or more pages and resorting the results on the list may, in some embodiments, comprise moving a search result lower on the list such that it appears on another page (e.g., on page 3 rather than page 1) of the search results. It should further be understood that a search result need not necessarily comprise a result of a search. In some embodiments, a search result may comprise a data element that is a potential search result (e.g., a data element in a database or other repository of potential search results that are or can be searched by a search tool or analyzed by a search tool).

Applicant's intent in applying any of the AI, machine learning and/or word analysis algorithms described herein to analyze user input, compare it to additional search results in order to identify additional unwanted search results, suggest modified search terms or otherwise improve the search experience is to take advantage of AI's unique ability to analyze results, data or inputs without preconceived "human" notions of want is important within an analysis. In other words, Applicant has recognized that to better understand subtle or subconscious meaning or value in the selections, humans at times tend to bring into an analysis preconceived and often unconscious notions of positive or negative, in a manner that humans may not be able to articulate if asked to directly input that information into any query, search question or data request in a manner or format usable by a device, computer of algorithm. Some of the embodiments described herein provide a novel approach to search that includes AI operable to take into account some failings of a human search, natural predilection to negative value knowledge and provide the benefit of serendipity.

It should be noted that any references made herein to a "search tool" may be interpreted as applying to functionality, interfaces, capabilities, features or benefits of a search tool such as a search engine or algorithm that identifies an initial list of search results based on search term(s) entered by a user, an independent software application that provides enhancements to the functionality of a search engine or any of the other embodiments of a search tool described herein.

As described above, in some embodiments a search tool or search engine may be operable to search a database of available information and/or to analyze a set of results (e.g., data elements) that have been identified in a search of such a database. The database may, in some embodiments, be proprietary to the search tool. In other embodiments, the database may be a shared database.

In some embodiments, a database utilized by a search tool in accordance with embodiments described herein may be stored by one or more search tool servers 112, 114 and 116 and/or a third party server 118 (e.g., in a memory of the appropriate server), on the Web or in Cloud Storage (e.g., in a memory of a server distinct from the search tool server accessing the database) or in some alternate data storage location. Further, while in some embodiments such a database of information may have been generated by the search tool or third party server accessing the database, in other embodiments the database may have been created by another entity or server. Finally, although reference has been made to a search tool or search engine searching a database in order to determine search results, it should be understood that such a data storage scheme is not necessary to carry out the embodiments described herein and other data storage schemes may be desirable or appropriate. For example, in some embodiments a search tool or search engine may be operable to search through data or information stored in spreadsheet, a particular file or document and/or a hierarchical or other file storage scheme.

Any and all of the search tool servers 112, 114 and 116 (as well as third party server 118) may comprise one or more computing devices, working in parallel or series if more than one, operable to facilitate the enhanced search result modification functions described herein. Any and all of the user devices 102, 104 and 106 may comprise, for example, a computing device operable to receive input from a user regarding a search to be conducted (e.g., one or more search terms to be used in conducting the search and/or one or more characteristics, rules or criteria to be used in modifying the results of the search as they are to be output to the user).

In some embodiments, a user device such as a user device 102, 104 or 106 may comprise a portable computing device such as a smartphone or tablet device (e.g., the IPHONE or IPAD manufactured by APPLE, the PIXEL manufactured by GOOGLE, the GALAXY manufactured by SAMSUNG, the BLACKBERRY manufactured by RESEARCH IN MOTION, the PRE manufactured by PALM or the DROID manufactured by MOTOROLA, a Personal Digital Assistant (PDA), cellular telephone, laptop or other portable computing device. In other embodiments, a user device may comprise a desktop, kiosk, ATM or other non-portable computing devices. In some embodiments, a user device may be a dedicated device dedicated to outputting search results and receiving user feedback regarding such search results. In some embodiments, a user device may comprise a simplified computing device with limited processing power, such as a digital picture frame or a CHUMBY device. In some embodiments, a user device may be integrated into another system, packaging, structure or device, such as a vehicle, wearable apparel, entertainment system and/or be operable to dock or connect with a wireless enabling accessory system (e.g., a Wi-Fi docking system). In some embodiments, a user device may be operable to synchronize with a local or remote computing system to receive, download or upload content, download software applications and to receive and/or transmit other data.

It should be understood that any or all of the devices of system may in some embodiments comprise one or more of (i) an input device; (ii) an output device; (iii) an input/output device; or (iv) a combination thereof.

An input device, as the term is used herein, may be any device, element or component (or combination thereof) that is capable of receiving an input (e.g., from a user or another device). An input device may communicate with or be part of another device. Some examples of input devices include: a bar-code or QR code scanner, a magnetic stripe reader, a computer keyboard or keypad, an optical recognition module, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale.

An output device may comprise any device, component or element (or a combination thereof) operable to output information from any of the devices described herein. Examples of an output device include, but are not limited to, a display (e.g., in the form of a touch screen), an audio speaker, an infra-red transmitter, a radio transmitter, an electric motor, a dispenser, an infra-red port, a Braille computer monitor, and a coin or bill dispenser.

An input/output device may comprise components capable of facilitating both input and output functions. In one example, a touch-sensitive display screen comprises an input/output device (e.g., the device outputs graphics and receives selections from an authorized person).

It should be understood that each of the devices of system 100 may communicate with one another directly or indirectly, via a wired or wireless medium such as the Internet, LAN, WAN or Ethernet, Token Ring, or via any appropriate communications means or combination of communications means. For example, in one embodiment communication among any and all of the devices of system 100 may occur over the Internet through a Web site maintained by computer on a remote server or over an on-line data network including commercial on-line service providers, bulletin board systems and the like. In yet other embodiments, communication among any of the devices of system 100 may occur over RF, cable TV, satellite links and the like.

The system 100 may be operable to facilitate communication among the devices comprising the system using known communication protocols. Possible communication protocols that may be part of the system 100 include, but are not limited to: Ethernet (or IEEE 802.3), ATP, BLUETOOTH, HTTP, HTTPS and Transmission Control Protocol/Internet Protocol (TCP/IP). Communication may be encrypted to ensure privacy and prevent fraud in any of a variety of ways well known in the art, some of which are described herein.

It should be understood that although only three user devices 102, 104 and 106 and three search tool servers 112, 114 and 116 are illustrated, any number of such devices may be used and, in many embodiments, a large or smaller number of each such device would be part of system 100. It should further be understood that although a system 100 comprising multiple devices is illustrated, such a system is not necessarily (and probably is not) operated or maintained by a single entity. For example, each of the search tool servers 112, 114 and 116 may be operated by a distinct entity (e.g., search tool server 112 may be operated by GOOGLE, search tool server 114 may be operated by BING and search tool server 116 may be operated by YAHOO!) and each of the user devices 102, 104 and 016 may be operated by a different user. In some embodiments, the search result modification functions described herein may be made available only from a particular search tool provider (e.g., GOOGLE). In such an embodiment, only one search tool server may be appropriate or each of the search tool servers 112, 114 and 116 may be operated by or on behalf of the same entity.

Described herein are various processes, features, interfaces and mechanisms for allowing a user to refine or modify a set of search results, or pre-emptively effect a list of search results to be output by search software, by providing feedback such as indication(s) that one or more particular search result(s) are considered undesirable and removing from a listing of search results the indicated search result(s) along with additional search result(s) that are determined to be associated with, corresponding to, relevant or likely to be undesirable for the same reason(s) as the indicated search result(s).

In some embodiments, a search tool server such as a search tool server 112, 114 and/or 116 may be programmed and modified to facilitate such processes, features, interfaces and mechanisms directly (e.g., the processes described herein may be integrated into a search engine). For example, a web browser interface of a search tool as it is output to a user may be modified to allow the user to provide indications of which search results are undesirable (and/or to "undo" such indications) and the associated search tool server may be operable to (i) perform a search requested by the user; and/or (ii) refine or modify the listing of search results based on the user's feedback or instructions.

In some embodiments, such processes, features, interfaces and mechanisms may be embodied in a software application that resides on a third party server 118 which serves as an intermediary service which facilitate the output (and modification) of search results determined by a search tool to a user.

In yet other embodiments, such processes, features, interfaces and mechanisms may be embodied as a software application that resides in a memory of a user device (e.g., a user may download or install the software application onto his device), which software application may be programmed to either automatically launch upon detecting certain triggering events (e.g., when a user opens a web browser, when a user navigates the browser to a search tool URL, etc.) or when it is affirmatively launched or opened by the user. For example, in some embodiments the features described herein may be embodied as an "app" that is downloadable onto a user device such as an ANDROID, IPHONE or IPAD. In group research embodiments or social group embodiments described herein, such an app may allow a user to link his search results to those of a group (e.g., a social, family, friend, classroom, library, business or other setting). In some embodiments a search tool server, third party server or user device may store in its memory a program for facilitating at least some of the processes and embodiments described herein.

Figure 2:
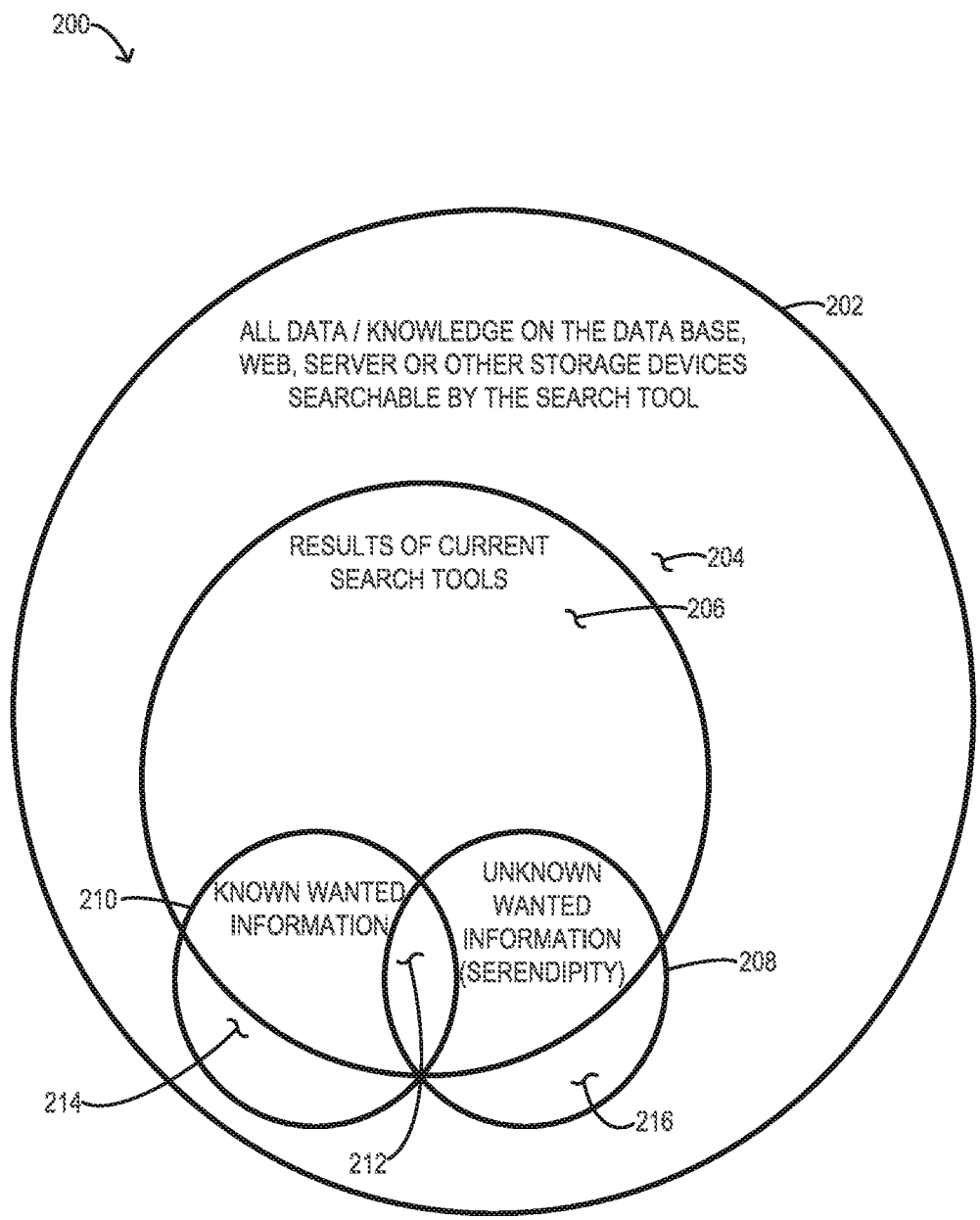
FIG. 2 is Venn diagram illustrative of some advantages which may be realized via some methods described herein.

Referring now to FIG. 2, illustrated therein is a Venn diagram illustrating some advantages or benefits that may be realized in utilizing the search result modification functions described herein. Applicant has recognized that the hallmark of the best search engines is the ability to narrow the massive amount of information remotely related to the target query into a tractable list. The list needs to be both an accurate representation of the search request and short enough to be evaluated by the user who requested the search within a practical time frame. Therefore, speed and accuracy are two of the many attributes expected from current search technology. Speed, in particular, is judged as quick enough to be timely for the user of the search engine. Timely, in turn, is measured in less than a few seconds. Accuracy is measured by the closeness of the result to the wanted information. Still, speed and accuracy are not enough. Inclusivity is also important. To be inclusive means the search results contain all information the user may already know about as well as other information that may be of value to the user that the user is yet to discover. The discovery of information that is of value and not known to exist prior to the search could be termed "serendipity." It could be argued that the web and other databases have created value by giving the general user access to both the information that is known to be available and that information that was not known to be available. In other words, there is real value in serendipity.

Search speed, accuracy, inclusiveness and serendipity are of importance to most users and this, for the most part, is the ultimate goal of search services such as GOOGLE, BING, YAHOO!, DUCKDUCKGO and BADU. These and many other search engines for internet acquirable information, internet data bases and non-internet database searches are after the same goal, namely all the factors mentioned and hence a satisfying user experience. Furthermore, one could argue that without all of these factors speed, accuracy, inclusiveness and serendipity the enormous success of the current engines would not have occurred. Moreover, the astronomical wealth of information on the web would not be accessible to the average user without these search engines. Still, the wealth of information on the web is ever expanding and the actions associated with inclusiveness and serendipity can often be in direct conflict with speed and accuracy. As a direct result, to be truly inclusive and allow for serendipity many search engines report back tens or hundreds of thousands (sometimes even millions) of results. The end result is an intractable list and a net loss of the available serendipity because few users can wander past the first ten to twenty results.

The value of serendipity cannot be truly estimated. Knowing how closely serendipity and discovery are linked, it is hard to quantify what is new information that was actively searched for and what is new information that was unexpected. It is equally difficult to imagine a world without some level of serendipity. Still, in an effort to improve searches accuracy is increased and serendipity is often sacrificed. In the most sophisticated searches accuracy is judged by laser sharpness leaving little room for serendipity. Many other engines are judged by supplying the most popular results again reducing serendipity.

In order to better understand the relationships, illustrated in FIG. 2 is a Venn diagram 200 showing the sets of information that represent a generic version of all data available and the common subsets of possible search results. The figure shows the relationship between the pool of all information available/searchable via a particular search tool (202), the set of search results for a particular search request (204) as well as a representation of the subset of search results which comprise wanted results (210) as circles in the diagram 200. The diagram 200 also includes a subset of unwanted information 206 contained within the search results 204 and the smaller sets of known wanted information (210) and unknown wanted information or serendipity (208). In this way we can see the union of the sets of wanted known information (206) and serendipity (208) contains the search results most likely to be desirable to many users. The intersection of the two sets (212) is the overlap of wanted known information (210) and wanted yet unknown information (208) is of special interest in expanding one's knowledge. Also illustrated via the diagram 200 is how the prior art search tools leave some of the wanted information out. These are shown in the areas inside the sets of wanted information (210) and serendipity (208) that lie outside the set of search results (204) and are indicated as areas (214) and (216) respectively. From these sets in the diagram 200 one can see that there is a need for a search result modification mechanism (such as ones described herein) which can effectively remove (or allow a user associated with the search results to remove) the unwanted subset of the search results (206) that is not in the set of known wanted search results (210) and the set of serendipity (unknown yet wanted results) (208). There is further a need for a search result modification mechanism (such as ones described herein) which allows a user to efficiently identify the data in each of the sets (208) and (210) that is not in the original search result (204), the information which would be includes in the areas (214) and (216).

To solve the conflict between providing all accessible information to be inclusive and still be accurate many search engines today are programmed to rank the most popular results higher than the most novel results in a given list of search results output to a user (i.e., the most popular search results appear first in the list of search results). This causes a further loss of serendipity and some loss of accuracy as defined by an individual user's search requirements. This, in turn, yields an unsatisfying experience for the user in their search of new information. This frustration is an experience we can all relate to, thousands of results but nothing of true interest. The user is then forced to wander around in the set of unwanted search results (the results represented by area 206 of diagram 200). This leads many users conducting a search to think hard about what search result they are looking for and another attempt at getting it "right." Many users continue on frustrated and less and less willing to look further down a list of search results as the time required to find what they want increases and the value of the search activity decreases. Lost in the large set of unwanted results, any chance at a great answer to the user's question diminishes along with any real opportunity for a serendipitous finding of value.

As current engines look for a solution for this issue, the many thousands of results are ranked in several ways. Most commonly by what other searchers may think combined with algorithm ranking, objects that are highly linked and even the user's own prior searches or search behaviors in prior searches. This practical application of technology has created a bias to what others are looking for and this, as we all know, is self-reinforcing since few searchers move past the first ten (10) results when presented with literally thousands to review. So, the problem remains. How does one get a search engine to deliver the information that is most useful?

Applicant has recognized that the human mind can more quickly reject a poor search result than a good one. In other words, the user who has input search terms for a search and been provided with search results has a natural ability for a sharper distinction about what they do not want than what they do want. Applicant has further recognized that it is the elements of what is not wanted in a search that often keeps the search from being a successful search. Seeing the volume of unwanted information in the search results is an unsatisfying experience. Applicant has thus recognized that if a user were given proper tools or a set of tools for easily removing the "noise" or unwanted information, finding the information the user wants would be simplified and more satisfying.

Figure 3A:
FIG. 3A is a diagram of one interface via which a user may be provided with search results utilizing a first search engine after inputting a particular search term, in accordance with the prior art.
Figure 3B:
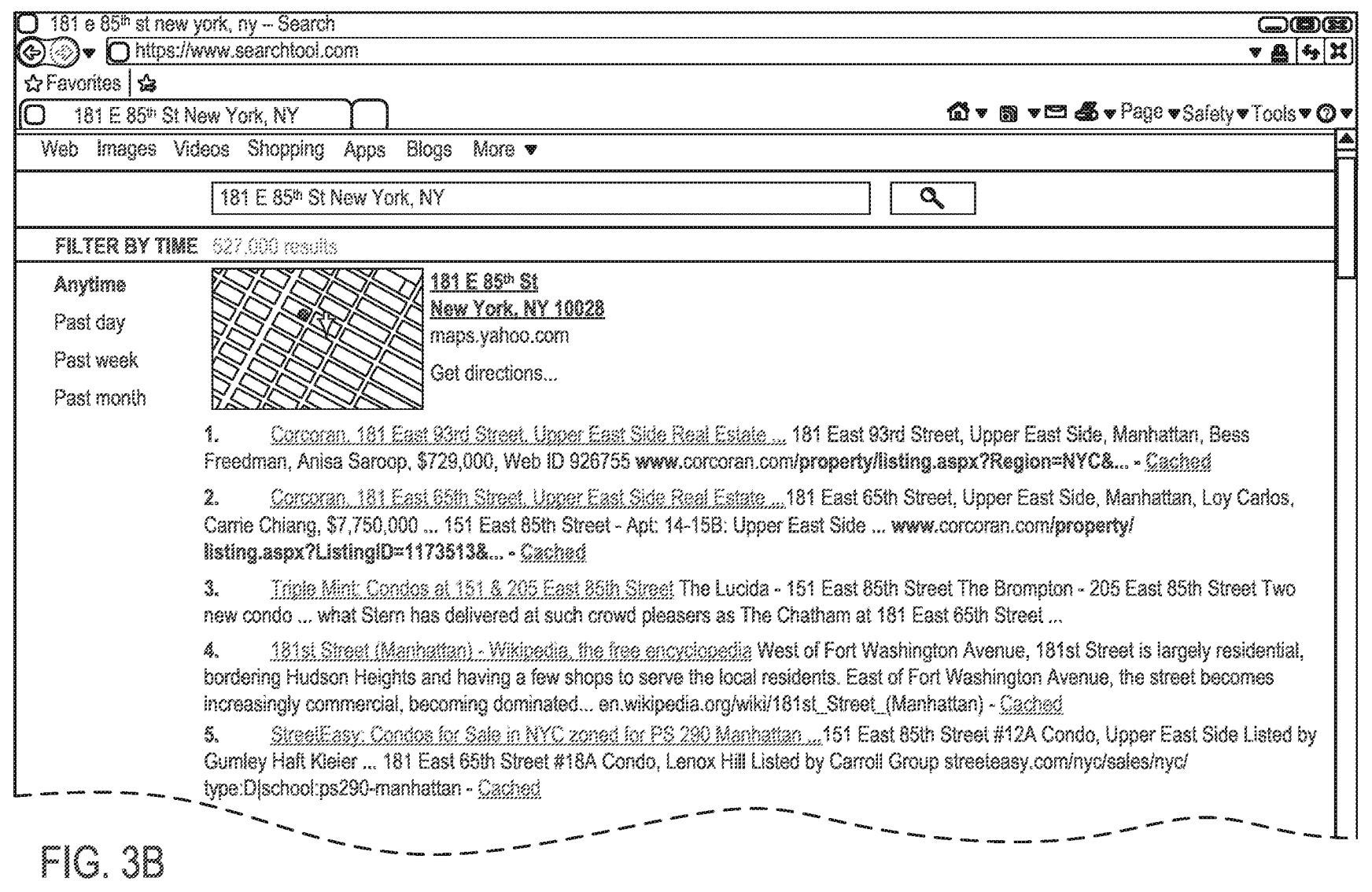
Figure 3C:
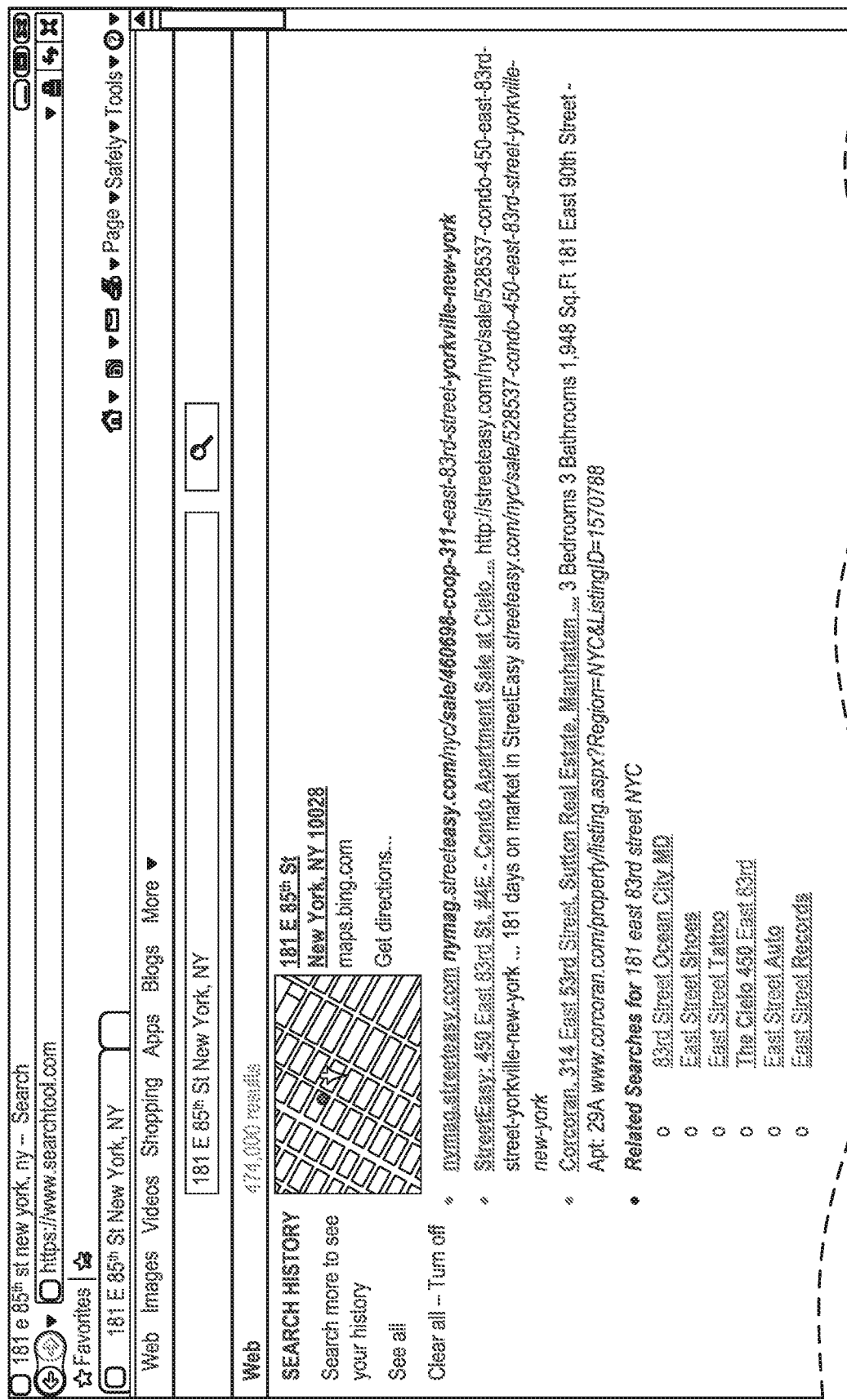
FIG. 3C is a diagram of one interface via which a user may be provided with search results utilizing a third search engine after inputting the same search term utilized in FIG. 3A and FIG. 3B, in accordance with the prior art.

Turning now to FIGS. 3A through 3C, illustrated therein are respective example user interfaces illustrating prior art search results for the indicated search term "181 E 85th St New York, NY 10028". FIG. 3A comprises a user interface depicting search results output to a user using the GOOGLE search engine after the user input the search term "181 E 85th St New York, NY 10028." As indicated on FIG. 3A, over one (1) million results were returned to the user. FIG. 3B comprises a user interface depicting search results output to a user using the YAHOO! search engine after the user inputs the same search term "181 E 85th St New York, NY 10028." As indicated on FIG. 3B, about 527,000 results were returned to the user. FIG. 3C comprises a user interface depicting search results output to a user using the BING search engine after the user inputs the same search term "181 E 85th St New York, NY 10028." As indicated on FIG. 3C, about 474,000 results were returned to the user. It should be noted that, due to page space constraints, only the first few results output to the user on the first web page of search results are shown in each of the figures. It should further be noted that the search results illustrated in each of the figures are based on an actual search using the search term "181 E 85th St New York, NY 10028" conducted on each respective search engine in the year 2011.

FIG. 3D comprises a user interface depicting search results output to a user using the GOOGLE search engine after the user inputs the search term "President Clinton first year in the white house." As indicated on FIG. 3D, over 1.4 million search results were returned to the user. FIG. 3E comprises a user interface depicting search results output to a user using the GOOGLE search engine after the user utilized GOOGLE's advanced operators to try to remove known unwanted information after viewing the first search results output after an initial search based on the search term "President Clinton first year in the white house." In considering the massive quantity of results returned by each of the search engines for a fairly specific search term, as illustrated in FIGS. 3A through 3D, one can appreciate that unwanted information can easily overwhelm the results and create significantly distracting "noise" that may keep a user from efficiently finding the wanted results. One can also appreciate that most users, in viewing the results on a particular page, would likely be able to easily determine which results are not wanted or undesired.

FIG. 3E illustrates the result of attempting to remove unwanted information returned in an initial search using an available search engine mechanism. As shown in FIG. 3E, rather than decreasing the number of search results such that the set of search results is more manageable for the user, the refined search yielded many more search results (over two (2) million this time). Thus, using the advanced search feature on a search engine such as GOOGLE by taking advantage of its algorithm or method to fine tune the search returns somewhat paradoxically almost twice as many search results. This is of interest since the effort to reduce or focus results using the current state of the art actually yields more results not less results. This is the opposite of what one would expect. This paradoxical result of more results even when trying to remove the unwanted results further demonstrates the need in the state of the art for an alternative strategy. This paradoxical result could only be explained by the search engine's net bias to being all inclusive and its general inability to use negative factors in narrowing results by nature of their inherent design. Applicant has further recognized that this may be even more valid when a user is initiating a search or when the search engine or device is using general population results and or search histories from similar prior searches to help narrow a given individual's search. Moreover, Applicant has recognized that efforts to homogenize the data over millions of searches paradoxically gives improvements to some searches while degrading the value of others especially when it comes to serendipity. This forces many users to restate the terms of the search many times when they see the general direction or output of the search results seems incorrect to them as they view the first polarity of the output of the current state of the art.

Therefore, there is a need in the state of the art for an improved user directed search result strategy or interface that is user friendly, intuitive, search engine or algorithm independent, and non-intrusive and which provides the benefits of vast data search strategies while being fast, accurate, inclusive and further provides an opportunity for serendipity while allowing the user to self-direct the elimination of extraneous information in both a negative context (undesirable information) and even a positive context (more desirable information). A new search enhancement or tool and interface of this type may have one or more of the following benefits:

(i) present to the user clear easy options to modify search results in order to allow the user to quickly and efficiently remove the unwanted results as well as all similar unwanted material;

(ii) improve the user's view of the wanted data by removing the "noise" created by the unwanted data;

(iii) indirectly create access to the unknown but useful information, in other words increasing the chance for serendipity, by lessening the "noise" in the result;

(iv) improve the relevance of searches and therefore increase the so called "stickiness" (the tendency to stay as a user of the engine or portal and revisit it for future searches) of a given search site. This would increase the value of the site for the various stakeholders including but not limited to the user, the search provider, the content providers including the potential revenue sources such as paid search, advertises and other content providers;

(v) allow the searcher to indirectly create and use the power of a more sophisticated Boolean type search in a user-friendly intuitive way;

(vi) remove the current limits placed on these modifications by providing a better operational application of the user supplied information;

(vii) allow the search engine to heuristically acquire information about information that detracts from a given search directly from the users and improve the accuracy and value of the search outcome to the individual searcher;

(viii) allow for the creation of URL based or Logged in based tracking of search detractors for a given computer or individual searcher (the logged in version would allow the prior history to "follow" the logged in user from device to device); and/or (ix) enhance the value of the search engine by "knowing" the important factors to a searcher to create value in a logged in (user identified) environment like those created when a user maintains an account or user ID with a search engine or portal and, in some embodiments, based on the use of a personal device (i.e. a cell phone, pad, tablet, TV, or personal computer) that is automatically user identified within a network.

Accordingly, described herein are various embodiments for strategies, processes, systems and interfaces which are operable to allow a search tool user better access and control over search queries and the results. The interfaces, processes and systems described herein, and the associated functionalities. are search tool independent. Described herein are various examples for orders of operations search, applications of search modifying options over the current search results, options selections, application of modifications, the ability to "undo" or "redo" an applied option and the ability to repeat these sets in an iterative fashion as well as alternative ordering of the same functional operations. In accordance with some embodiments, a user may input a query through any acceptable interface, the search tool or search engine may present the search results to the user and provide a direct feedback option to the user, via which the user may indicate unwanted or undesirable search results. A goal of at least some embodiments described herein is to provide systems, methods and interfaces operable to aid a user of a search tool to remove unwanted results or "noise" efficiently. The search result modification options described herein comprise an effective means to reduce the noise and bring the more pertinent results closer to the top of the list while reducing the list sufficiently enough to allow for serendipity (as described with reference to FIG. 2 herein). The user thus should be able to enhance the possibility of viewing more pertinent data and identifying information that they were unaware of prior to the application of the user modifications. The dynamically applied negative as well as potential positive feedback created by the user feedback interfaces described herein may, in some embodiments, (i) be stored to help future user searches, and/or (ii) be tracked by a computer's location (URL) or a user login to better assist in future searches (of the same user and/or different users). In accordance with some embodiments, one or more of the user directed modifications can be added to the search engine database as it improves its own methods of searches in order to reduce "noise" or unwanted data and improve serendipity with the goal of a better user experience.

Example Processes

Figure 4:
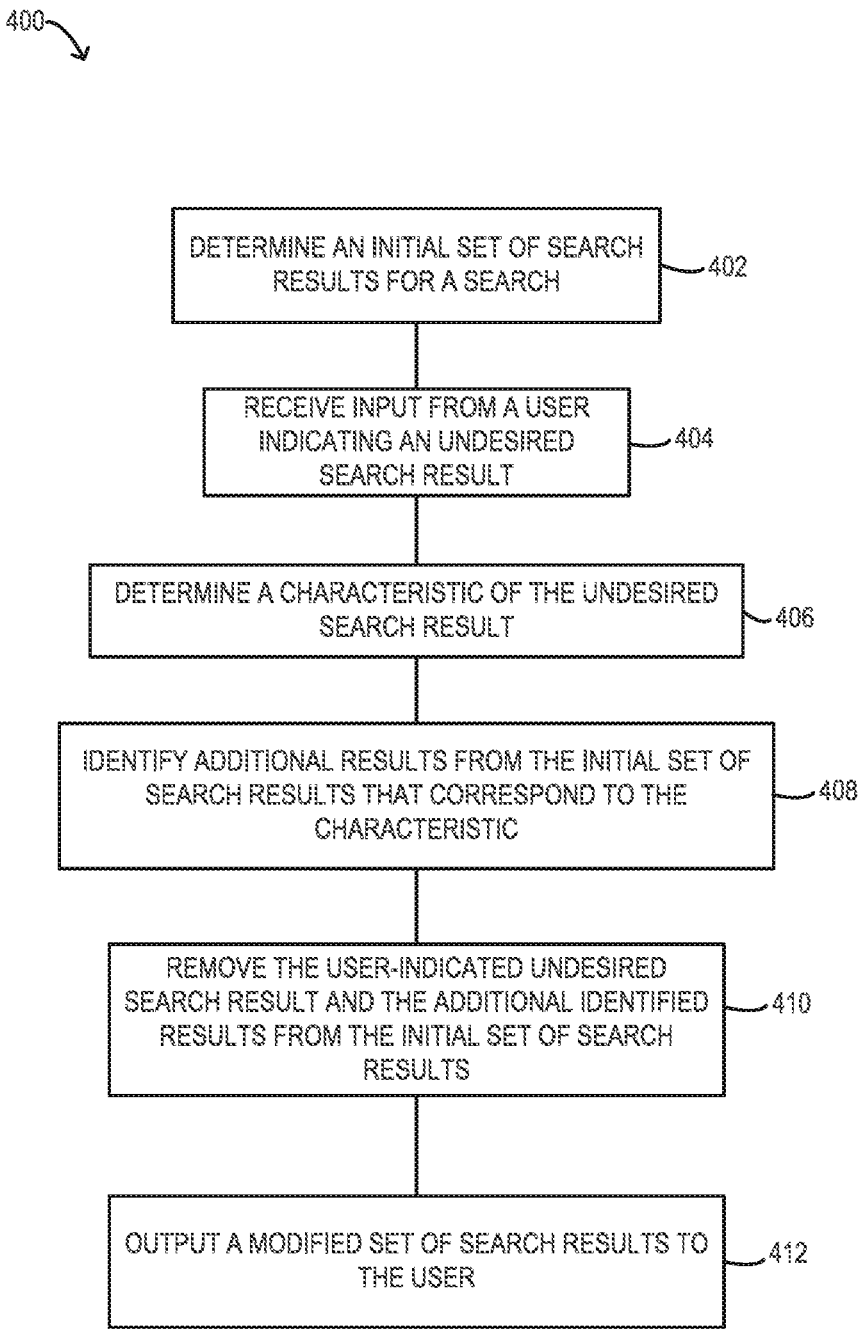
FIG. 4 is a flow diagram illustrating a process which may be performed in accordance with some embodiments described herein.

Referring now to FIG. 4, illustrated therein is a flowchart of a process 400 consistent with some embodiments described herein. It should be noted that process 400 is exemplary only and should not be construed in a limiting fashion. For example, additional and/or substitute steps to those illustrated may be practiced within the scope of the present invention and in one or more embodiments one or more steps may be omitted or modified. In one embodiment, the process 400 is performed by a search tool server 112, 114 or 116. Alternatively, process 400 may be performed by a third party server 118 and/or a software application residing on or otherwise utilized by (e.g., using cloud storage technology) a user device of a user requesting the search.

In step 402, an initial set of search results for a given search is determined. For example, if step 402 is being performed by a search tool server 112, 114 or 116, step 402 may comprise performing a search of available data based on one or more search terms and/or rules defining a search (e.g., as input by a user) and identifying the highest ranked search results for the search based on one or more algorithms. If, on the other hand, the step 402 is performed by a third party server 118 or by a software application of a user device, step 402 may comprise identifying the search results returned for a particular search by a search engine (e.g., as output via a search engine web browser interface). In either case, the step 402 may in some embodiments be preceded by a user inputting one or more search terms and/or rules defining a search into a search tool interface, which user input may initiate a search and result in an initial set of search results for the search. In one embodiment, step 402 (or an additional step preceding step 404) comprises outputting the initial set of search results to a user. For example, a listing of search results comprising hyperlinks to various web sites may be output to a user via a web browser interface.

In step 404, an input is received from the user who requested the search, the input indicating at least one undesired search result of the initial set of search results. Step 404 may, in some embodiments, be performed after the initial set of search results determined in step 402 is output to the user. Thus, the indication received in step 404 may comprise a selection of a particular one or more search results included in the initial set of search results along with an indication that the selected one or more particular search results are undesirable. In some embodiments, the selection of a result and the indication that it is undesirable may comprise the same and singular input. For example, an interface consistent with embodiments within the scope of process 400 may be output to the user, the interface allowing the user to swipe away (e.g., to the left or the right), check off, select or otherwise indicate which search results of the initial set of search results are undesirable. FIGS. 7 through 14, described below, illustrate several example interfaces which may be output to a user for allowing the user to provide an indication such as may be received in step 404.

In step 406 a characteristic of the one or more search results for which the input was received in step 404 is determined. It should be noted that more than one characteristic may be determined. Such a characteristic may, in one embodiment, be indicated (e.g., typed in, identified via a code, selected from a menu of available options) by the user who provided the indication in step 404. Alternatively, the characteristic may be determined or inferred on behalf of the user based on the indication received in step 404 (and, in some embodiments, additional information associated with the user or other users). In either case, the characteristic may be utilized in identifying what it is about the one or more search results indicated in step 404 that renders them undesirable (and thus allows a removal from the initial set of search results of not only the search result(s) indicated in step 404 but also similar, related or relevant search results). Various example methodologies for determining a characteristic of at least one search result that the user has indicated as undesirable are described elsewhere herein.

Examples of characteristics that may be indicated, inferred or otherwise determined include, without limitation:

- (i) a source of the content or material comprising the search result (e.g., considered reliable or unreliable by the user or other users, Society web sites (like American Medical Association, ASPCA, AARP, etc.), Government sources, Library of Congress), specific magazine, media channel or other content provider;
- (ii) the nature, format or medium of the search results (e.g., whether it comprises a video, one or more photos, a news articles of a web based publication or a news articles of a radio/TV or other media publication);
- (iii) country of origin or other geographical location associated with the search result;
- (iv) type face or other aesthetic characteristic;
- (v) language;
- (vi) author or publisher;
- (vii) the fact that it is a translation or version of same document already included as another search result;
- (viii) peer review journals;
- (ix) scientific;
- (x) liberal arts (any category, e.g. philosophy, music, humanities, classics, Greek mythology, roman history, etc.);
- (xi) time period (e.g. before 1920, after 1800, BCE, future, past, prehistoric, inclusive dates 1969-1972, exclusive dates, not 1980 to 1990, or by decade, century or millennium)
- (xii) a characteristic of the author such as it being a single Author, multiple author, authors only with multiple publications on same or similar topic, professors, teacher of a certain institution or group of institutions (e.g., Oxford, an Ivy League school, the Big ten, etc.);
- (xiii) the fact that the search result comprises a PhD thesis;
- (xiv) the fact that the search result comprises a document or information about an IPO (Initial public offerings);
- (xv) the fact that the search result comprises an investment report;
- (xvi) the fact that the search result comprises a text book or a given text book or a text books only on a specific topic;
- (xvii) the fact that the search result comprises a lecture;
- (xviii) the fact that the search result comprises an advertisement;
- (xix) the fact that the search result comprises theater or entertainment;
- (xx) at least one a word feature included in the search result;
- (xxi) content included in the search result (e.g., in the circumstance of a movie, song or television show, the content may include a genre, actor, singer and/or rating of the content); or
- (xxii) a category associated with the search result (e.g., in the circumstance of a movie, song, television show the category can comprise a genre or rating, in the circumstance of a restaurant the category can comprise a cuisine, in the circumstance of a restaurant or travel destination the category can include a geographical location indicator, such as a zip code).

With reference to a word feature (item (xx) in the list above), a characteristic comprising a word feature refers to a characteristic indicating that a certain search result includes one or more text-related features such as (i) a certain word (e.g., an uncommon word) or combination of words appearing in the search result, (ii) a word that corresponds to one or more synonyms appearing in the search result, (iii) a word cluster appearing in the search result, (iv) a first word appearing within a predetermined number of words from a second certain word within the search result, (v) a particular string or combination of words appearing in the search result, (vi) one or more words appearing in the search result with a particular frequency value or within a frequency value range; or (vii) a word-to-vector valuation being determined for one or more words within the search result. For example, natural language processing (NLP) models such as word-to-vector models may be utilized to process and analyze text corresponding to search results (e.g., the summary or excerpts from search results that are often output to a user in a list of search results) in order to identify relationships or correlations among words within a given reference and thus identify a characteristic that may be common to, or shared by, two or more search results (e.g., because the same cluster of words appears in each of the references or because synonyms appear in each of the references or appears with a minimum frequency within each reference). Examples of some search-to-vector or machine learning models or analysis tools which may be utilized to identify a word feature of a given search result (e.g., to convert text into numerical vectors before any kind of text analysis like text clustering or classification is performed) include "Bag of Words" (also referred to as "BoW" herein), "Word2Vec", "Word Mover Distance" and "Word Clusters" (although other types of models, methodologies or natural language processing may be utilized to achieve the desired analysis).

The methods and algorithms described herein are not restricted to an order of analysis. For example, "I like ice-cream, yesterday it made me sick and now it is not my favorite." In this example, "it made me sick" reverses the initial meaning. Also word mover distance and word2vec analysis would connect "like" and "favorite" as close in meaning aiding in 'understanding' the reversal in meaning. Reading this in the reverse order would give "not my favorite" priority and hence a better understanding of the wanted meaning. So analysis of meaning in a statement in either forward or backward direction or by individual fragments (word clusters) independent of order is not limited by the intent of the processes or any algorithms used by the embodiments described herein.

In accordance with some embodiments, the methods described herein can also be used across selections so the combination of information in selections can enhance the value or meaningfulness of any one or more or part, fragment or word being analyzed by the algorithm(s) being used. All of this, in combination or part, are designed to assist the applied process to better take advantage of the subconscious or conscious indented meaning of selections or desired results.

In one embodiment, a word feature characteristic may then be utilized to help identify a context for a given search result and determine which search results may be similar to ones identified by a user as unwanted and should thus also be considered as unwanted by the user. For example, if a user indicates search result A is unwanted and the system determines that search result A corresponds to a particular one or more word feature(s), the system may determine that search result B is also unwanted by the user if search result B is processed and determined (e.g., based on an NLP model such as BoW) to also correspond to the one or more word feature(s). It should be noted that the above-described methodologies for determining word feature characteristics may also, in some embodiments, be applied to images included in search results.

Although process 400 is illustrated as determining a characteristic of a search result indicated by the user as being undesirable, in other embodiments the process 400 (or another similar process consistent with embodiments described herein) may analyze all search results of an initial list of search results (or a sub-set thereof, such as all search results appearing on a given page of search results) to identify characteristics thereof (e.g., word feature characteristics), even before or contemporaneously with a user indicating that one or more of the search results are unwanted. In such embodiments, the system may at least temporarily store such determined characteristic(s) and utilize them to identify additional search results that may be likewise unwanted by the user because they share one or more characteristics of a search result the user has indicated is unwanted.

Although process 400 is illustrated as determining a characteristic of a search result indicated by the user as being undesirable, in other embodiments the process 400 (or another similar process consistent with embodiments described herein), it should be noted that the determination of the characteristic is merely one example of determining a reason for why a user considers one or more particular search results undesirable. Other mechanisms for determining a reason for why a user considers one or more search results undesirable may be utilized within the scope of the embodiments described herein. In some embodiments, the server performing the process 400 may be programmed with an algorithm enabling it to identify a characteristic of the search result indicated as undesirable or to determine a reason why a search results is (or is likely to have been) considered undesirable by a user. In some embodiments, a user may be queried as to the reason he or she considers the search result indicated in step 404 as undesirable to be undesirable.

In accordance with one embodiment, the user may be provided with an indication or flag as to which search results were selected or preferred by other users (e.g., users within a designated group, location, set of locations, with one or more shared characteristics and/or within a class). This may be desirable in order to allow each member of a group the option to remove those results in an effort to find new or different relevant material. In some embodiments the ability to flag, identify or know other users search efforts or results can be used to emulate a physical library by monitoring or reducing access to popular information in order to force or direct deeper searches into the area of research. A more detailed discussion of processes addressing an "electronic library effect" is provided below with reference to FIG. 6.

Referring now to step 408, additional search results in the first set of search results that correspond to the characteristic determined in step 406 are identified. For example, a remainder of the first set of search results may be analyzed to identify any additional search results that have, exhibit or are associated with the characteristic.

In step 410, the additional search result(s) identified are removed from the initial set of search results, as is the search result(s) indicated in step 404 by the user as being undesirable. Accordingly, the initial set of search results is shortened such that it no longer includes the search result indicated by the user in step 404 or any additional search results identified in step 408.

Removing a search result from a listing of search results may, in some embodiments, comprise refreshing the listing or outputting a modified listing such that the removed search result no longer appears on the list. In some embodiments, although the removed search result itself (e.g., the hyperlink to a web page) no longer appears on the modified listing (or appears much lower on the listing, such that it is no a subsequent page of search results or lower on a GUI), an indication thereof may appear (and, in accordance with some embodiments, such an indication may be usable by the user to add the removed search result back to the listing of search results or have it moved back up higher on the list). In other embodiments, removing a search result may comprise hiding the search result, graying out the search result, making the search result an inactive hyperlink (in embodiments in which search results comprise hyperlinks) or otherwise altering an indicator of the search result such that it is clear to the user that the search result has been removed or reranked/resorted such that it appears lower on the list or is no longer an active component of the list. As described herein, in some embodiments removing a search result may comprise reordering or re-ranking the search results such that the undesirable search results are moved to the end of (or lower on) a listing of the search results.

In step 412, a modified set of search results is output to the user. The modified set of search results being the initial set of search results determined in step 402 minus the search result indicated by the user in step 404 and minus any additional search results identified in step 408. In some embodiments, any removed search results may no longer appear on a listing of the search results comprising the modified set of search results. In some embodiments, a removed search result may appear on the list but may appear lower on the list or as being ranked lower on the list, such that it appears on another page of search results (e.g., it is removed from its prior particular placement on the list but may appear elsewhere on a resorted version of the list of search results). In other embodiments, the modified set of search results includes some indicator of the removed search results such that the user is able to add the removed search results back into the list or back into a prior placement on the list (e.g., by clicking on the indicator or otherwise utilizing a provided mechanism for requesting that the removed search result be added back into the listing). In some embodiments, any removed search results may be output to the user in a separate and distinct listing (e.g., a distinct web page may be created and output to the user, perhaps as a separate tab, via an interface of a web browser). In some embodiments, both the search result removed as a direct input from the user that the search result is considered undesirable is output as well as a listing of any additional search results removed as a result of step 408.

It should be noted that process 400 may be a dynamically applied or ongoing process. In other words, each time a user indicates a particular search result to be undesirable (e.g., a user begins reviewing a list of initial search results and starts checking off search results the user finds undesirable as he or she goes along the list of search results), steps 406, 408 and 410 may be performed such that the list of search results is updated or refreshed dynamically as the user provides the negative feedback (e.g., the search result listing is regenerated to reflect the removal of the undesirable search results). Further, in some embodiments a user may be provided with an "undo" option such that the user may bring a search result (and any associated or corresponding search results which were removed as a result of the user previously indicating the search result as being undesirable) if the user changes his or her mind. For example, an interface of search results previously removed in the search and/or search results previously indicated by the user in the search as undesirable may be output to the user. In accordance with some embodiments, at any time during the process 400 or another process for allowing a user to indicate undesirable search results and have a search result listing modified as a result, if the user sees a desired result, the user can opt to see that result by any of the methods available for redirecting a search result to a new page (e.g., clicking, touching, mouse-over or other method of page activation) or continue to be offered user directed feedback options (e.g., for indicating undesirable search results).

In an embodiment in which a list or set of search results is updated dynamically based on user feedback, the process 400 may loop back to step 404 upon outputting the modified set of search results, to determine whether another input has been received from the user, indicating another undesirable search result. If so, the process 400 may continue to steps 406, 408 and 410 as described above. In some embodiments, if an user indicates an additional search result as being undesirable after having already previously indicated in the search another search result as being undesirable, the process 400 may include a query step to determine whether the additional search result indicated by the user as undesirable has already been removed from the initial set of search results (e.g., because it corresponds to the characteristic identified in step 406 and the modified set of search results had not yet been output to the user prior to the user indicating the additional search result as being undesirable).

In some embodiments, a search listing or set of search results is only modified upon the user's request to so modify the set of search results by applying any negative or positive feedback (e.g., in the form of specific search results the user considers undesirable). In such embodiments, if applied to the process 400, the steps 404-412 may only be initiated or launched upon some affirmative activation or request by the user such that multiple search results flagged or identified by the user as undesirable (e.g., each associated with a distinct characteristic or reason for being considered undesirable) are considered and applied in one application of the process and the user is provided with an output of modified search results which reflects the removal of all the search results (i) identified by the user as undesirable; and (ii) identified by the server or software application as being undesirable based on the user's indication of undesirable search results. In some embodiments, as described herein, the feature or service of modifying search results to remove undesirable search results may be embodied as a software application that is overlaid onto, or run in conjunction, with a search engine but that is distinct from the search engine's functionality of running an algorithm to search through available data for search results. In such embodiments which encompass the functionality of running process 400 only upon an initiation of a user (e.g., when the user determines in his discretion that he is sufficiently done with selecting undesirable search results and would like the search result listing modified to reflect his selections), the modification of the listing of search results may be initiated upon the user launching the software application or the relevant feature thereof.

It should be noted that the above-described mechanism allows for batch or group application of the user directed feedback. The same information could be provided to a designated user associated with a group (e.g., group monitor, leader, teacher, research director or other similar person) so the group work could be monitored. The users and/or monitor of the group work can use this information to reduce duplication of work or better understand the direction the project is taking. In accordance with some embodiments, the application of the new information may be tracked as the user indicates the modifications and these modifications can be dynamically undone by a specific activation by the user. A more detailed description of embodiments directed to group research projects is provided below, with respect to the "electronic library effect" embodiments.

The method of step 400 is one example of how an overwhelmingly large set of search results may be shortened to a more digestible number of search results based on a user's indication of one or more search results that the user quickly identifies as undesirable. Of course, other methods may be utilized to achieve a similar result. For example, rather than determining a characteristic of the search result indicated by the user as being undesirable and finding additional search results that correspond to or share the characteristic, a server or software application may determine a search result the user indicates is undesirable and remove additional search results that are otherwise associated with that search result. For example, the server or software application may remove additional results that were similarly indexed in a database searched in identifying the initial set of search results or that are somehow stored as related search results in the database.

In some embodiments, when a user provides feedback regarding a listing of search results (e.g., a user indicates one or more particular search results in the listing are considered undesirable), such an indication from the user may be fed back to the search tool and the search may be rerun using this user provided information. In other words, although in some embodiments a user's indication that one or more search results are undesirable may simply cause a removal of the undesirable search results, which may comprise a resorting of the list of search results (of both the search results affirmatively indicated by the user as undesirable and the search results determined by the system to be undesirable based on the user's indication of the one or more particular search results) in other embodiments the user's indication that one or more search results are considered undesirable may cause a new search to be performed based on this indication(s). For example, if the user is providing the indication(s) of the one or more undesirable search results directly to a search tool, the search tool may initiate a new search of the same data (e.g., as stored within a proprietary database of the search tool) previously searched upon receiving the indication(s) of the undesirable search results. In another example, if the user is providing the indication(s) of the one or more undesirable search results to a third party service or software application which utilizes the search results returned by a search tool, such third party service or software application may communicate with the search tool to request a new search based on the indication(s) from the user (e.g., the third party service or software application may generate one or more additional search terms or rules for the search tool to use in performing a new search).

It should be noted that in many embodiments it is important to the desirability of the search enhancement methods described herein that the output of the modified or second set of search results (i.e., the search results with the undesired search results removed) be done within a relatively short time frame from when the user indicates an undesired search result or characteristic of an undesired search result (or from when an initial set of search results are output, depending on the embodiment). Searchers of electronically available sources who use search tools such as search engines are accustomed to receiving an output of search results fairly immediately upon requesting the search (e.g., usually within a second or two). Thus, enhancements such as those described herein (e.g., with respect to FIG. 4, above and FIGS. 5 and 6, below) may benefit from being performed by a processor capable of performing the methods within a very short time frame (e.g., within three or five seconds).

Figure 5:
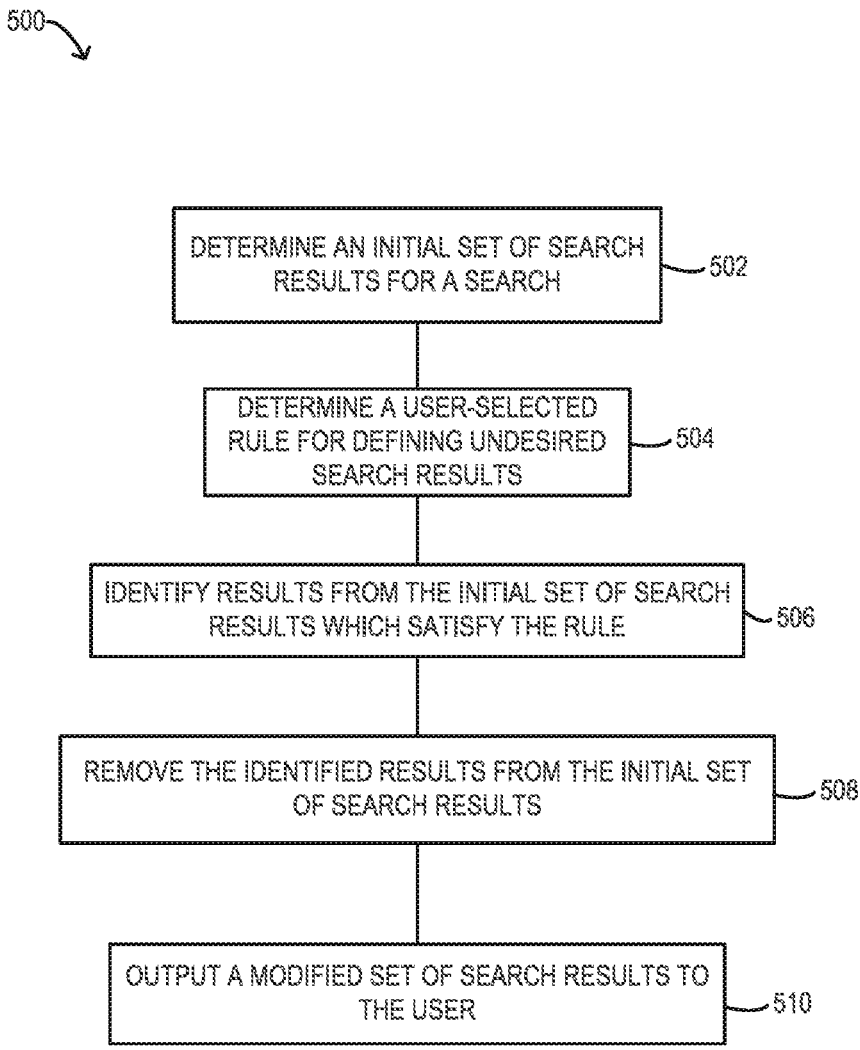
FIG. 5 is a flow diagram illustrating a process which may be performed in accordance with some embodiments described herein.

Turning now to FIG. 5, illustrated therein is yet another process for modifying a set of search results to remove undesirable search results and thus increase the likelihood of serendipity. More specifically, illustrated therein is a flowchart of a process 500 consistent with some embodiments described herein. It should be noted that process 500 is exemplary only and should not be construed in a limiting fashion. For example, additional and/or substitute steps to those illustrated may be practiced within the scope of the present invention and in one or more embodiments one or more steps may be omitted or modified. In one embodiment, the process 500 is performed by a search tool server 112, 114 or 116. Alternatively, process 500 may be performed by a third party server 118 and/or a software application residing on or otherwise utilized by (e.g., using cloud storage technology) a user device of a user requesting the search.

An initial set of search results is output to a user in step 502. This step may be similar to step 402 of process 400. Accordingly, step 502 may include and any additional or preceding processes or steps, such as receiving search terms and an initiation of search from a user as was described with respect to step 402. As indicated in step 402, in some embodiments determining an initial set of search results may also comprise outputting the initial set of search results to a user. However, it is contemplated that in some (but not all) embodiments within the scope of process 500, the initial set of search results determined in step 502 is not output to the user who requested the search. Rather, the initial set of search results may be pared down or re-sorted for the user before it is output in modified form, in accordance with the following steps.

In step 504 a user-selected rule for defining undesired search results is determined. For example, upon requesting a search and providing search terms to be used in conducting the search, the user may have selected or indicated one or more rules defining results or types of results the user considers undesirable. The user may have provided such an indication or selection by typing in information, making a selection from a menu of available options, or a combination thereof. For example, in some embodiments a user may be interested in viewing search results that are not the most popular search results (e.g., results that are not ranked the most highly by the search engine performing the search) or that are not ranked highly due to payments provided by a source of the search results (some search engines allow search result sources to pay in order to have their search results placed higher in a listing of search results for certain search terms). In one embodiment, a user may be provided with a menu (e.g., by a search engine provider or by a third party service provider who modifies a set an initial set of search results returned by a search engine) of available rules for defining undesirable search results. Examples of such rules include, without limitation: (i) do not output the top X most popular search results; (ii) do not output search results from source X; (iii) do not output search results associated with source X; and (iv) do not output search result which also include term X. It should be noted that the "X" term of each rule may, in some embodiments, be a "fill in the blank" type of term that the user can specify or customize by filling in a value for it or selecting one of a plurality of available values. In other embodiments the "X" term may already be specified and not customizable by the user. In some embodiments, a database of rules from which a user may select a rule for defining undesired search results may be stored (e.g., in a memory of a search engine server) and a user-friendly description or indication of each such available rule may be may be made available to any user beginning a search.

Step 504 of determining a user-selected rule may comprise identifying any rule (and, in some embodiment, particular value for a parameter of the rule that is available for customization to the user) as it had been previously selected by the user upon requesting the search. For example, a user may be allowed to select such a rule at the time of inputting the one or more search terms for a search. Thus, such a rule may be stored in a memory (e.g., a temporary memory of the user device, a search engine server, or another memory accessible to the search engine server, third party server or software application facilitating the search). In other embodiments, a user may be prompted to select a rule (if any) for defining undesired search results at another time (e.g., while the search is being performed; after the search is performed and an initial set of search results is identified, either before or after the initial set of search results it output to the user). In some embodiments, more than one rule may be selected by the user and determined in step 504. In some embodiments, one or more rules may be stored in association with a user profile and used for more than one search (e.g., the user may select such a rule and have it applied to more than one search, such that the user-selected rule is not necessarily specified by the user for the particular search whose search results are being modified in process 500).

In accordance with some embodiments, the initial set of search results may indeed be output to a user in step 502. It may be output along with a suggestion for removing one or more search results, in accordance with a rule utilized by the software application which determines such a suggestion. For example, the top five (5) search results may be flagged or otherwise indicated to a user as ones the user should consider removing. If the user accepts the suggestion (e.g., by selecting the suggested search results for removal or answering affirmatively so a query such as "Would you like the 5 search results removed from the search?"), the user's agreement to remove the search results flagged for possible removal in accordance with the rule may be considered a selection by the user of the rule. In some embodiments, search results may be suggested for removal based on a particular user's (or other users) selections of search results either for removal or further investigation, in previous searches. For example, if the user never clicks on search results comprising hyperlinks to foreign language sites, any search results which include foreign language content may be suggested for removal.

Returning now to process 500, in step 506 the search results which satisfy the rule determined in step 504 are identified. For example, if the user selected a rule which defines the top 5 most popular search results as undesirable, the top 5 most popular search results may be identified in step 506. The search results identified in step 504 as satisfying the rule are then removed from the initial set of search results in step 508. Removal of a search result from an initial list of search results may be carried out in a manner similar to that described with respect to process 400 (FIG. 4).

In step 510, a modified set of search results (one which reflects the removal or resorting of the search results performed in step 508) is output to the user. As with process 400, the outputting of a modified set of search results may be accompanied by an outputting of an indication (e.g., either on the same page or tab as the modified set of search results or on a different page or tab of a web browser) of the removed search results. A user may thus be provided with a mechanism to add one or more removed search results back into a listing of search results. Further, in some embodiments, if a user is not satisfied with what is output as the modified set of search results the user may be allowed to modify or change the rule(s) (and/or value(s) of any customizable parameter(s) thereof) used to identify and remove search results in steps 506 and 504. In accordance with some embodiments, the modification may be to return the search element to a neutral value, reverse the first user input or make it a positive factor in the desired future output. If the user does so modify a rule, the process 500 may be rerun beginning at step 504 in accordance with the modified or new rule(s) or value(s).

It should be appreciated that both process 400 and process 500 allows a user to efficiently remove many undesirable results from a listing of search results without needing to go through an arduous and time-consuming process of removing each undesirable search result on an individual basis. A solution which would require the user to indicate each particular search result that is undesirable and simply remove the search result the user affirmatively selects as undesirable necessarily assumes the user will review each search result. Given the breathtaking magnitude of search results many searches return (e.g., as illustrated in the example search results of FIGS. 3A-3E), it is unrealistic to assume a user would have the time or patience for such a task. As described above, a user typically becomes frustrated when faced with a large number of search results and it is the rare user who has the time to spend reviewing each search result one-by-one. Solutions such as those illustrated in process 400 and process 500 allow a user to provide feedback on a few search results (selecting a few search results as being undesirable, based on, for example, a quick perusal of search results and flagging those that quickly jump out at the user as being undesirable), or simply provide a characteristic, rule or other indicator defining an undesirable search result and thus initiate a process which removes (or determines whether it is appropriate to remove) additional search results from a listing of search results based on the user's limited negative feedback and review. For example, assume a particular search returns 1.2 million search results and a user reviews the first two pages of the search results, with twenty (20) search results being listed on each page. Further assume that the user quickly identifies six (6) of the forty (40) search results as being undesirable (e.g., in accordance with process 400). An algorithm running in accordance with process 400 or a similar process may thus review the additional 1.1+ million search results and identify an additional 150,000 search results that are also undesirable based on the user's identification of the six particular search results. That is, significantly, 150,000 search results that may be removed from a listing of the search results that the user never had to review or flag as undesirable. The removal of these search results may significantly increase the user's chances of identifying a search result the user was previously unaware of and may have missed if the 150,000 "noise" search results had not been removed for the user.

It should be understood that processes 400 and 500 are merely examples of processes which may be implemented to effectuate some embodiments described herein. Described herein are various embodiments for strategies, processes, systems and interfaces which are operable to allow a search tool user better access and control over search queries and the results. The interfaces, processes and systems described herein, and the associated functionalities are search tool independent. Described herein are various examples for orders of operations search, applications of search modifying options over the current search results, options selections, application of modifications, the ability to "undo" or "redo" an applied option and the ability to repeat these sets in an iterative fashion as well as alternative ordering of the same functional operations. In accordance with some embodiments, a user may input a query through any acceptable interface, the search engine or a third-party service presents the search results and the user is presented with direct feedback options for the search results. A goal of at least some embodiments described herein is to provide systems, methods and interfaces operable to aid a user of a search tool to remove unwanted results or "noise" (or reorder results such that the unwanted search results appear lower on the list of search results), in an efficient manner (as opposed to enhancing, recording or using positive reinforcement as the only method of obtaining a better result). The search result modification options described herein comprise an effective means to reduce the noise and bring the more pertinent results closer to the top of the list while reducing or resorting the list sufficiently enough to allow for serendipity. The user is thus more likely to view or identify more pertinent knowledge and see information that they were unaware of prior to the application of the user modifications.

In some embodiments, the dynamically applied negative as well as potential positive feedback created by the user feedback interfaces described herein may be (i) stored to help future user searches, and/or (ii) tracked by a computer's location (URL) or a user login to better assist in future searches (of the same user and/or different users). In accordance with some embodiments, one or more of the user directed modifications can be added to the engines data base as it improves its own methods of searches in order to reduce "noise" or unwanted data and improve serendipity with the goal of a better user experience.

Another area where the current state of the art fails to provide true depth of knowledge is what is referred to herein as "the electronic library effect." The problem addressed by the group research embodiments described herein has been recognized (but not solved) on college campuses and highlighted now in an article printed in the University of Pennsylvania's newspaper, The Weekly Pennsylvanian, on Apr. 3, 2011. The article entitled "How the Internet Killed the Creativity" with the subtitle "Relying too much on search engines limits, rather than helps, our search abilities." the author, Sarah Banks, has further emphasized this unforeseen and unsolved problem. The article quotes also Nicholas Carr's article in the Atlantic magazine in 2008 on how skimming information on the web as opposed to deeper learning is making us all less intelligent. To make her point, Ms. Banks notes that web-based research is the norm on college campuses and this has had an unexpected negative effect on the papers produced by the students. She noted that when a paper on a given topic is assigned to a class, the students go directly to the web. They quickly search the topic and the modern search engines direct them to the most linked or most popular pages that match their query. The outcome of the simple application of being too good at providing these results in short order is that each student gets the same references, gains rapid access to those references and hence they all write similar papers. This is different from plagiarism but looks similar in outcome. If the students copied each other's work there would be an outrage but if the web's engines and algorithms corral them into similar results that is not fully recognized yet as a problem in learning that is need of a solution. Ms. Banks' article is evidence that even the students themselves are beginning to recognize the limits of search engines and the pitfalls within the current state of the art. This is a relatively new phenomenon and is what one could term "the electronic library effect." More modern "plagiarism programs," that are used to find "copied" work, further this issue in that given all the students have similar sets of search based references they will trigger a plagiarism flag more often as the sentences created in these student written work are more likely to have greater similarities the larger the class size.

"The electronic library effect" was not seen in the prior era of the physical library nor is it the expected outcome in the modern electronic library (the web) based on having the terabytes of knowledge at the students' fingertips. If we ask why this phenomenon did not happen in the conventional library system, we are pointed to two factors. First, the physical requirement of being able to take a book out and read it meant that not all the students can have the same book at the same time. The access to the same materials at the same time is entirely possible, if not extremely likely, on the web. In fact, this effect according the Banks article based on the University of Pennsylvania experience has become the rule not the exception. In contrast, in an old-fashioned physical library, faced with the challenge of not being able to get the book one wanted from the library the students were forced to look at a wider group of materials. They may have had to thumb through a number of books and articles to find something of value to write about. In the physical library, serendipity was the rule not the exception. With limited access to the most popular materials, there was no "electronic library effect." The result was a wide variety of papers from one assignment. Here again is the search engine paradox. With more information available to all, there is less variety in the discoveries made by a group of independent researchers.

Applicant has identified a solution to the "electronic library effect" in some of the embodiments described herein. Applicant has recognized that there is new and unique value in the ability for researchers to affirmatively remove a very popular result (and all similar results) from a search or from a listing of search results output to researches for a given research project. The idea that removing a popular reference or result from a search to create a better if not a more interesting result while increasing serendipity is counter intuitive. Here the ability to negatively influence a search result by removing popular information actually has a net positive benefit to the user. This unexpected result, especially given the power of the current search engines, is something that is not obvious to the current users or designers of these engines and their associated algorithms. An electronic search strategy that allowed groups to be aware of, or limit, the simultaneous use of materials could, again in a counter intuitive way, decrease duplication of work, reduce the "electronic library effect" and improve the collective research effort.

At least some embodiments described herein help reduce the "electronic library effect" by allowing the user to remove a popular result from a search with the same technology and ease used to remove the unwanted results as described above with reference to individual searches. Such a feature would force a search tool to look deeper into a topic for relevance and a user would experience more serendipity by making this choice. Thus, described herein are embodiments for enhancing a group search project (a search project involving a plurality of users who are tasked with or express interest in researching a specified topic).

Accordingly, some embodiments create the ability, in a class or group of user such as students in a given class, users associated with a given location, or other defined group of users, to share in the process of selecting and deselecting one or more search results from a listing of result results. This would increase the chance that each student could discover something new. This would in turn reduce the "electronic library effect" and increase access to and the benefit of the terabytes of data on the web that current search engines are unintentionally making less available to the users today.

In accordance with one embodiment, a search engine or another component (software or hardware) operable to communicate with the search engine may be operable to track and/or record an identified user group (for example a class taking a given course or working on a particular assigned research project) and inform the students of information such as how many of their classmate have picked a reference. This allows a given student, if desired, to remove one or more references from a listing of search results returned to him or her for a search in order to more easily identify and consider what has not been picked yet. Such embodiments may create a working environment for teams working on joint research projects which allows for a reduction in duplication of effort applied during the research.

In accordance with some embodiments, the input or feedback that one or more uses of an associated group of users may provide includes but is not limiting to (i) the hit or click through count next to each search for (within) the designated research group, (ii) an identifier of each group member working on a given search result, and/or (iii) time spend on each result as a method of evaluating the current status of the project and aid in the selections or time spent on each result as the project moves forward. For example, in one embodiment a hit count indication may be provided in or next to an area of an interface for allowing the user to indicate which results are unwanted or undesirable (e.g., a red box next to each search results in accordance with one embodiment). In another example, in one embodiment a time clock indication and/or an indication of initials or researcher code number may be similarly output.

In accordance with some embodiments, a professor or other user designated as a leader, manager or controller of a group may be provided with a means of setting a value for one or more parameters defining a group search project. For example, such a group manager may be provided with a mechanism for limiting the time spent on a given reference (e.g., by a single user or by multiple users combined) and/or number of users who may view or be provided access or a link to a given reference or search result. In some embodiments, such a group manager may also be provided with a means of monitoring a research project and during the course of such a research project be allowed to adjust or change a value for one or more such parameters.

Figure 6:
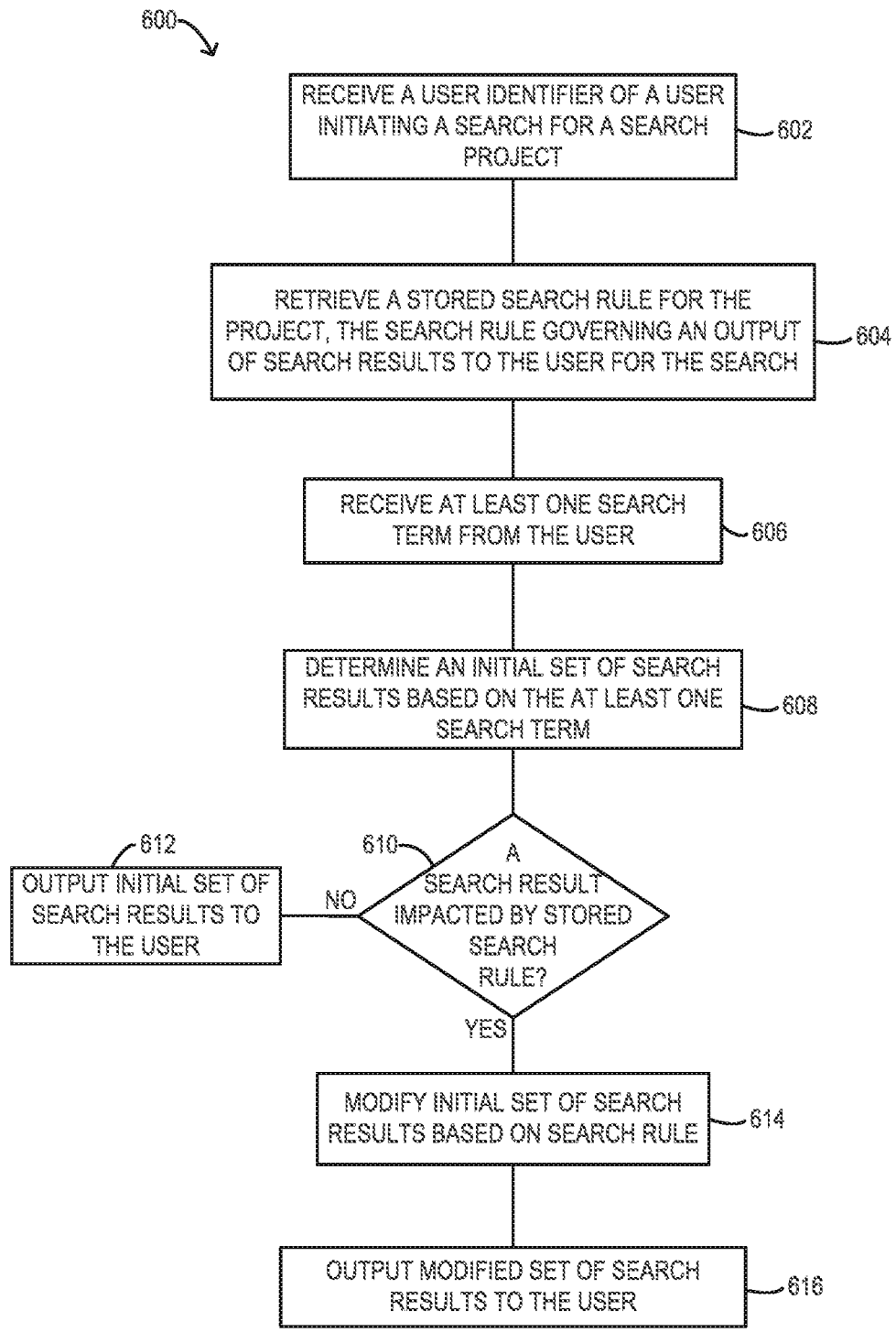
FIG. 6 is a flow diagram illustrating a process which may be performed in accordance with some embodiments described herein.

Referring now to FIG. 6, illustrated therein is a process for facilitating a research project of a group in a manner that aims to minimize the electronic library effect described herein. More specifically, illustrated therein is a flowchart of a process 600 consistent with some embodiments described herein. It should be noted that process 600 is exemplary only and should not be construed in a limiting fashion. For example, additional and/or substitute steps to those illustrated may be practiced within the scope of the present invention and in one or more embodiments one or more steps may be omitted or modified. In one embodiment, the process 500 is performed by a search tool server 112, 114 or 116. Alternatively, process 600 may be performed by a third party server 118 and/or a software application residing on or otherwise utilized by (e.g., using cloud storage technology) a user device of a user requesting the search.

A user identifier of a user initiating a search for a search or research project is received in step 602. For example, a username, a user e-mail address, a unique user identifier and/or user password may be received. In some embodiments, a research project identifier may also be received. In other embodiments, a research project identifier may be determined based on the user identifier received. For example, in some embodiments (whether process 600 is being performed by or in association with a search tool that is available to the general public (e.g., the GOOGLE search engine) or by a private search tool or on a private system or database utilizing the features described herein), a user who is a participant or member of a group research project may be able to access a web page or interface of the search tool that is designed for searches associated with registered research projects. Such an interface may provide an input mechanism for entering the user identifier and/or project identifier. A person who is a research project manager may have previously registered a research project (and, e.g., selected or been assigned a unique research project identifier for the project). In some embodiments, the project manager may have input the user identifiers of all users associated with the project. In other embodiments, association of a user with a registered research project may be dependent on a user registering himself with the research project (e.g., users can search for and select available projects to join or may have been provided a research project identifier and/or password by the project manager in order to register themselves with the project). However the association of a user identifier with a research project came about, the user identifier is utilized to retrieve from a memory (e.g., from a database of registered research projects and their associated information) a research project for which the user is initiating a search. In other embodiments, a project identifier is received in step 602 in lieu of a user identifier.

In step 604 a stored search rule associated with the research project is retrieved (e.g., from a record of a database storing information on registered research projects). The search rule comprises a rule for governing an output of search results to one or more users requesting searches for the research project. For example, a rule may define one or more search results that are to be removed from a listing of search results returned for a search based on search terms provided by the user, the removal to be applied before the listing is output to the user. In such embodiments, a such a rule may thus be thought of as a rule which defines disallowed search results for a particular research project. In another example, a rule may define information that is to be output to a user for a given search result returned to the user for a search conducted in accordance with search terms supplied by the user (e.g., a number of times a particular search result has been output to other users associated with the research project).

In some embodiments, a value may be associated with such a rule. The value may in some embodiments be a fluctuating or dynamic value that is updated based on searches performed by users associated with the project. A rule may be selected or provided for association with a particular research project by the project manager (e.g., a professor of a course). In other embodiments, one or more users may select or provide such a rule. More than one such rule may be associated with a given project. In some embodiments a rule may be applicable to all users associated with a given project. In other embodiments, a rule may be associated with only a subset (e.g., one) user of a plurality of users registered with a project. In some embodiments, a rule may be personal to a particular user such that the rule may not necessarily be associated with the project but may be associated with a particular user who is in turn associated with the project.

In one embodiment, a rule comprises at least one characteristic defining at least one search result to be removed from a set of search results output to a user of the search group other than the manager, such that any search result having the at least one characteristic is removed from a set of search results output to a user of the search group other than the manager. Another example of a rule comprises disallowing search result comprising the highest ranked search results (e.g., determined to be the most relevant to a search by a search tool using the search terms supplied by the user) or most popular search results (e.g., most popular among the users associated with the particular research project). Yet another example of a rule comprises defining a maximum number of times one or more search results is to be included in sets of search results for the search project, such that a particular search result is to be considered a disallowed search result once the particular search result appears in sets of search results for the search project the maximum number of times.

As should be understood from considering the above description of rules for governing the output of search results, some embodiments provide for the tracking of sets of search results output to users associated with a particular research project (e.g., by a search tool, third party service). Such information may be utilized to update a value of a parameter of a rule. Additionally, some embodiments provide for outputting to a user associated with a given research project an indication of information regarding searches (and search results) of other users associated with the research project. Examples of such information which may be tracked, utilized to update values of rules and/or output to users include, without limitation, for a given search result: (i) a number of instances in which the search result has been included in a set of search results output to the users of the search group; (ii) a duration of time a single user of the search group has spent reviewing a content of the search result; (iii) a total duration of time all users of the search group who had the search result output to them in a set of search results reviewing the content of the search result (e.g., an average duration based on a total number of users to whom the search result has been output in a set of search results); and (iv) a number of instances in which the search results has been selected by a user of the search group.

In step 606, at least one search term for a search of data, the search being associated with the research project, is received from the user. It should be noted that in some embodiments step 606 may be performed prior to step 604 (or even prior to step 602).

In step 608 an initial set of search results is determined based on the at least one search term received in step 606.

For example, a search tool may perform a search of a database of indexed information based on the search term(s). In step 610 it is determined whether any of the search results determined in step 608 are impacted by the rule(s) determined in step 604. For example, each search result of the initial set of search results may be compared to the parameters and values of each rule associated with the research project to determine whether it satisfies or falls within the rule. If none of the search results of the initial set of search results are impacted by the rule (e.g., none of the search results are defined as disallowed search results by a rule and/or there is not tracked information to output to the user for any of the search results), the initial set of search results is output to the user without modification in step 612. Otherwise, the process 600 continues to step 614 wherein the initial set of search results is modified based on the one or more rules impacting it. For example, if one or more search results are defined as disallowed search results by an applicable rule, such disallowed search results are removed from the listing of search results. In another example, if there is information tracked and stored for a given search result (e.g., how many times the search result has been output to or selected by other users associated with the research project), such information is added to the initial set of search results (e.g., text conveying the information is added to a listing of search results, in association with the relevant search result to which it pertains). In step 616 the modified set of search results is output to the user.

Process 600 is merely one example process of how embodiments described herein may be applied to remove selected popular or wanted results (or add pertinent information regarding the popularity of wanted or popular or wanted results based on other users' activities), at the user's or project manager's discretion and direction, to reverse the so called "electronic library effect." In this way, at least some of the embodiments may facilitate a new counter-intuitive strategy or method of gaining access to less accessible data. One or more embodiments specifically simplifies the process of removing results so that this unique method of indirectly improving search results by removing desirable results would be available to even the least experienced researcher.

For example, as described above, some embodiments would allow, through a login, location or common set of URLs (for a school, college or university network), a group or class of students to be made aware of the results others have used, selected or been made aware of. A group and a group leader or monitor could be identified via a login embodiment. The leader or monitor could have access to the group's activity and the option to limit access to popular results as a method to encourage deeper or expanded research. This would have particular value to those trying to look deeper into a topic, experience more serendipity and find less common or more unique points of view. The strategies and processes described herein may also be applied to a group working on the same project simultaneously in order to reduce duplication of work.

Turning now to FIGS. 7 through 14, illustrated therein are various example interfaces, input mechanisms and applications useful in conjunction with any search tools (e.g., search engines or algorithms), whether currently available or yet to be designed. The interfaces and its functionalities are search tool independent. The features and functionalities described herein can be dynamically applied as the user adds information about the search in the simplest form possible (a click box or a feature which allows a user to "swipe" an unwanted search result away by swiping it in a first direction on a touch screen). This provides the user instant feedback on the modifications, creating a new user experience.

In accordance with some embodiments, the features and functionalities described herein may also operate in a way to apply the search modifications in a group of users, whether it be as a group of users collaborating on a research project (e.g., in embodiments such as described with reference to FIG. 6) or a group of users collaborating on a personal, casual or socially-oriented search (e.g., to find a mutually agreeable, movie, restaurant or travel destination). Some embodiments comprise a simple interface for allowing a user to provide feedback on a search result (single click box with dynamic application). Other embodiments provide for a more complex interface for allowing a user to provide feedback on a search result (slide bar valuations and group or batch application of the user modifications). The order of operations search, application of search modifying options over the current search results, options selection, application of modifications, the ability to "undo" (e.g., by swiping in a second direction, the first direction having been to remove the search result or indicate it as unwanted) or "redo" an applied option and the ability to repeat these sets of steps in an iterative fashion as well as alternative sequences of the same functional operations are contemplated.

In accordance with one embodiment, the user inputs one or more search terms for a search through an available interface, the search tool presents the initial results and the user is provided with simple and easy to use user feedback options. These options are used to better define the search, reduce the unwanted results or "noise" and bring the more pertinent or desired search results closer to the top of the list. A goal of at least some embodiments described herein is to reduce or reorder the list sufficiently to allow for serendipity, the viewing of pertinent knowledge the user was unaware existed prior to the application of the user modifications. In some embodiments, the negative as well as potential positive feedback created by this novel user feedback interface may be stored to help future searches; it may be tracked by a computer's location (URL) or a user login to better assist in future searches (of the same user and/or other users). A location or group login feature could be used to allow users associated as a group to have knowledge or indication of the other group members activity, to remove others' favored results in the research process to avoid duplication of results with a group or class of uses (in a research project embodiment, such as described with reference to FIG. 6) and/or to have the system combine the users' inputs to generate a modified list of search results that takes into account the individual users' indications of unwanted search results (in a socially-oriented search, such as described below). The user directed modifications can be added to the search engines and other search tools processes as an improvement of methods of searches in order to reduce "noise" or unwanted data and improve serendipity with the goal of a better user experience.

In some embodiments, a determination that a user has provided a first input for a given search result (e.g., indicated it as wanted) and then modified it to be a negative input (e.g., indicating the same search result as unwanted), or vice versa, may in itself be a data point or user input that is taken into account by the system or algorithm to help determine which of the remaining search results on a list a user may want or not want to see. For example, positive feedback and revision of such feedback (e.g., particularly if its dynamic or on the fly as the user is first reviewing a list of results) may be used to supplement, compliment or combine with other input or data that the system is utilizing to modify a list of search results. The revision by a user of his/her input may serve as an indicator of the user's subconscious thoughts or desires in a search and may provide the system additional data that may allow for better analysis for removing or reordering search results of an initial list of search results and/or subsequent outputs of modified versions of the list.

The example embodiments of user interfaces illustrated in FIGS. 7 through 14 include some examples of mechanisms for allowing a user to provide input or feedback regarding one or more search results. Another example of a type of input mechanism includes a "swipe" option on touch screens of user devices, which may allow a user to swipe a result in a first direction (e.g., left or up) to indicate a wanted search result or output or swipe in a second direction (e.g., right or down) to indicate an unwanted search result.

It should be noted that although the example interfaces and input mechanisms illustrated use graphics, text and other display mechanisms, other mechanisms are contemplated. For example, in one or more embodiments search results and/or user input or feedback on one or more search results may be exchanged via audio (e.g., a user can speak into a microphone of a device providing the search results in order to provide input or feedback on the search results).

Figure 7:
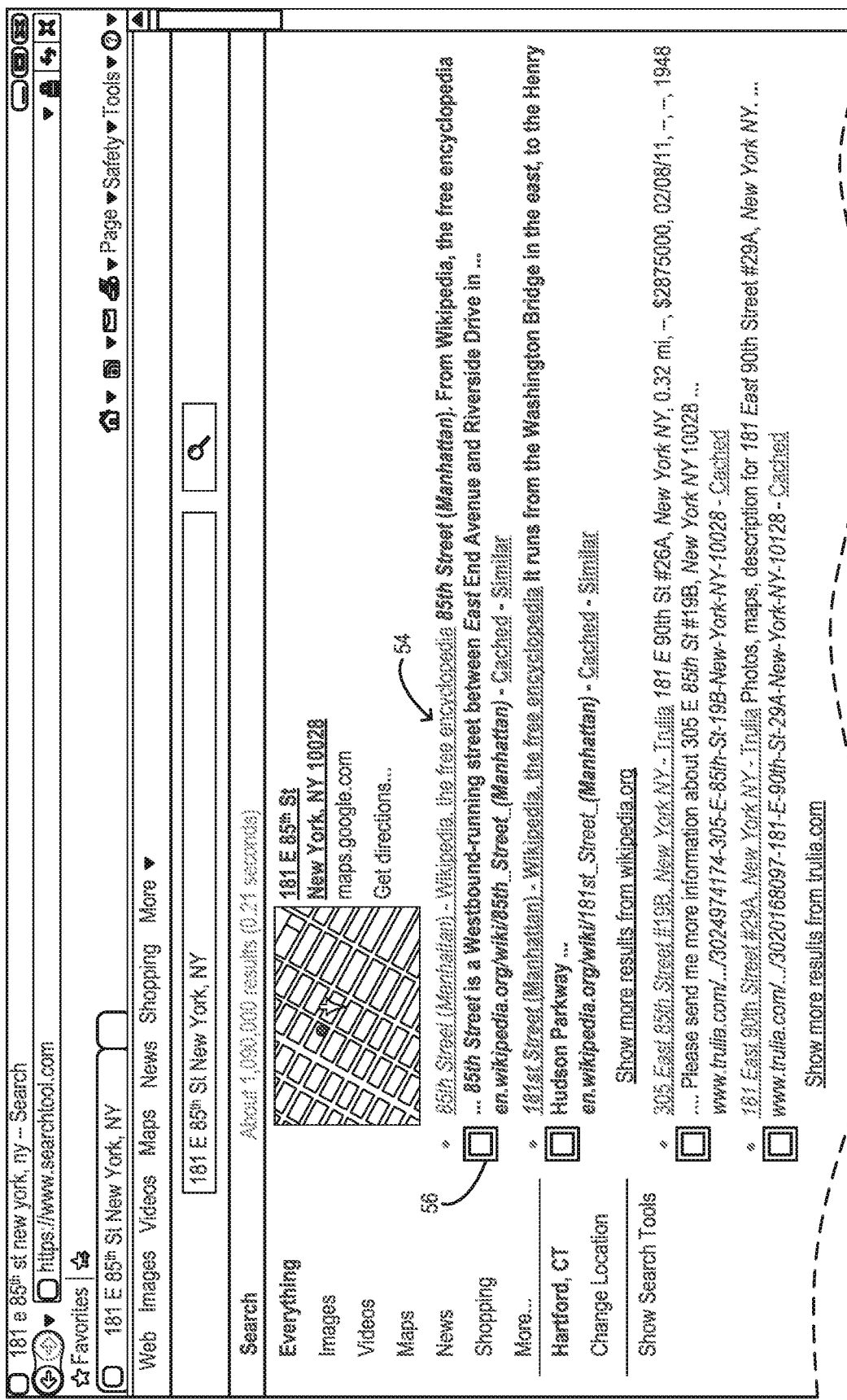
FIG. 7 is a diagram of one example interface, consistent with some embodiments described herein, via which a user to whom a set of search results is output may indicate undesirable search results to be removed from the set of search results.
Figure 8:
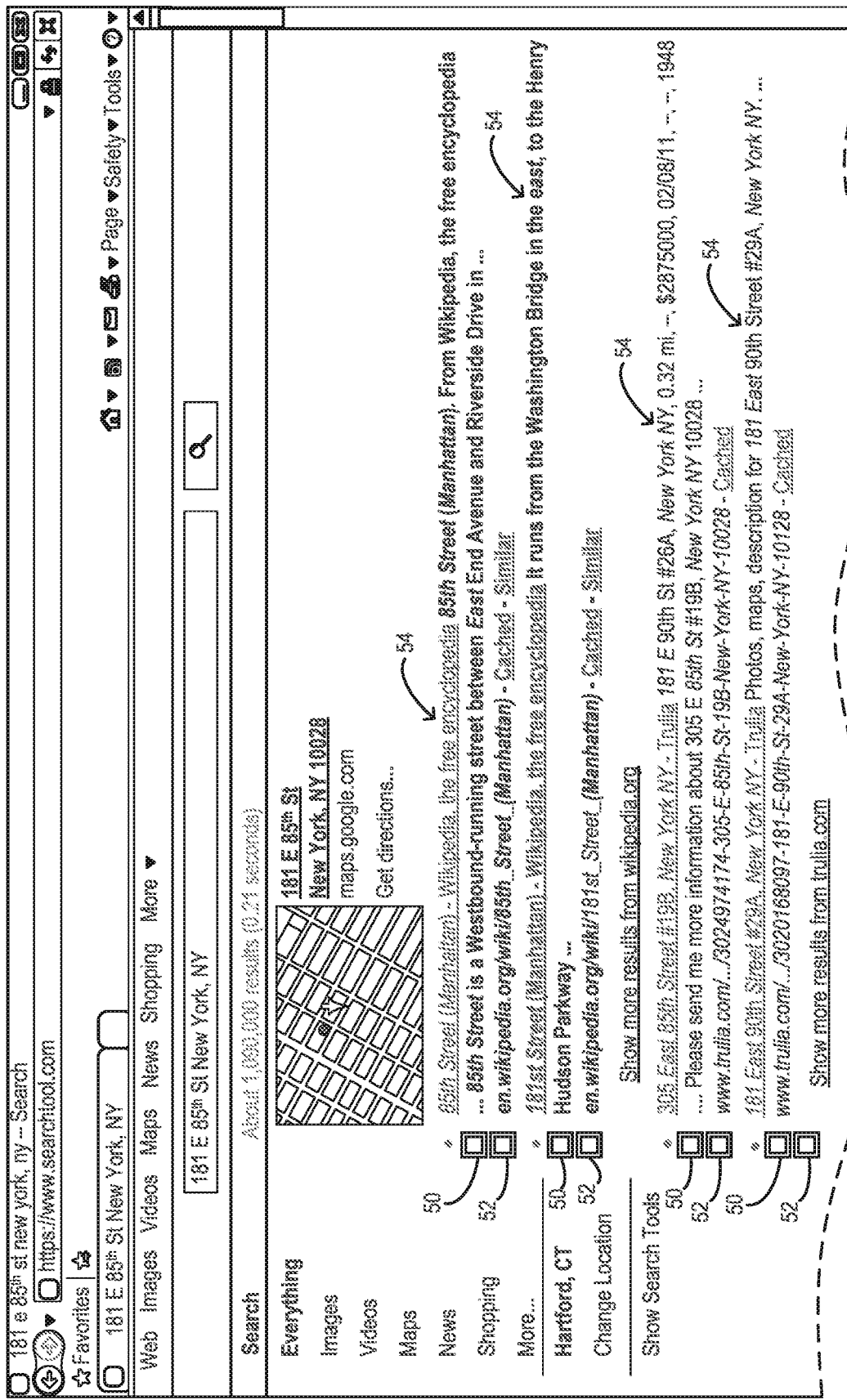
FIG. 8 is a diagram of another example interface, consistent with some embodiments described herein, via which a user to whom a set of search results is output may indicate undesirable search results to be removed from the set of search results.

Illustrated in the example embodiment of FIG. 7 is single radio button (56) input mechanism associated with each respective search result (54). The user may click the radio button on or off as desired to flag a particular search result 54 as undesirable (e.g., the search result may be flagged as undesirable by clicking the radio button on). Illustrated in FIG. 8 is an interface which provides two buttons, 50 and 52, which may in some embodiments each be in a different color or other distinct configuration, for each search result 54. For example, a green or positive button (50) may be provided for flagging an associated search result as particularly desirable and a red or negative button (52) may be provided for flagging an associated search result as undesirable. In some embodiments the input mechanisms 50 and 52 may comprise plus or minus signs or any simple indicator that relates a positive or negative feedback as the language or culture of the user dictates in order to make their purpose clear. These may be applied over or next to the search results.

Figure 9:
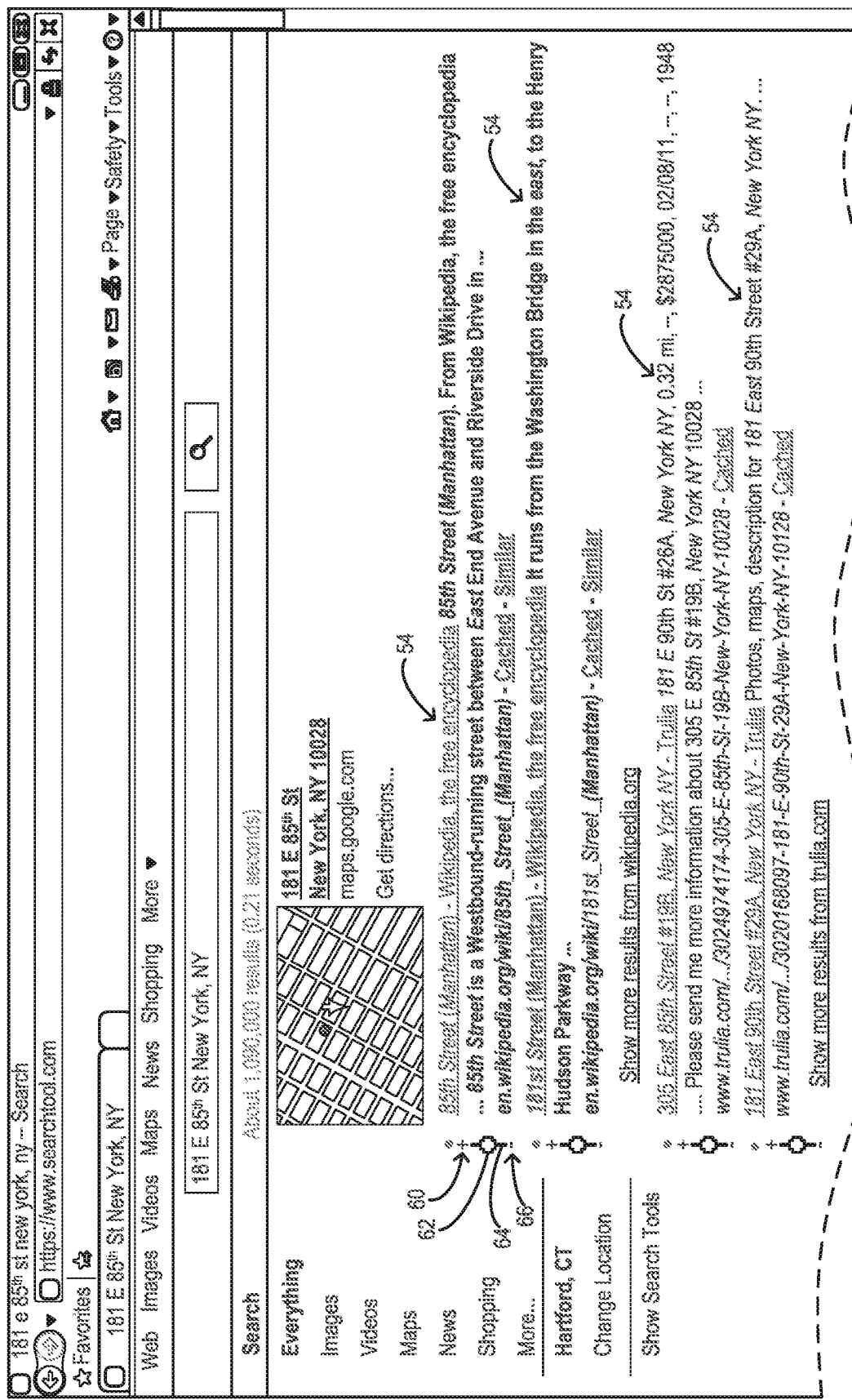
FIG. 9 is a diagram of yet another example interface, consistent with some embodiments described herein, via which a user to whom a set of search results is output may indicate undesirable search results to be removed from the set of search results.

It should be understood that embodiments contemplated are not limited to one or two button options or binary user feedback options; in some embodiments a user may be provided with a mechanism of providing input or feedback on search results that allow the user to select one of any number (e.g., a number greater than two) of feedback or input options, ratings or values for a given search result. For example, any number of buttons may be defined to add in the search definition. Illustrated in the embodiment of FIG. 9 is one embodiment in which a variable positive or negative attribute is applied to each individual search result via a slide bar (62) on a line (64). Then ends are denoted as top (+) (60) and bottom (−) (66) and could be embodied, for example, as color coded (green/red) or symbol driven as the language or culture of the user dictates. In this way the search tool can be supplied with a relative input as to the user's valuation of each of the individual search results (or for whichever search results the user desires to provide feedback).

Figure 10:
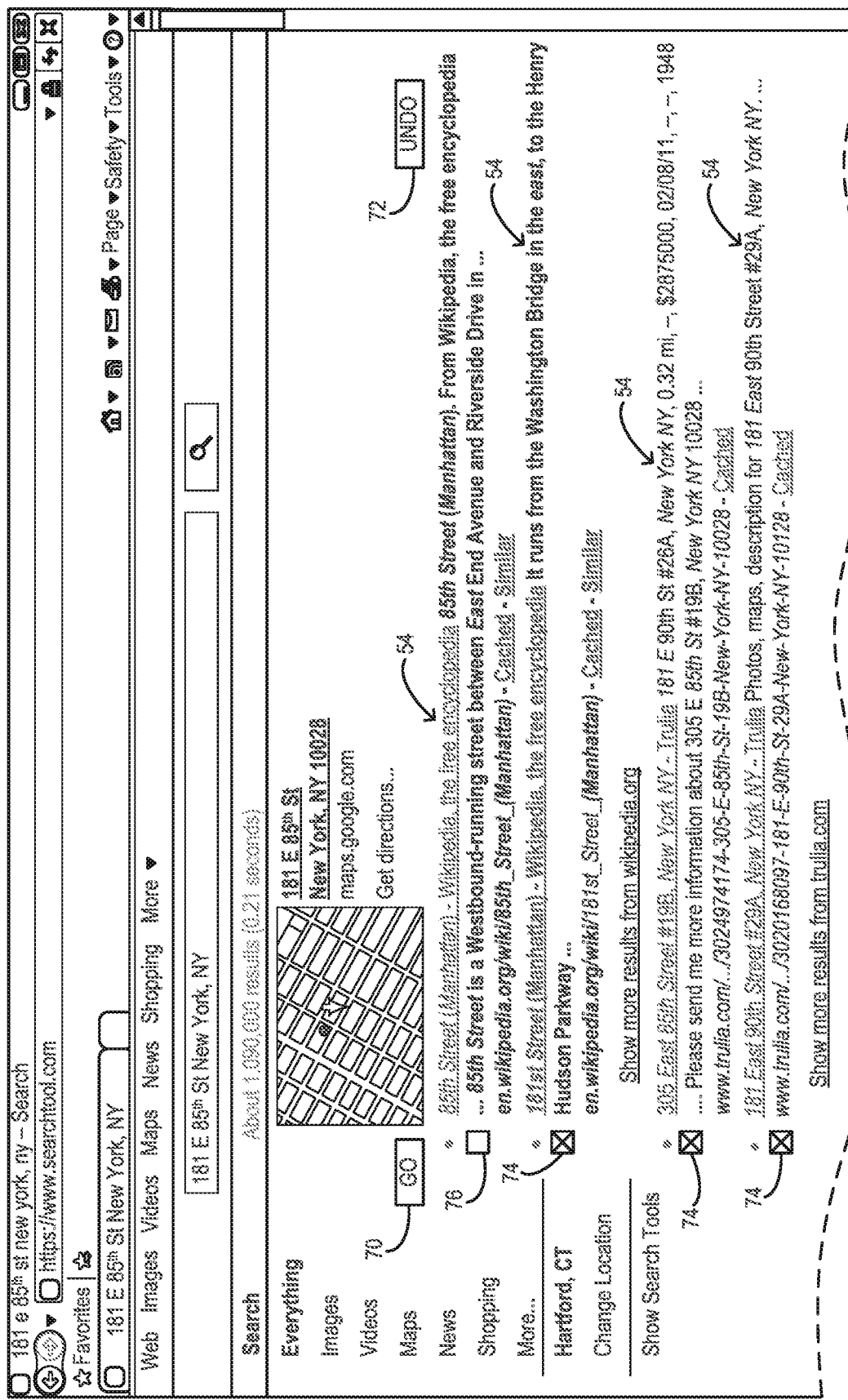
FIG. 10 is a diagram of yet another example interface, consistent with some embodiments described herein, via which a user to whom a set of search results is output may indicate undesirable search results to be removed from the set of search results.

Illustrated in the embodiment of FIG. 10 is a check or "x" box embodiment of the user feedback option with an activation method (70) as shown via a "go" box as well as a "undo" box (72) for allowing the user to affirmatively direct the application or activation of the search result output modification features described herein. Of course, other input mechanisms may be utilized (e.g., a user may be allowed to "Swipe down after reaching the top of the search on a mobile device"). In the embodiment of FIG. 10 is also a check box nest to each search result. In one embodiment, if a user clicks or selects a check box next to a particular search result, the user is so indicating that the result is undesirable. If the user leaves the check box blank or unselected, the user indicates the associated search result is desirable. Thus, in FIG. 10, the blank or "un 'x'ed" check box 76 indicates an acceptable result and the check box with an X in it (74) indicates an undesirable search result. The reverse definition of these boxes is contemplated or other symbols (and other words such as apply or remove) as culture and language of the user should dictate the preferred communication method for this feature.

Figure 11:
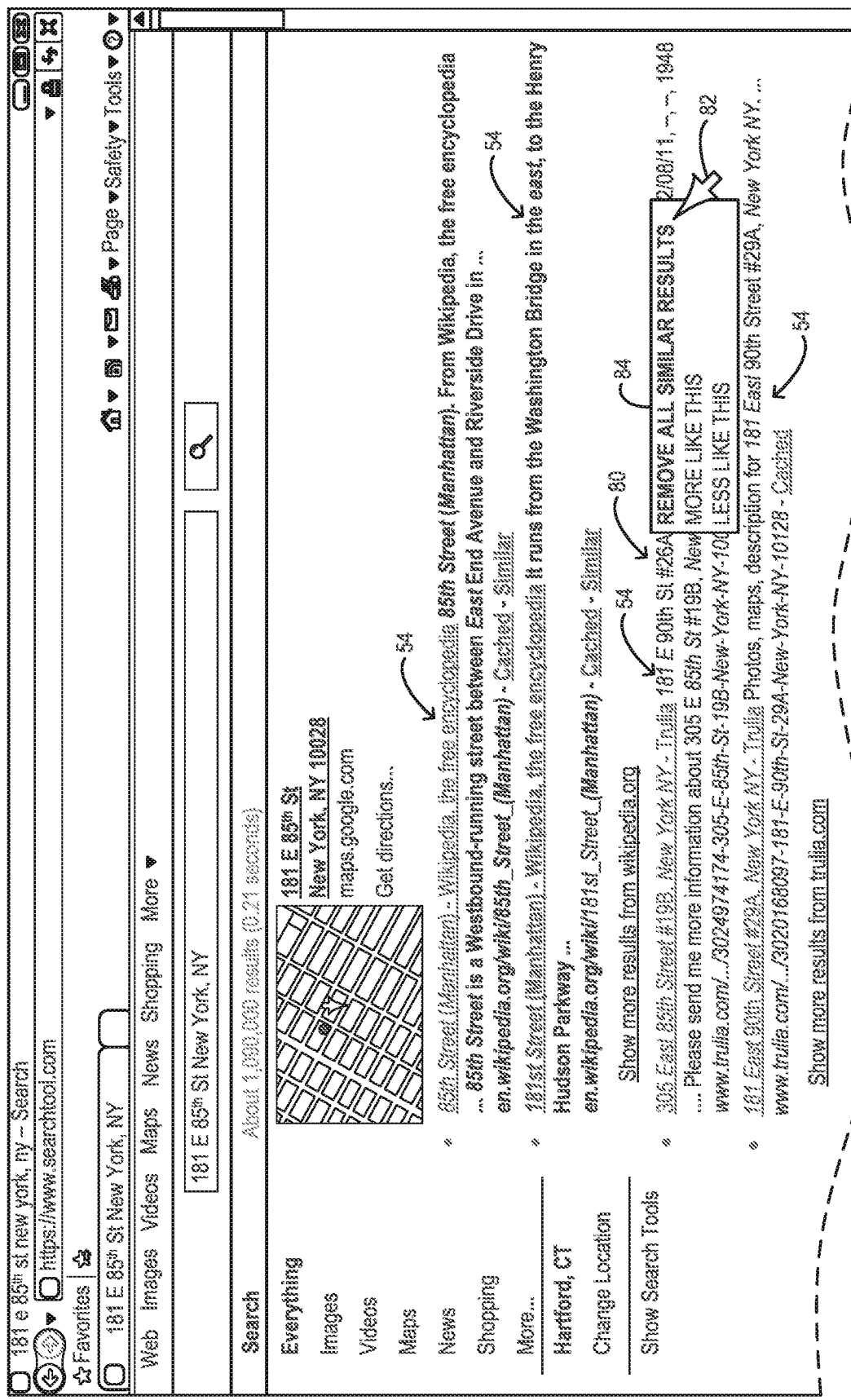
FIG. 11 is a diagram of yet another example interface, consistent with some embodiments described herein, via which a user to whom a set of search results is output may indicate undesirable search results to be removed from the set of search results.

Illustrated in FIG. 11 is another embodiment in which the highlighted area (80) indicated, which may comprise a particular search result or portion thereof, may be used by a processor operable to implement one or more of the functions described herein in a positive, negative or relative way in order to modify the search by moving an arrow or other icon (82) over the desired action within a pop up type menu. In this embodiment a mouse click, double tap, multi-finger tap, control click or other differentiating selection on the highlighted area (80) opens a dialog box or drop down menu (84) containing options for the evaluation or use of the selected area in the search modification.

Figure 12:
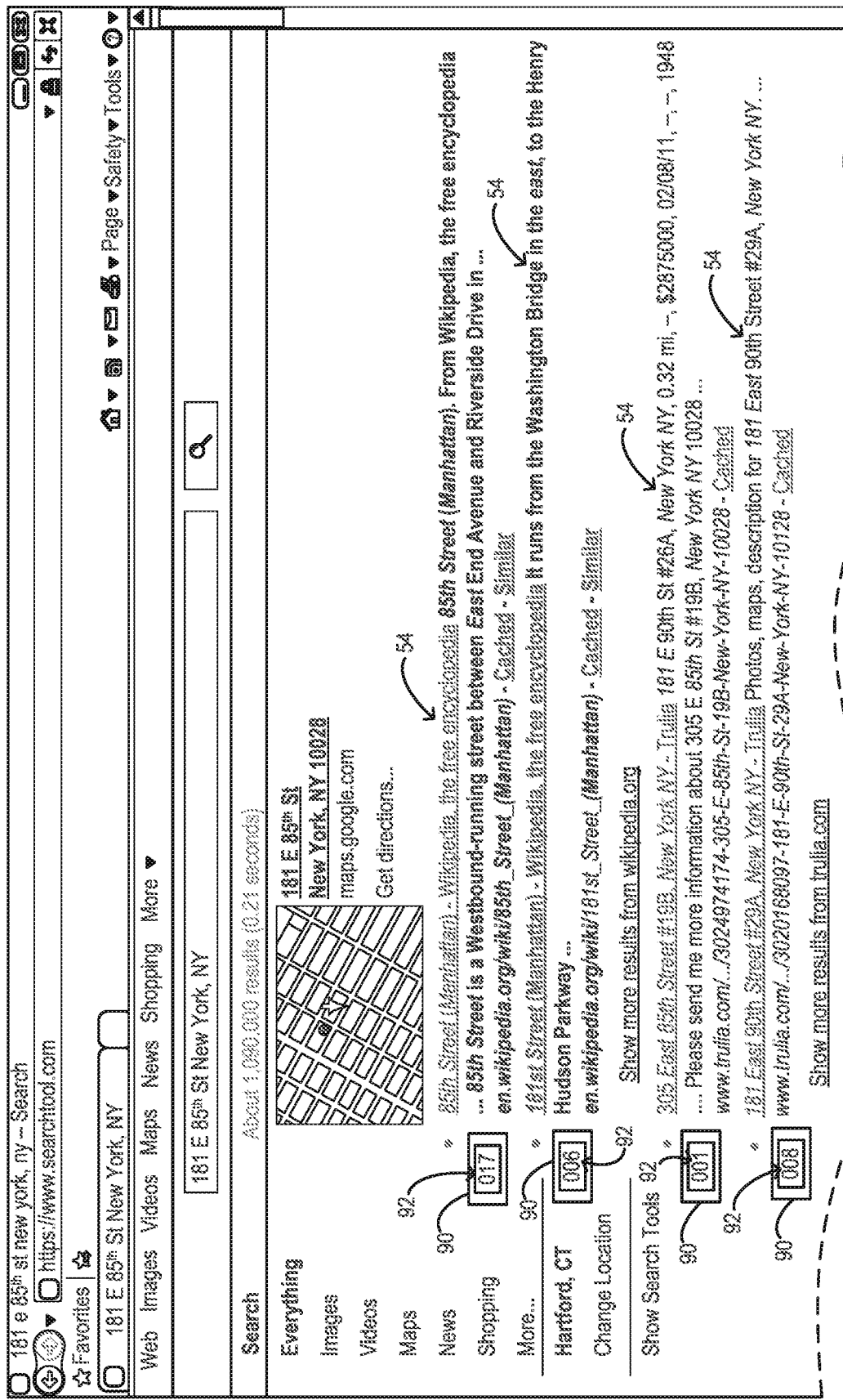
FIG. 12 is a diagram of yet another example interface, consistent with some embodiments described herein, via which a user to whom a set of search results is output may indicate undesirable search results to be removed from the set of search results.
Figure 13:
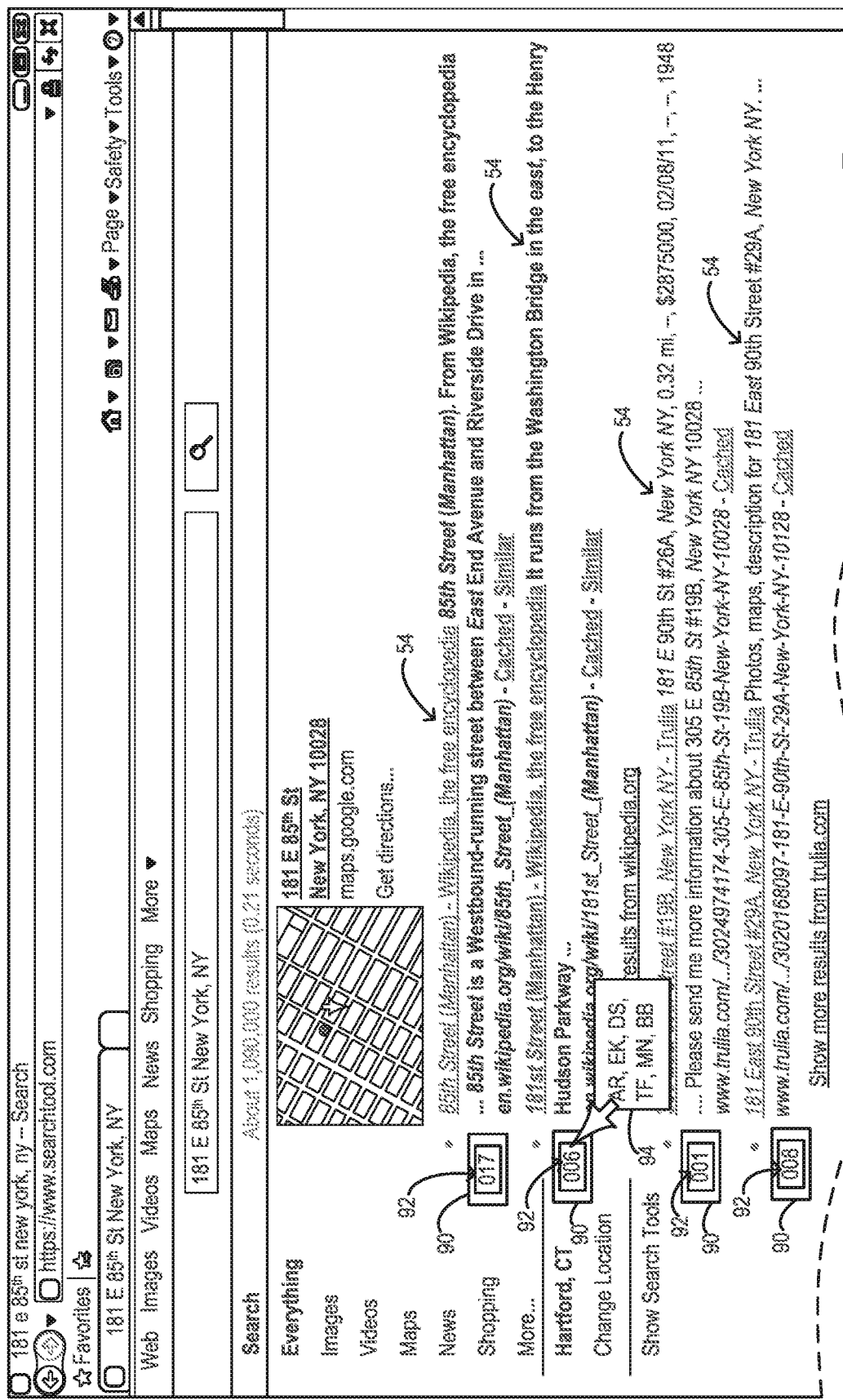
FIG. 13 is a diagram of yet another example interface, consistent with some embodiments described herein.
Figure 14:
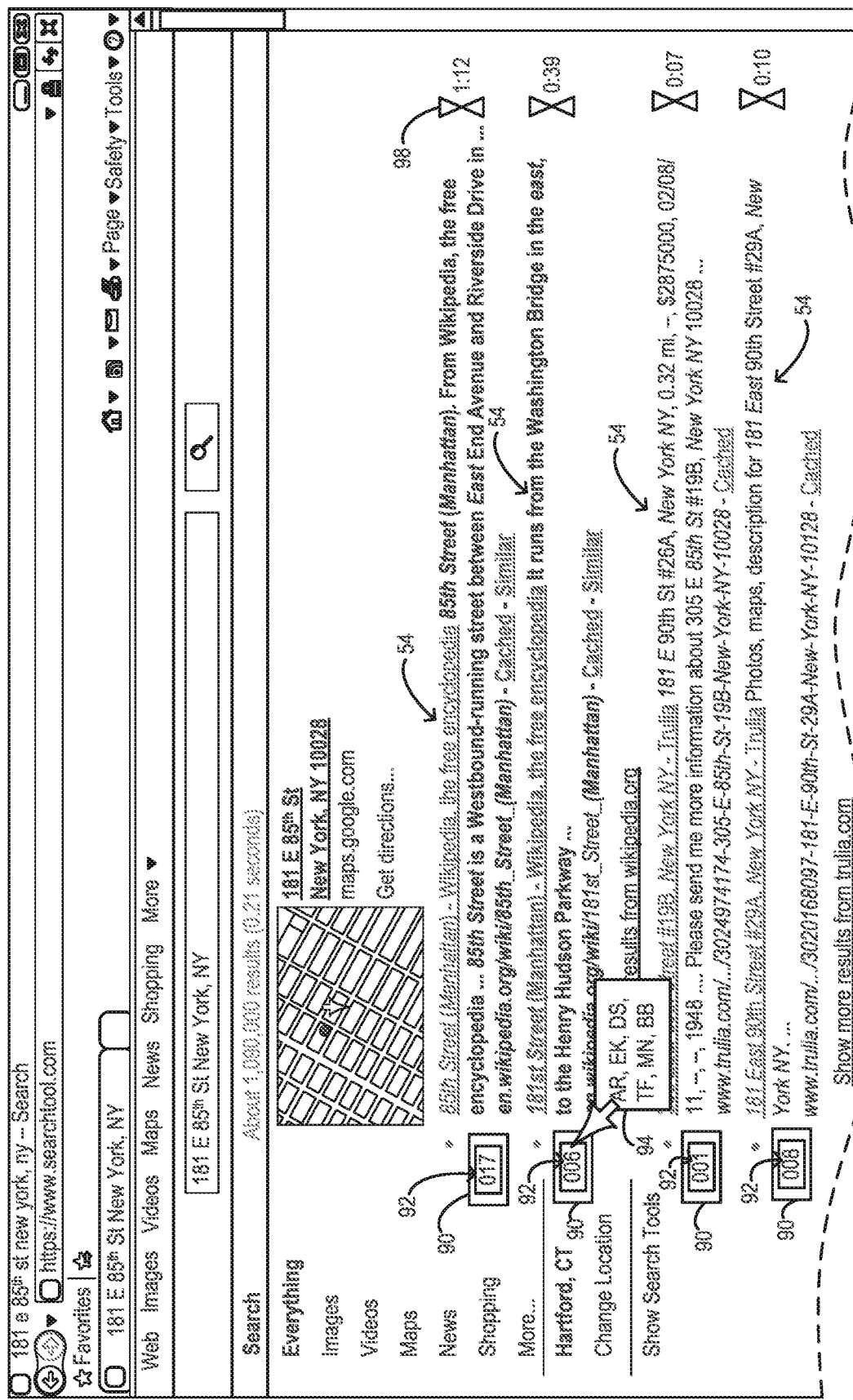
FIG. 14 is a diagram of yet another example interface, consistent with some embodiments described herein.

The example interfaces illustrated in FIGS. 12-14 are directed to group research embodiments, such as the one described with reference to FIG. 6. FIG. 12 illustrates an example embodiment of user directed feedback options to search results in which a user is provided with a mechanism comprising a single button (90) associated with each search result, which button the user may click to indicate that the associated search result is undesirable. Within each button 90 is indicated a hit count (in area 92 of each button) for the associated search result as viewed by the designated user group during a search (e.g., upon review of the group manager or as an end of project summary). A hit count may comprise, for example, a number of times the search result has been output in a listing of search results to any user associated with the particular research project.

FIG. 13 illustrates another example embodiment in which user directed feedback options to search results are presented as single buttons which may be clicked on to indicate undesirable results. As in FIG. 12, within each button 90 is the hit count 92 for the search result as viewed by the designated user group during a search (e.g., upon review of the group leader or as an end of project summary). Additionally, illustrated is a mouse-over or pointer element 94 which indicates an identifier of each user of the group or associated with the research project who is also associated with the particular search result (e.g., it may indicate the initials or user identifier of each user to whom the search result was output to who selected the search result for viewing). Such an interface may allow the users associated with a particular research project or a group manager to see the activity associated with a particular search result, as well as who is working on a particular part of the project at a given time. The identifier(s) indicated in area 94 are not limited to individuals; they may comprise identifiers of a class or group or people, a team or location as part of a larger group.

FIG. 14 illustrates another example embodiment in which user directed feedback options to search results are presented as single buttons which may be clicked on to indicate undesirable results. Within each button 90 is the hit count 92 for the search result as viewed by the designated user group as viewed during a search. As in FIG. 13, there is a mouse-over or pointer function 94 for indicating user identifiers of individual users or groups of users associated with each search result. Additionally, there is provided for each search result an icon or indicator 98 for the total time spent viewing or considering a search result (which may serve as an indicator of the usefulness of the search result). For example, if a first search result has associated therewith a single hit and 8 minutes spent on it while another search result has associated therewith eight hits and only a total of 10 minutes spent on it by all viewers who considered it, this may be valuable information to a user (or project manager) as to the relative value of the information being reviewed by the group). In another example, if 6 people spent 12 minutes on one item and another item has 24 hits and a total of 3 minutes, it would imply the first reference was found to be more valuable to the group, information which may be valuable to a user reviewing a listing of search results and attempting to identify the most valuable or pertinent search results.

Of course, other interfaces for allowing a user to indicate one or more results as undesirable are within the scope of the embodiments described herein and the examples described are intended to be illustrative and non-limiting. For example, a "finger swipe" interface may be utilized in which a user "swipes away" a result he considers undesirable by using his finger to move it to the left or right (off the screen or onto a side bar of a screen). For example, the user may swipe a search result in a first direction (e.g., left) to indicate that it is unwanted or undesirable and swipe a search result in a second direction (e.g., right) to indicate that it is wanted or desirable and/or to undo a prior indication of undesirability.

Turning now to FIGS. 15A-15D, illustrated therein are example interfaces of prior art search tool results, useful for illustrating at least one problem solved by some additional embodiments described herein. As described herein, Applicant has recognized that often a search requested by a user yields a list of search results in which at least one item in the list, although technically matching or being relevant to the search term(s) or search string input by a user or received from a user device, is not helpful to what the user is searching for and comprises a result that is not wanted, appropriate or desirable. For example, the search term(s) or search string input by the user may comprise a functional synonym, phoneme or other type of text that has one or more meanings in different fields of use or even common usage. Taking the initials "PE" as one example of this problem, Applicant notes that these initials can mean at least one of the following: Physical Exam, Pulmonary Embolism, Price to Earnings ratio in stocks, or even Permanent Establishment. Simply removing a term with multiple possible meanings or contexts, such as "PE", from a search for the meaning of PE would result in wanted search results as well as unwanted search results being removed or not being included in a list of search results.

Applicant has recognized that a search for search results technically relevant to a search term that has multiple possible meanings or contexts may be improved (i.e., result in more meaningful, relevant or wanted search results) if the search term is used in combination with other terms that provide more context for the term and thus allows a search engine to provide search results that the user is actually interested in. At times, in the current search technologies commonly used, this may prove difficult or challenging for an average user. For example, in the "PE" example, Applicant has recognized that removing the unwanted "PE" search results may yield a remainder of search results that are desired or, as an alternative, providing one of the PE context terms in a search string in combination with "PE" would yield a singular group result. Unfortunately, currently available search tool methodologies do not provide users with an efficient and easy-to-use mechanism for focusing a search such that unwanted or undesired search results are removed or excluded from either an initial list of search results or ranked lower on a list of search results (such that a modified list of search results is generated by either shortening the initial list to not include undesired search results or resorting the list such that undesired search results appear lower on the list) or to re-run a search to generate a more focused list of wanted or desired search results (e.g., based on a new search string that is suggested or generated by a search tool using passive or active input of a user of the search).

It should be noted that Applicant recognizes that a term (e.g., "PE" in the prior example) could be used by a user as a search term in different searches for different meanings or purposes. Thus, having the system store or recall the user's inputs from only a single prior search may not always be helpful. Accordingly, in some embodiments a user may be provided with a mechanism that allows the user to indicate (and have the system store, as a type of annotation or additional data associated with a prior search) some indication that helps the user recall what the user was thinking in the prior searches or what the context for the search or particular search terms had been. In one such embodiment the user can see the input (e.g., swipe) history and be prompted from the inputs as to the meaning of the search term that the user had in mind for that search. For example, the user can then re-use the prior inputs (e.g., swipes) in a new search, generating a new list of search results. Or the user can request a new search using previously provided search terms or search string but without taking into account the user's prior inputs. For example, the user using the term "PE" in the prior example may search anew with the same initial term such as "PE", provide new inputs (e.g., swipes) and get a unique new list of search results or use the prior search and change, modify or alter the inputs and repeat the search. In either case the embodiments described herein would provide a faster and more efficient method for running a search using a previously provided search string (e.g., a user, with a new meaning for a search string in mind, may use the system to take a short cut to an intermediate set of search results based on a modification of a prior list of search results).

Applicant provides herein additional improved methodologies for arriving at a list of desired search results, ones that are more efficient and beneficial for the user: (i) having the search tool output to the user a suggestion of an additional and/or modified search term(s) or search string (e.g., along with an opportunity to re-run the search using the additional and/or modified search term(s) or search string, in accordance with some embodiments); and/or (ii) a re-running of the search by the search tool based on data determined by the search tool once the user has had an opportunity to review an initial list of search results (or portion thereof). It should be noted that either of the foregoing methodologies may be based on at least one of active input or passive input from the user when reviewing the initial list of search results. It should further be noted that either passive input or affirmative input from a user may be utilized to modify an initial list of search results (e.g., by deleting unwanted or undesired search results from the list or resorting the list) instead of re-running a search.

Additionally, Applicant has recognized that in some embodiments the concept of "passive input" may be utilized to provide a more efficient mechanism for focusing search results more on desirable search results (i.e., search results that the user wants or is interested in). Passive input may comprise input that the search tool may derive or infer from a user's actions or inactions, as compared to input that the user affirmatively provides by making selections, answering questions or actively or intentionally responding to prompts (which type of user input may be referred to as "active input" herein). For example, without necessarily intending to provide input to a search tool, a user viewing an initial list of search results generated in response to at least one search term or search string provided by the user, the user may click on the items or search results the user may think may be helpful, wanted or desired. Further, the user by choice will typically not click on or select those search results that are not desired or wanted. In accordance with some embodiments, the search tool may be programmed to monitor or track the user's selections (e.g., which search results the user clicks on or selects) or lack of selections (e.g., the search results the user does not click on or select) and/or other concepts put forth by deep learning networks (AI or machine learning) to better "understand" a user's search result behavior, search result preferences or search result behavior patterns within a given list of search result.

As an example use of passive input from a user as data a search tool may utilize to modify a list of search results, if a number of similar search results (e.g., search results sharing at least one common characteristic) on a first page of search results are not clicked on and the user moves to another page of the search results to look through additional search results, the search tool may be programmed to make an assumption or inference that these search results are undesirable and offer to remove (or automatically remove, in accordance with some embodiments) similar search results (e.g., search results also having the at least one common characteristic) from the initial list of search results (as described in detail herein). Returning to the example of the search term "PE", if the search tool identifies that the user does not select or click on any of the search results having to do with pulmonary embolism, then the search tool may infer or determine from this passive input that search results having to do with pulmonary embolism are undesired and remove from the initial list of search results any search results corresponding to pulmonary embolism (including search results that the user has not yet reviewed or passed over, such as search results that are located on pages of the initial list of search results that the user has not yet reviewed), thus generating a modified list of search results. In some embodiments, this modification of search results may affect only subsequent pages of search results while in other embodiments this modification of search results may affect all pages of search results (e.g., both the first page of search results that the user had already reviewed and additional pages of search results).

In accordance with some embodiments, the search tool's functionality to help improve a user's search results (e.g., by using passive input and/or active input from the user to (i) suggest new search term(s) or new search string (search improvement suggestions); or (ii) modify a list of search results by removing unwanted or undesired search results (automatic unwanted search result removal)) may comprise a feature or features that may be toggled on or off by the user. For example, if the new function of automatic unwanted search result removal is toggled on, the search tool may be given permission to perform certain functionality. As an example, such functionality may comprise: (i) tracking or monitoring a user's passive input to identify unwanted or undesired search results (e.g., by identifying one or more common characteristic(s) of search result(s) the user is not selecting or clicking on when reviewing an initial list of search result), (ii) concluding that the unwanted search results identified based on the passive input from the user can be removed when certain criteria are met; and (iii) automatically removing the unwanted search results from the initial list of search results (e.g., both from the pages already viewed by the user and also from pages not yet viewed by the user that include search results identified by the search tool as unwanted based on the user's passive input). Thus, in accordance with some embodiments a search tool comprises AI/machine learning (e.g., an algorithm that may be trained and evolves over time) and utilizes this to recognize patterns or information from the user's passive input that indicates certain search results or types of search results are of little or no value in this particular search to the user and automatically removes them from the list of search results.

In another embodiment, passive input may be utilized to determine or identify other metrics (e.g., other than whether a user selected or clicked on a particular search result), which metrics may in turn be utilized for various functionality of a search tool as described herein (e.g., to generate and/or output search improvement suggestions and/or automatic removal of certain search results from an initial list of search results). One example of a metric that may be calculated or otherwise determined from a user's passive input is a bounce rate. A bounce rate, as the term is used herein, may refer to a metric that indicates the percentage of people who land on a particular page of a website comprising a search result (e.g., a home page of a particular website) and then leave without navigating to any other page on that website. Another example of a metric that may be calculated or otherwise determined from a user's passive input is "bounce time." A bounce time, as the term is used herein, may refer to a length or duration of time (as measured in a particular unit of time, such as seconds) that a user spends on a particular page of a website or the website in general (i.e., any page of the website). For example, the longer a user spends on a website or page of a web site, the more desirable that page or website may be inferred to be. In one embodiment, a search tool may identify search results for which the bounce time is less than a threshold period of time (e.g., less than 3 seconds), identify that search result as being undesirable and determine other search results that are also undesirable because they are in some way similar or related to the undesirable search result (e.g., share at least one common characteristic with the undesirable search result). The search tool may then either automatically remove the additional search results so determined to be undesirable or output to the user an offer to remove them (or prompt the user for a confirmation that these additional search results should be removed). For example, returning again to the "PE" search term example, if the search tool determines that the bounce time for one or more pages directed to pulmonary embolism is less than a threshold period of time, it may either automatically remove all other search results having to do with pulmonary embolism or ask the user to confirm that all search results having to do with pulmonary embolism are undesirable. It should be noted that the bounce rate and/or the bounce time metrics may be measured or calculated for a particular user, for a particular list of search results or as an average of prior use.

Applicant has recognized that some of the embodiments described herein have the potential benefit of reducing the number of clicks or selections a user needs to make in order to find the most desired or wanted search results (i.e., may be characterized as novel click reduction mechanisms or strategies).

In the following description of FIGS. 15A-15D, reference is made to another example of a search term that may have more than one meaning and thus yield undesirable search results included in a list of search results such that a user may have difficulty finding the desirable search results (e.g., the search results related to the meaning the user is interested in). For purposes of the example described with reference to FIGS. 15A-15D, this search term is "camp concentrations." It may be assumed that if a user desires to know more about cAMP (cyclic AMP, a biologic compound very common to biochemists) and its concentrations, the user may initiate a search using the search term "cAMP concentrations." A search tool may, in its list of initial search results, find results for concentration camps. It may reasonably be assumed that the segment of the general population looking for World War II references is larger than the small segment of organic chemists with PhD level training looking for cAMP concentrations in the nucleus of cells. In accordance with some embodiments, a search tool may be operable to remove system bias based on what "most" searchers using a particular search term may be looking for. For example, search engines in some known systems may offer suggestions to a user based on what it determines are "related searches" previously done by other users for the same or similar search terms. Often, for a search term that may have more than one meaning or be found in more than one context, such suggestions are focused in the wrong direction (i.e., on a meaning or context of the search terms that the user is not interested in).

Figure 15A:
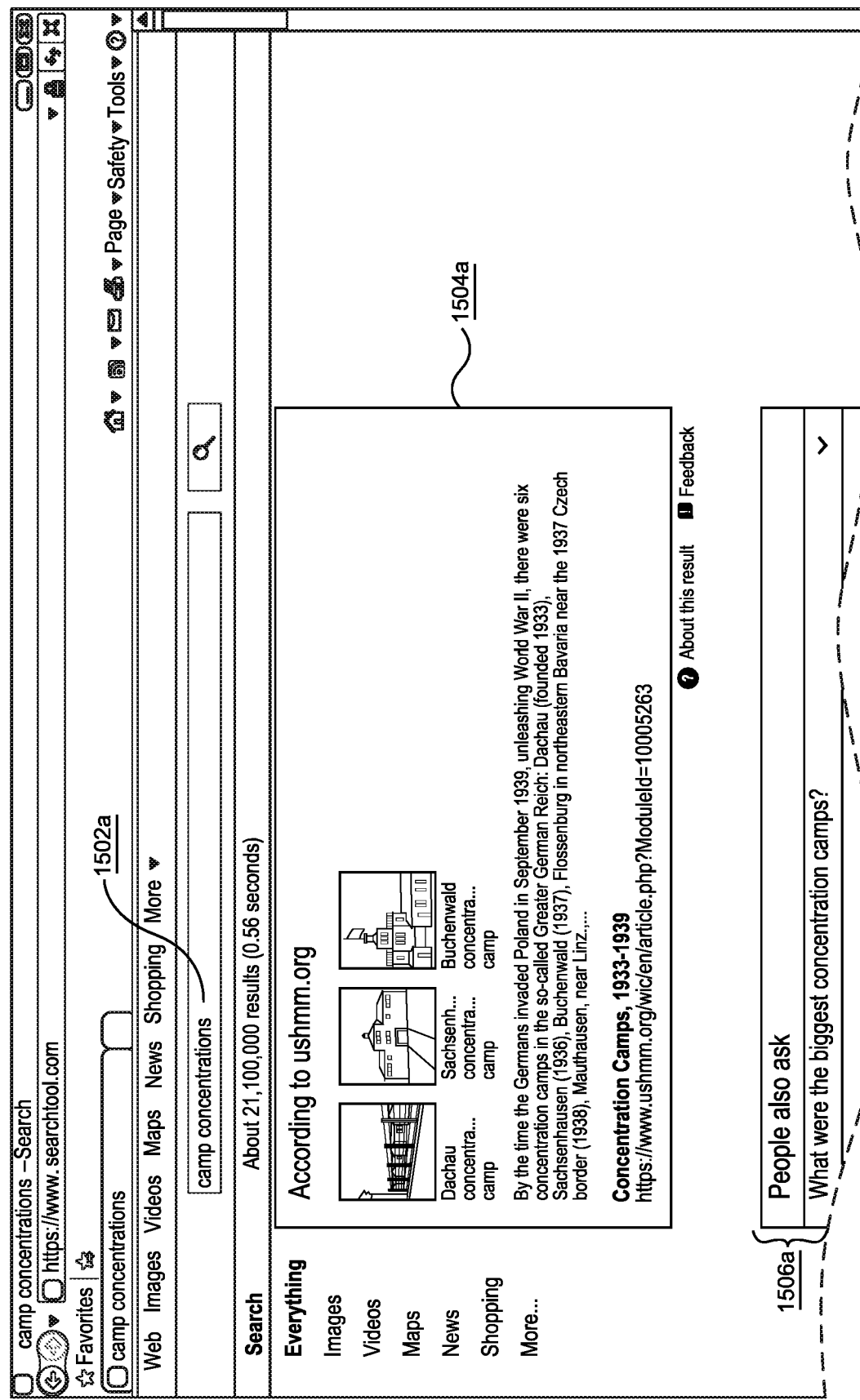
FIGS. 15A-15D each comprise a diagram of yet another example interface, consistent with some embodiments described herein.

FIG. 15A, illustrating an example modeled on a conventional search engine user interface 1500A, showing an example of search results that a conventional search tool may provide to a user, which search results are not what the user is looking for, even if the search results are technically relevant to the user's search terms. Area 1502a of interface 1500A indicates that the search string input by the user is "camp concentrations." Area 1504a indicates at least one search result that is output to the user as a result of this search string. It may be assumed, for purposes of the present example, that the user is interested in results having to do with biologic compound cyclic AMP. However, the search result illustrated in area 1504a is related to concentration camps set up during WWII. Area 1506a further indicates that the alternate suggested search is also focused on such concentration camps and not the biologic compound.

Figure 15B:
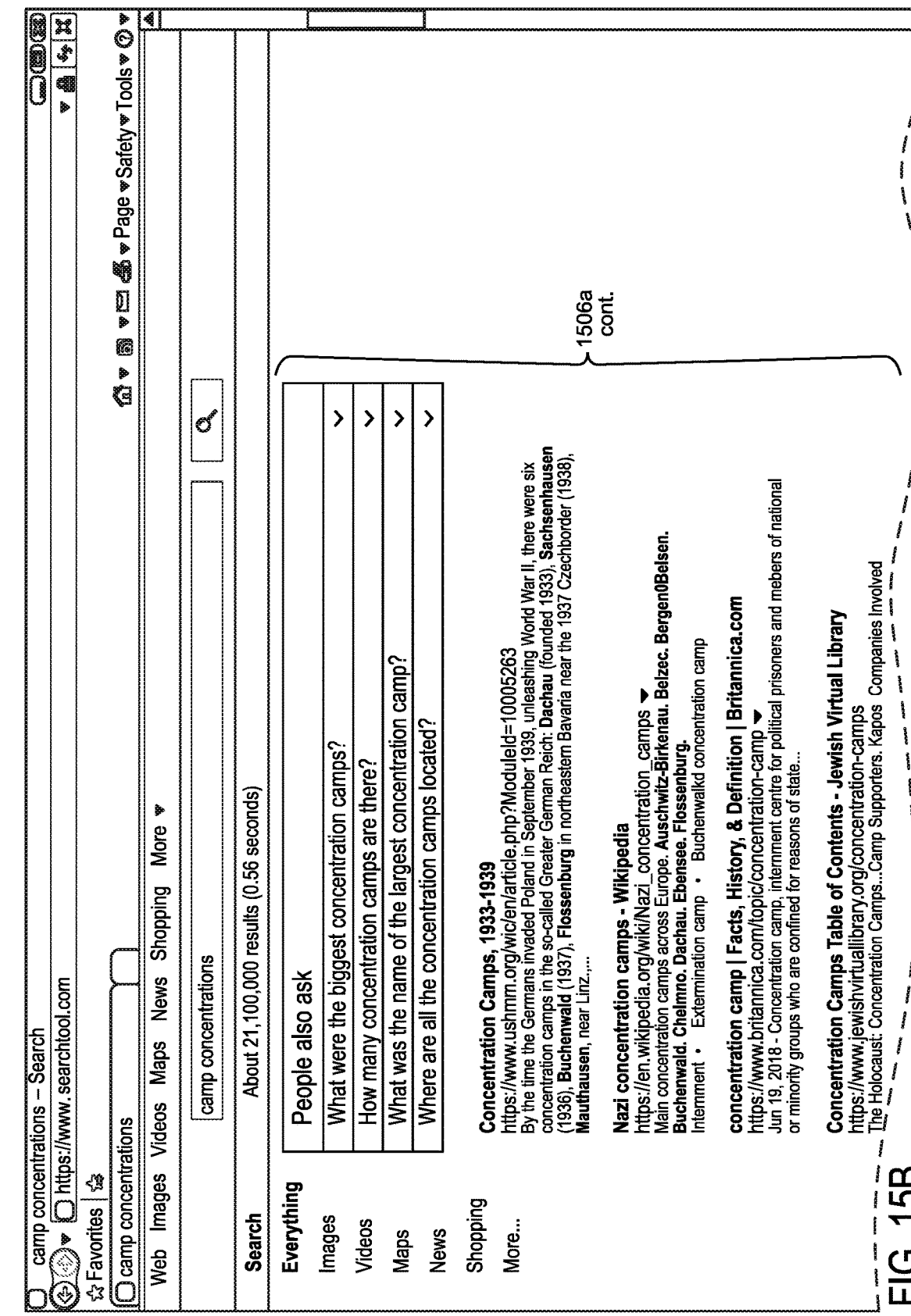

Turning to FIG. 15B, illustrated therein is an example user interface 1500B, which is a continuation of conventional user interface 1500A (FIG. 15A) and illustrating what a user would see if (s)he scrolled down further on the page of search results output in the portion of the user interface 1500A illustrated in FIG. 15A. FIG. 15B illustrates that the additional search results in area 1506A, as well as the suggested alternate searches, are also not relevant to the context or meaning the hypothetical user is interested in.

Figure 15C:
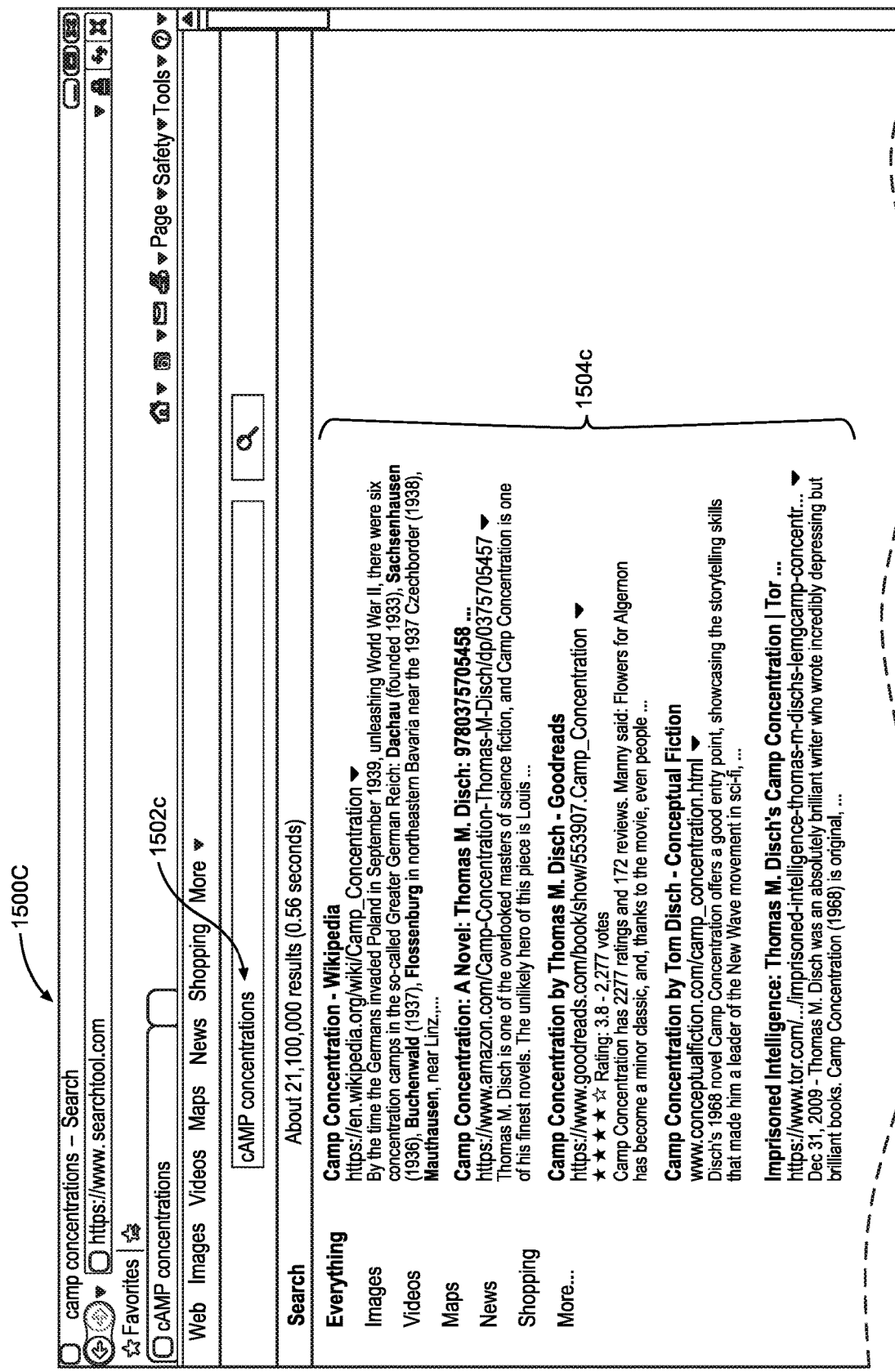

Turning to FIG. 15C, illustrated therein is an example user interface modeled on a conventional search engine user interface 1500C, which illustrates search results of an alternate search string that a typical user who had reviewed the search results of user interfaces 1500A and 1500B (FIGS. 15A and 15B) may try if (s)he is interested in finding out information about the biologic compound cyclic AMP rather than information about WWII concentration camps. As illustrated in area 1502c of user interface 1500C, the user has input the alternate search string "cAMP concentrations."

The resulting search results output in area 1504c of user interface 1500C are no better (in terms of being relevant to the meaning or context that the user is interested in) than the ones output in user interfaces 1500A and 1500B. At this point, it may be assumed that the user is anxious to change the search terms, often many times, to 'force' or 'direct' the engine to the information the user is actually interested in and have the search tool 'get it right.' Unfortunately, conventional search tools do not comprise an efficient mechanism or functionality to aid the user in such a circumstance. The user typically resorts to trying different combinations of words in the hopes that one of these combinations will result in at least some search results the user is actually interested in. There is thus a need for a search tool that utilizes a user's passive negative input (i.e., passive input from a user that is indicative of which search results the user is not interested in or which search results the user considered undesirable, such as because the user is not clicking on or spending significant time on such search results). In conventional search tools, a typical user instead spends unnecessary and significant time working his/her way down a long list of undesired search results in the hope that somewhere later in the results wanted information will be found or trying different search strings.

Figure 15D:
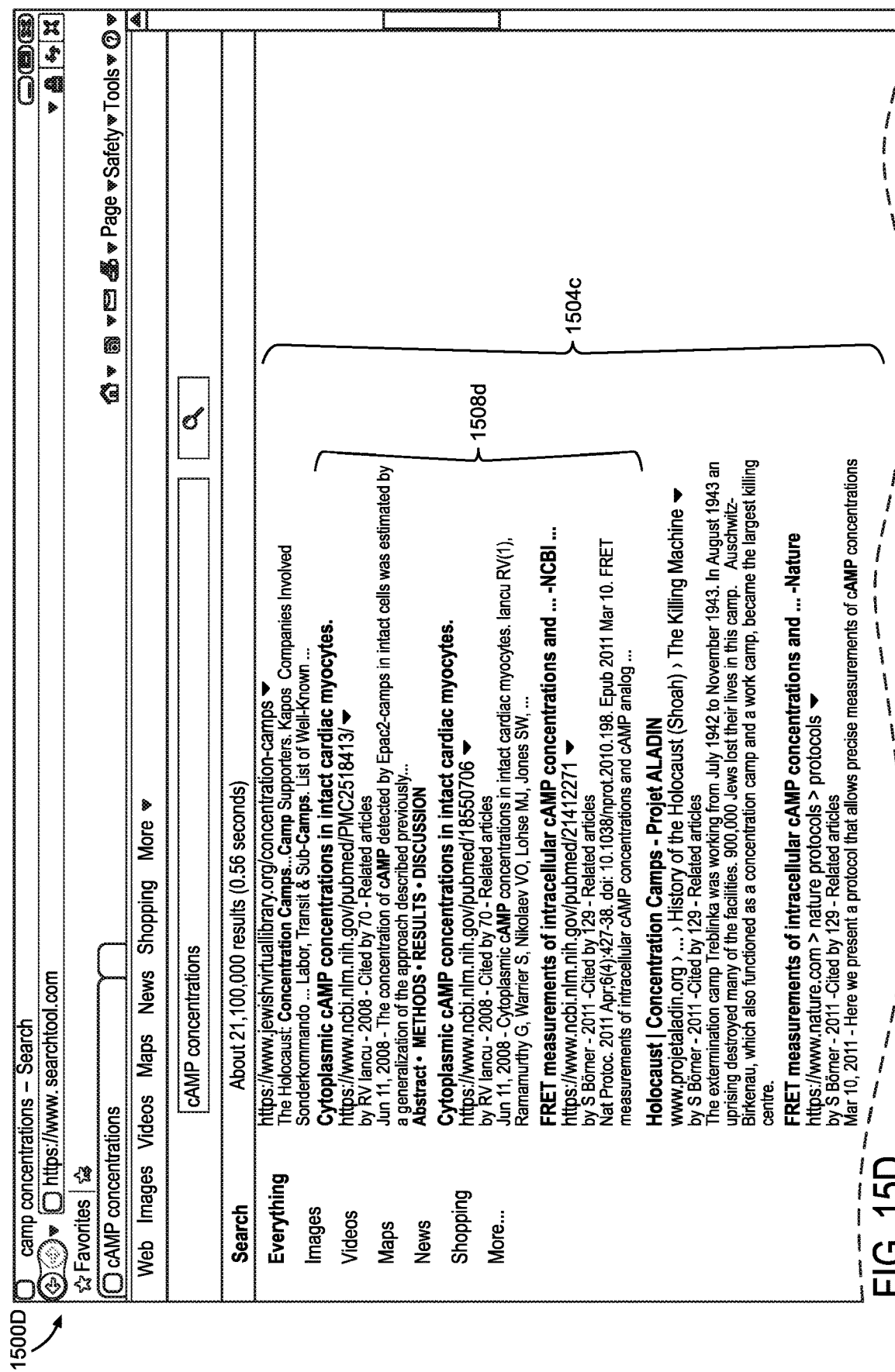

Turning now to FIG. 15D, illustrated therein is a conventional example user interface 1500D, which is a continuation of the conventional user interface 1500C and illustrating what a user would see if (s)he scrolled down further on the page of search results output in the portion of the user interface 1500C illustrated in FIG. 15C. FIG. 15D illustrates that eventually, down in the list of search results, there are some search results 1508d that are desirable (e.g., information that the user is interested in; within in the correct meaning or context of the search term(s) used). It should be noted that in Applicant's U.S. Pat. No. 8,326,862, Applicant describes at least one mechanism via which a user in such a circumstance may be able to utilize the finding of one or more desirable search results to remove unwanted search results or prioritize other search results that are similar such that they are re-ordered to the top of the list of search results. For example, the user could be provided with a swiping, selecting, tapping, highlighting, "thumbs up," or voice activated mechanism via which the user can tag an unwanted search result and thus allow the search tool to identify other similar search results (e.g., search results that share at least one common characteristic with the unwanted search result but that the user has not yet reviewed) and either remove such other search results or re-order the list of search results such that search results which share the common characteristic are moved lower on the list of search results, thus bringing other types of search results towards the top of the list. Alternatively, the user could tag or indicate a desirable search result (e.g., one of the search results 1508d) and the system could identify other search results that are also likely to be desirable to the user but which the user has not yet reviewed (e.g., search results that share at least one common characteristic with the search result the user indicated as desirable) and re-sort the list such that the search results deemed to be desirable (the search result(s) the user indicated are desirable and the additional search results the system determined as also likely to be desirable, based on the user's input) are ranked higher and/or appear towards the top of the list. The entirety of U.S. Pat. No. 8,326,862 is incorporated by reference herein for all purposes.

In the conventional search tool utilized to provide the search results of user interface 1500D, the user has no manner of utilizing this eventual discovery of wanted search results to focus or filter the initial list of search results (and the search tool does not comprise functionality that would allow it to recognize that the user finds one or more particular search results desirable and utilize this information to remove unwanted search results that do not share the at least one common characteristic of the wanted or desirable search results). Various embodiments described herein, however, would allow a search tool and/or a user who discovers at least one wanted search result in a long list of search results that includes many unwanted search results to take advantage of this discovery. For example, the system may utilize its determination that the user finds at least one search result desirable in order to re-sort the list of search results, provide an alternate search string (or suggestion of such to the user) and/or re-run the search using the newly identified information of which search results the user finds desirable. In some embodiments in which a user changes his/her input for one or more search results (e.g., the user had first indicated that a given search result was wanted but then subsequently indicates the same search result as unwanted, or vice versa), the system may generate a modified search string (or suggestion for a modified search string) based at least in part on the fact that the user had changed his input for that search result (e.g., the system may gain some insight into the user's uncertainty or interest based on the user's change of input, particularly if the change is provided "on the fly" while the users if reviewing the initial (or modified) list of search results.

As described herein, in some embodiments a search tool may utilize the passive input of a user to initiate certain functionality. For example, returning to the example scenario illustrated in FIG. 15D, if the user clicks on one or more of the search results 1508d and stays on these for more than a predetermined threshold of time, the search tool may infer that the user finds these search results desirable and attempt to determine at least one common characteristic shared by the desired search result(s) 1508d in order to either output an alternate suggested search string to the user that is more likely to generate more wanted search results (e.g., search results that also share the at least one common characteristic) or automatically re-run the search using the passive input of the user in order to come up with more wanted search results.

In accordance with some embodiments, once a search is initiated, an algorithm, software module, AI and/or machine learning may be used to gauge a user's interest in particular search results (or types of search results, such as search results sharing one or more characteristics) in an initial list of search results based on various factors and metrics as described herein. Such metrics may be used to (i) modify or redefine the initial list of search results and thus generate a modified list of search results (e.g., for the current search and/or user) and/or (ii) provide suggestions for new or modified search term(s) or a search string that is less likely to include unwanted or undesirable search results. Any of the foregoing being, in some embodiments, based on metrics measured based on passive input of the user when reviewing the initial list of search results. As described herein, a user's behavior responsive to an output of an initial list of search results (whether comprising passive input or active input) may be used by a search tool to learn which search results (or types of search results, such as search results sharing at least one common characteristic) are undesired search results and (i) remove, or give the option to remove, those results from a current list of search results (including search results that may be further down in the search result list and thus ones that have not yet been reviewed by the user); or (ii) generate one or more new or modified search terms (or a new or modified search string) that can then be used to run a new search which will comprise a more desirable set of search results.

Figure 16:
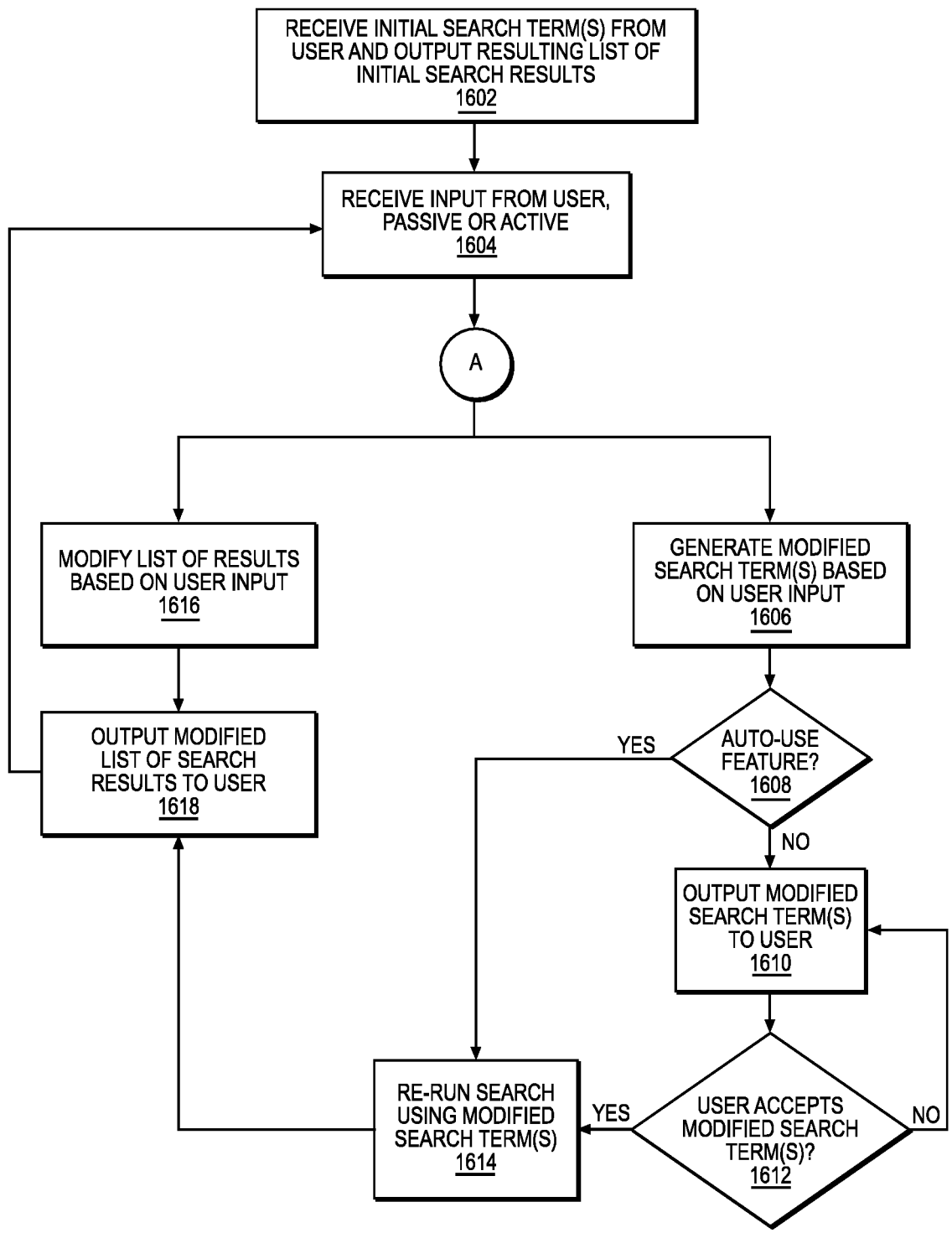
FIG. 16 is a flow diagram illustrating a process which may be performed in accordance with some embodiments described herein.

Referring now to FIG. 16, illustrated therein is an example process 1600 that is consistent with at least some of the embodiments described herein. It should be noted that process 1600 is exemplary only and should not be construed in a limiting fashion. For example, additional and/or substitute steps to those illustrated may be practiced within the scope of the present invention and in one or more embodiments one or more steps may be omitted or modified. In one embodiment, the process 1600 is performed by a search tool server 112, 114 or 116 (FIG. 1). Alternatively, process 1600 may be performed by a third-party server 118 and/or a software application residing on or otherwise utilized by (e.g., using cloud storage technology) a user device 102, 104 or 106 (FIG. 1) of a user requesting the search.

In step 1602, an initial search term(s) or search string is received from the user. For example, the user may type in the desired search term(s) using a search bar or window of a browser or may speak the desired search terms (e.g., if audio input is enabled, such as if the user is using an electronic voice assistant such as Alexa™, Siri™, Cortana™ or Google™ Assistant™). Once a search tool performs the search in accordance with the initial search term(s) provided by the user, the initial list of search results is output to the user (e.g., via an interface such as that described and illustrated with reference to FIG. 7-14 or 15A-15D). Step 1602 may be similar to step 402 (FIG. 4) and will thus not be described again in detail for purposes of brevity.

In step 1604, an input or feedback response to the list of search results is received or detected. The input may be active input (e.g., a user indicates undesired search results via any of the mechanisms described herein, such as by selecting an icon or virtual button to indicate an undesirable search result, swiping away the undesired search result or verbally providing feedback as to which search result(s) the user finds undesirable).

In other embodiments, the input may be passive input. For example, the search tool or another software application configured to implement some of the embodiments described herein based on data output by a search tool may track or monitor the user's interactions (or lack of interactions) with each of the search results to identify ones that the user does not select or click on, or for which the bounce time is less than a threshold time, and infer that such search result(s) are undesirable to the user. Step 1604 (or another step in process 1600) may also identify at least one common shared characteristic that is common to the search results of the list of search results that the user indicates (either by passive input or active input) as undesirable, in order to determine what other search result(s) or types of search result(s) the user would also find undesirable.

Applicant envisions various mechanisms via which a user may provide active input as to which search results are unwanted or undesirable, many examples of which were previously described herein (e.g., with reference to FIGS. 7-14 and step 404 of process 400 (FIG. 4)). Additional mechanisms via which a user may provide input defining which search result(s) are undesirable and/or why such search result(s) are undesirable include:
(i) a mechanism via which a user is given the ability to highlight or indicate a part of a search result to help redefine the search or remove unwanted results or enhance wanted results. For example in the cAMP results example described with reference to FIGS.

15A-15D, a user may be provided the ability (e.g., via a search tool interface as described herein) to highlight, emphasize or indicate (or announce out loud to a voice assistant device) that "Concentration camps 1933-1939" as not wanted and/or give that part of a search result a negative valuation;

(ii) voice commands via which a user can provide instructions as to which search results should be removed (e.g., "Siri™, please remove references to Concentration Camps in the context of imprisonment" or "Alexa™ please remove those references that don't include 'biochemistry or organic chemistry' in the reference."), In some embodiments, a user may also be provided with the ability to provide other voice instructions (e.g., "please read me the top five of the remainder" or "please email me the web links for later use"), any of which may provide a user the ability to refine search results and do research in the car while driving or while doing other tasks; and (iii) a user may be provided the ability to mark or indicate (e.g., using a mouse, electronic pen or a finger if using a touch screen) a section of a search result, a group of results, or one or more of individual words or phrases in a result (e.g., the search tool may prompt the user to so mark phrases, ideas, concepts and/or terms to include or exclude from the list of search results or in a re-run or new search).

Turning again to process 1600, after step 1604 the process diverges at juncture A to either step 1606 or step 1616, depending on what embodiments are being implemented. As described herein, in some embodiments a search tool or independent software that functions to enhance or augment the capabilities of a search tool may be operable to narrow, focus or cull the list of search results to remove other search results it determines to be undesirable to the user based on the user input identified in step 1604. In other embodiments the search tool or independent software may be operable to use the input from the user identified in step 1604 to identify additional or modified search term(s) or a modified search string that is more likely to result in more desirable results (i.e., search results that are more relevant to the meaning or context that the user is interested in and wants to know more about). In the former embodiments process 1600 proceeds to step 1616 while in the latter embodiments process 1600 proceeds to step 1606.

Turning first to the embodiments in which the input from the user is utilized to modify (e.g., narrow or focus) the list of search results, in step 1616 the system (e.g., search tool software, processor and/or logic) removes (e.g., re-sorts, re-ranks or deletes) from the list of search results (i) search results the user has reviewed and indicated (either via passive or active input) as being undesirable, and (ii) additional search results (i.e., search that the user has not yet reviewed but which are included in the list of search results, such as search results on pages the user has not yet viewed) that are also determined to be undesirable or unwanted because they share at least one common characteristics with the search results in (i). This step may be similar to steps 406-410 of process 400 (FIG. 4) in that it may involve identifying at least one common characteristic shared by search results the user has indicated are undesirable (either through passive or active input) and identifying additional search results that also share this characteristic. Alternately, if the user provides specific instructions as to which types of search results are to be removed (e.g., any search results for the term "PE" that are directed to pulmonary embolism should be removed), step 1616 may comprise implementing the user's specific instructions. In step 1618, a modified set of search results is output to the user. This step may be similar to that described with respect to step 412 of process 400 (FIG. 4).

In one embodiment, as described herein, the user may be provided with different options as to how the user's input may be utilized to generate a modified list of search results (e.g., the user may be provided with different types of search results to be removed from the initial list of search results, such as in situations in which there may be more than one shared characteristic common to the search results the system determines are unwanted based on the user's input). For example, the user may be asked to select a reason, characteristic or summary out of a list of options as to why (s)he finds certain search results on the initial list of search results to be unwanted, thus being provided with an opportunity to provide further input to the system that will enable the system to remove additional search results in a manner satisfactory to the user.

Turning now to step 1606, if the embodiments being implemented involve generating suggestions for a modified search string or generating a modified search string for automatic application on behalf of the user, step 1606 comprises identifying new search term(s) or additional search term(s) such that the search desired by the user may be re-run using these new or modified search term(s) in order to come up with search results that are more relevant to the meaning or context of the original search term(s) that the user provided in step 1602. For example, in accordance with some embodiments, a words-to-vector algorithm may be utilized, as described herein.

Using the input from the user obtained in step 1604, the search tool may identify at least one common characteristic that is shared by the undesired search results and generate a modified search string that attempts to exclude those undesired search results if the search is re-run using the modified search string. A modified search string may comprise different or additional words or terms and/or additional instructions for the words or terms originally provided by the user. For example, the modified search string may be a Boolean search string that instructs the search tool to exclude certain words or exclude search results in which certain word(s) appear within a predetermined number of words to other certain word(s), exclude search results that include certain terms even if they also include the term(s) input by the user, etc. Once the modified search string is generated it may automatically be implemented on behalf of the user (e.g., if the answer to the query as to whether the auto-use feature is being implemented, in step 1608, is "yes" or the system is programmed to automatically implement the modified search string). In other embodiments, the modified search string (or set of likely strings base on the user input and indications) may be output to the user as a suggestion, with the user needing to provide affirmative permission for the search to be re-run using the modified search string or selecting one or more of the modified search string suggestions (e.g., if the answer to the query as to whether the auto-use feature is being implemented, in step 1608, is "no" and/or of there are multiple alternate modified search strings identified by the system). If the auto-use feature is being implemented (e.g., either because the user has turned it on, if that is a choice being offered to the user, the offered search string is selected, or because that is how the search tool is being implemented), then process 1600 proceeds to step 1614 and the search initiated by the user in step 1602 is re-run in step 1614, using the modified search string generated in step 1606. In some embodiments, the user may be notified of the modified search string and the fact that the search has been re-done using the modified search string but need not provide affirmative permission for the search to be re-run using the modified search string.

The process 1600 proceeds from step 1614 to step 1618, wherein the modified search results (in this case the search results resulting from the re-run search) are output. If the auto-use feature is not being implemented and the process 1600 proceeds to step 1610 from step 1608, a suggestion of the modified search string is output to the user (e.g., visually, such as via a search tool interface) and/or via audio). In some embodiments, the user may be provided with choices of one or more suggested search terms or one or more suggested search strings from which the user may select a modified search string to be used to re-run the search. If the user accepts or selects any of the suggested modified strings, the process continues to step 1614. If the user does not accept the suggested modified search strings, the process may return to step 1610. In some embodiments, different modified search strings may be suggested to the user if the user does not accept any of the modified search strings first suggested to the user.

Referring now to FIG. 17, illustrated therein is an example process 1700 that may be implemented in accordance with some embodiments described herein. It should be noted that process 1700 is exemplary only and should not be construed in a limiting fashion. For example, additional and/or substitute steps to those illustrated may be practiced within the scope of the present invention and in one or more embodiments one or more steps may be omitted or modified. In one embodiment, the process 1700 is performed by a search tool server 112, 114 or 116 (FIG. 1). Alternatively, process 1700 may be performed by a third-party server 118 and/or a software application residing on or otherwise utilized by (e.g., using cloud storage technology) a user device 102, 104 or 106 (FIG. 1) of a user requesting the search.

In accordance with the embodiments illustrated in process 1700 and described with reference thereto, an analysis of an initial list of search results (or a sub-set of an initial list of search results, such as one or more pages of a browser or other user interface via which the initial list of search results is output to the user) is performed in order to identify one or more word feature characteristics of the analyzed search results. The identified word feature characteristics are then utilized, in conjunction with input from the user which identifies one or more of the search results in the initial list of search results as being unwanted or undesirable, to identify additional search results that may also be unwanted or undesirable by the user because they share the one or more word feature characteristic(s) corresponding to the search result(s) the user has indicated is/are undesirable.

Process 1700 may begin once an initial list of search results is output to the user and thus identified by the processor or module performing the process 1700. Identifying the initial list of search results may, in some embodiments, comprise identifying a sub-set of all of the search results comprising the initial list of search results (e.g., a sub-set may comprise the search results output on a given page of search results). The initial list of search results may be output, for example, via a browser or conventional search engine interface or via a mobile app on a user's mobile device. In some embodiments the initial list may be output via a browser or app that is distinct from the app that is performing process 1700 while in other embodiments the initial list of search results may be output via an interface of the same app that is performing process 1700 (e.g., process 1700 may be a built-in feature of the search engine or app that the user is using to request the search). Regardless of whether or how integrated the process 1700 is with the search engine or other software tool that the user is using to perform the search, once the initial list of search results is identified in step 1702, an analysis of the search results identified in 1702 is performed in step 1704.

In accordance with some embodiments, in step 1704 one or more NLP models (e.g., a combination of word-to-vector models) may be utilized to process the search results identified in step 1702. As described herein, examples of such models include BoW, Word2Vec and Word Clusters, although other models can be used. While in some embodiments only a certain portion or excerpt from each search result (e.g., the title of the webpage or other content and a brief description or snippet to indicate substance thereof) may be analyzed in step 1704, in other embodiments the entirety or a more substantial portion of each search result may be analyzed. In either scenario, such analysis is described herein as an analysis of the search results (i.e., even if such analysis comprises an analysis of less than the entirety of each search result).

In accordance with some embodiments, an intended purpose of step 1704 is to analyze the search results in order to identify some context for each search result, such as identifying a classification, topic, relevant meaning or reconstruct a linguistic context for a given search result, such that search results that are similar in some manner (e.g., are all related to one particular context over another) may be identified by the system. In one example embodiment, a model such as Word2Vec may be employed to learn vector representations or "word embeddings" of the search results. In another example, a model such as BoW or TF-IDF ("Term Frequency-Inverse Data Frequency") using Python may be used to identify rare words that appear a statistically significant number of times in a given search result or across a set or "corpus" of search results, in order to identify which search results should be classified together (e.g., because they related to the same or similar context or meaning of a given search). In such an example process, (i) an IDF map may be created to show how rare or frequent some words within a given search result are (a higher IDF scores corresponding to rare words and a lower IDF score corresponding to frequent words), which database may be stored for subsequent use; (ii) the previously stored IDF map may be accessed to extract or assess rare tokens (rare words) in a given document (e.g., for every word in a document, the system may check to determine if it is a noun or not and then checks it's IDF score to see how rare or frequent the word is); and (iii) identify a predetermined number of rare tokens having a desired IDF score or relative score (e.g., top 3) and at least one synonym for each.

In step 1706, a user's input for the initial list of search results is determined. The input may be received, in accordance with some embodiments, only for a subset of all of the search results generated for the present search. For example, the input may be for some search results on the first few pages of search results. The receiving of input from a user for search results of a search (or to modifications to the list of search results, as described herein) may be ongoing, such that the process 1700 may continue to receive input and perform additional steps of process 1700 (e.g., steps 1706-1710) on an ongoing basis as a user continues to review search results for the search, provide input for at least some of the search results, view modifications made to the initial list of search results (as described below with reference to steps 1708 and 17010) and perhaps modify his/her input for at least one search result (e.g., as described below with reference to step 1706). Accordingly, the refining and improving of the initial list of search results may, in some embodiments, be performed on an ongoing or continuous basis.

As described herein, input from a user may be either passive or active. It may be assumed, for purposes of the present example, that the system receives active input from the user in the form of "swipes" (e.g., the user may be provided an interface via which (s)he may swipe away unwanted search results or swipe unwanted search results in a first direction while swiping wanted search results in a second direction). In accordance with some embodiments, a numeric value or other indicator of relative numeric value may be assigned to each search result or each search result for which a user provides input. For example, a (+4) value may be assigned to a search result a user indicates is wanted, relevant or desired while a (−4) value may be assigned to a search result a user indicates is unwanted, nor relevant or undesired by the user. Although the number four (4) is used herein as an example numeric value, other numeric values may be utilized in order to provide a numerical value distinction between wanted search results and unwanted search results. A numeric value assigned to a given search result may be referred to as a score herein (e.g., a search result associated with a (+4) numeric value may be considered to have a higher score than a search result associated with a (+3) value or a (−4) value). In some embodiments, non-numerical schemes may alternatively be assigned to indicate wanted search results vs. unwanted search results, as determined based on user input. In accordance with some embodiments, search results are output (and re-ordered, as appropriate based on updated scores) in an order based on the score associated with each search result (e.g., a search result corresponding to a higher score will appear closer to the top or beginning of a list of search results than a search result corresponding to a lower score). In accordance with some embodiments, a list of search results may be modified or re-ordered as the scores for the search results are updated based on user input and/or inferences made by the system using NLP and user input or other methodologies described herein. The values or rankings assigned may be static or dynamic, depending on the embodiment desired. For example, a combination of inputs can be used to revalue prior values based on an improved NLP or machine-learned assessment of the prior values. This may cause a revision of rankings and/or the order or the output with the goal of improving the cognitive or perceived value of the results presented to the user.

In accordance with some embodiments, an indication of a relative value of a search result may be output to a user in some manner, such that the user may be able to view or otherwise understand the relative values assigned by the system to different search results based on user input. While in some embodiments the output to the user may comprise a numeric value, in other embodiments the relative value indicator may be a non-numeric in nature, such as in the form of color and shading (such that different shades of a gray scale, color, or different colors, indicate different relative values assigned based on user input) or symbols (for example number, color or size of symbols like +, =, −, *, or !). In this way a user may be able to understand which search results the system has determined to be wanted or desirable, which search results the system has determined to be unwanted or undesired by the user and even, in some embodiments, a relative indication, value or strength of desirability or undesirability assigned to a given search result.

In some embodiments, as described herein, a user may be able to change an input previously provided for a given search result appearing for a present search (or even in a previous search that generated the search result). For example, a user who previously indicated that a search result was unwanted or undesirable may be able to change his/her input (or provide a new input for that search result) such that the search result is now indicated as wanted or desirable. In accordance with some embodiments, the system may then update the corresponding score or value of that search result (and the visual indicator of the corresponding score or value, so as to enable the user to see the relative value assigned to the search result via a change in the color shading or other indicator mechanism, responsive to the user's change in input). The system may further be operable, in some embodiments, to re-evaluate or analyze other search results based on the user's revised input (or new input) and generate updates scores or values for the other search results.

In accordance with one embodiment, a search history feature (described in more detail below, with respect to FIGS. 18A-18C) may allow a user to do a new search with the same terms and different swipes and the app or search tool software may be programmed to store both the user's previous search (and swipes/input at the time of the previous search) and the new search (and the swipes/input at the time of the new search) such that the user can compare them. For example, in a first menu or interface the user may be provided with the search history by date and may include in each search summary the number of swipes or other search result input (as illustrated in FIG. 18B and described elsewhere herein).

In some embodiments, a user may be provided with the ability to share all or part of a search result(s) (for example top five (5) results before or after modifications or input by the user). Similarly, in some embodiments a "swipe" or input history may be shared with others. Examples of group search and share features are described in more detail below with respect to FIGS. 20A-20D.

In accordance with some embodiments, in step 1708 the user's input (e.g., swipe input) determined in step 1706 is utilized, along with the results of the NLP or other analysis applied to the initial list of search results performed in step 1704 (e.g., the data in the IDF map created based on the search results and the analysis of rare words identified in the search results), to generate a modified list of search results. In accordance with some embodiments, step 1708 may be triggered when a user selects a "refresh" screen function to refresh a page of search results after having provided input (e.g., swipe(s) to indicate at least one unwanted search result). In other embodiments step 1708 may be initiated or triggered based on another event, such as upon a new input being received from the user, upon the user selecting a next page of search results, every predetermined number of seconds, etc.

In accordance with some embodiments, a module or sub-routine (e.g., of a search tool server 112-166, FIG. 1) may be programmed to identify additional search results of the initial list of search results that are inferred or identified as also being unwanted by the user (based on a user's negative input, such as a swipe indicating one or more unwanted search results), even if the user has not yet reviewed these additional search results. Similarly, a module or sub-routine (e.g., of a search tool server 112-166, FIG. 1) may be programmed to identify additional search results of the initial list of search results that are inferred or identified as also being wanted by the user (e.g., based on a user's positive input, such as a swipe indicating one or more wanted search results), even if the user has not yet reviewed these additional search results. Some examples of how additional search results that are wanted or unwanted by the user, based on the user's input for some search results, has been described herein (e.g., with respect to step 408 of process 400, FIG. 4) and may be applied similarly in step 1710.

As described, in accordance with some embodiments, the system may identify one or more characteristics corresponding to a search result that the user has indicated as unwanted and find other search results that also correspond to this characteristic (or, in identifying additional search results that the user may find to be desirable or wanted, the system may identify additional search results that share a characteristic with a search result the user has indicated is wanted or desirable). In accordance with some embodiments, the characteristic may comprise a word feature characteristic.

In one example embodiment utilizing a word feature characteristic to identify additional unwanted search results, a module or sub-routine may (i) identify one or more search results for which a user provided a negative input (e.g., the user swiped the search result(s) in a manner intended to tag or identify these search results as unwanted or undesirable); (ii) identify a predetermined number of rare words in each such unwanted search result (e.g., using the IDF map and related data indicating the rare words identified in each search result, as generated in step 1702 or another process); (iii) select a predetermined number of rare words (e.g., top 3) that are present in each such unwanted search results; and (iv) analyze the data generated in step 1702 to identify any additional search results that also include the same top 3 (or other number) rare words. In some embodiments, identifying additional search results that include the same rare words may include determining any additional search results that include synonyms for any of the rare words. In accordance with some embodiments, the module or sub-routine may then utilize the results of this analysis to decrease a numerical value or score assigned to the identified additional search results, such that they will be placed higher or nearer to the beginning of the list of search results. In some embodiments, search results that have an associated numerical value or score at or below a threshold value may be removed from the list of search results (in some embodiments these may be moved to a different list of unwanted search results, such that the user can view which search results have been removed and undo the removal if desired). A similar sub-routine may be executed to identify additional wanted search results based on a positive input from a user (e.g., the user swiped the search result(s) in a manner intended to tag or identify these search results as wanted or desirable) but the numerical value or score of the additional search results identified in this manner (e.g., identified because they include the same top 3 rare words, or synonyms thereof, that are included in the search result(s) identified by the user as desirable) would be increased such that these additional search results rise higher on the list of search results.

Once the additional wanted or unwanted search results are identified, a modified list of search results is output to the user in step 1710. For example, the initial list of search results may be re-ordered such that search results that now have a higher score (E.g., based on user input or an analysis by the system as described with respect to step 1708) now appear higher or nearer to the beginning of the list of search results while search results that now have a lower score appear lower or further from the beginning of the list of search results or are removed from the list of search results (or moved to a separate list of unwanted search results). A value or setting of a visual indicator (e.g., color bar) may also be updated to reflect the changed numerical value or score associated with the search results. As previously described herein, the updating or modification of the list of search results (e.g., re-ordering of the search results such that search results with higher scores are moved up in the list while search results with lower scores are moved down or off the list) may be an interactive or ongoing process that continues as the user provides input on search results, perhaps provides input on additional search results as being wanted or unwanted as determined by the system (e.g., via an interface that allows the user to agree or disagree, or undo, a determination by the system as to whether an additional search result is wanted or unwanted) and/or requests an update to the listing of search results (e.g., by hitting a refresh button on an interface).

It should be noted that the additional controls provided to a user herein create a search environment in which the user has more control over his/her searches and in which searches are customized for the user based on his/her own preferences and input history, rather than based on input from a massive number of other users, what is popular or average based on other users, etc. For example, the ability of a user to indicate wanted or unwanted search results, view an indication of previously provided input for a given search result, undo or change the input for a given search result (whether in a given search or for a given search string or otherwise) provides the user control not available in known search engines. The user can choose between auto-correct inputs and direct a literal input by indicating to the embodiment that auto correction should be disabled for any given set of search terms. This will help the user input less common inputs that would by the design of the input device auto-correction feature be auto-corrected to another word or set of terms.

Figure 18A:
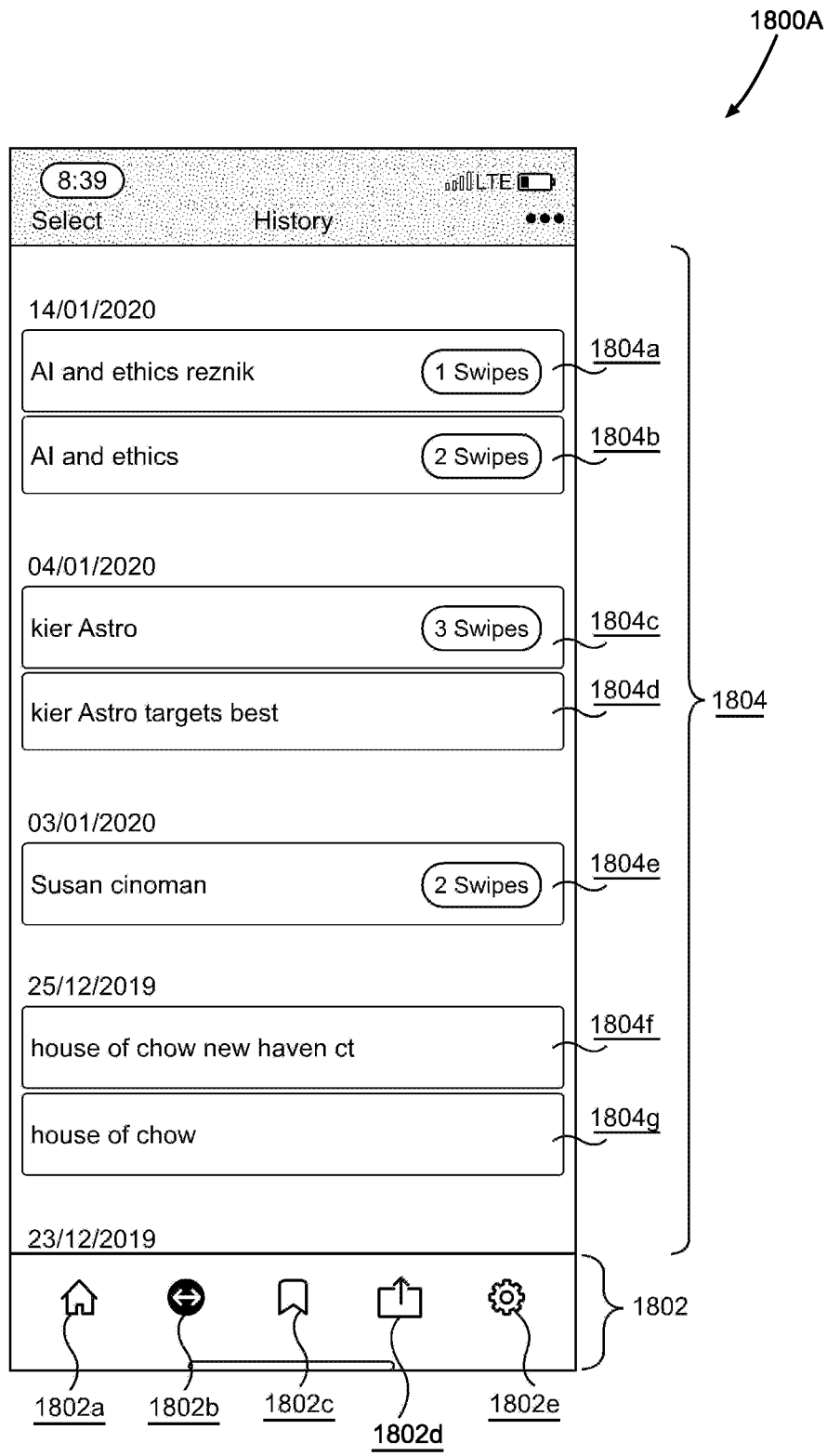
FIGS. 18A-18C each comprise successive example screens of an example GUI of an app that allows a user to view his search and/or swipe history, in accordance with some embodiments described herein.
Figure 18B:
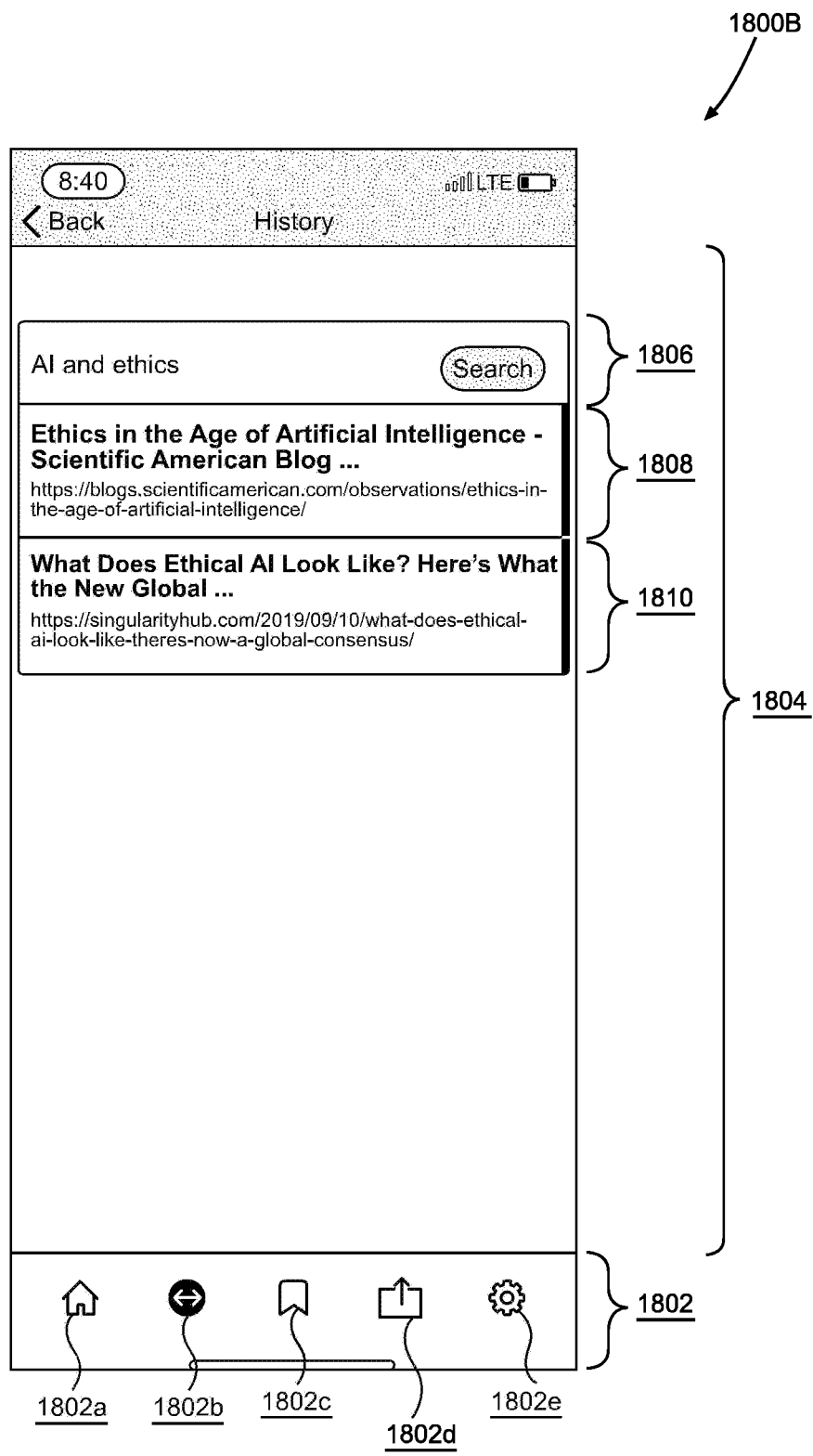
Figure 18C:
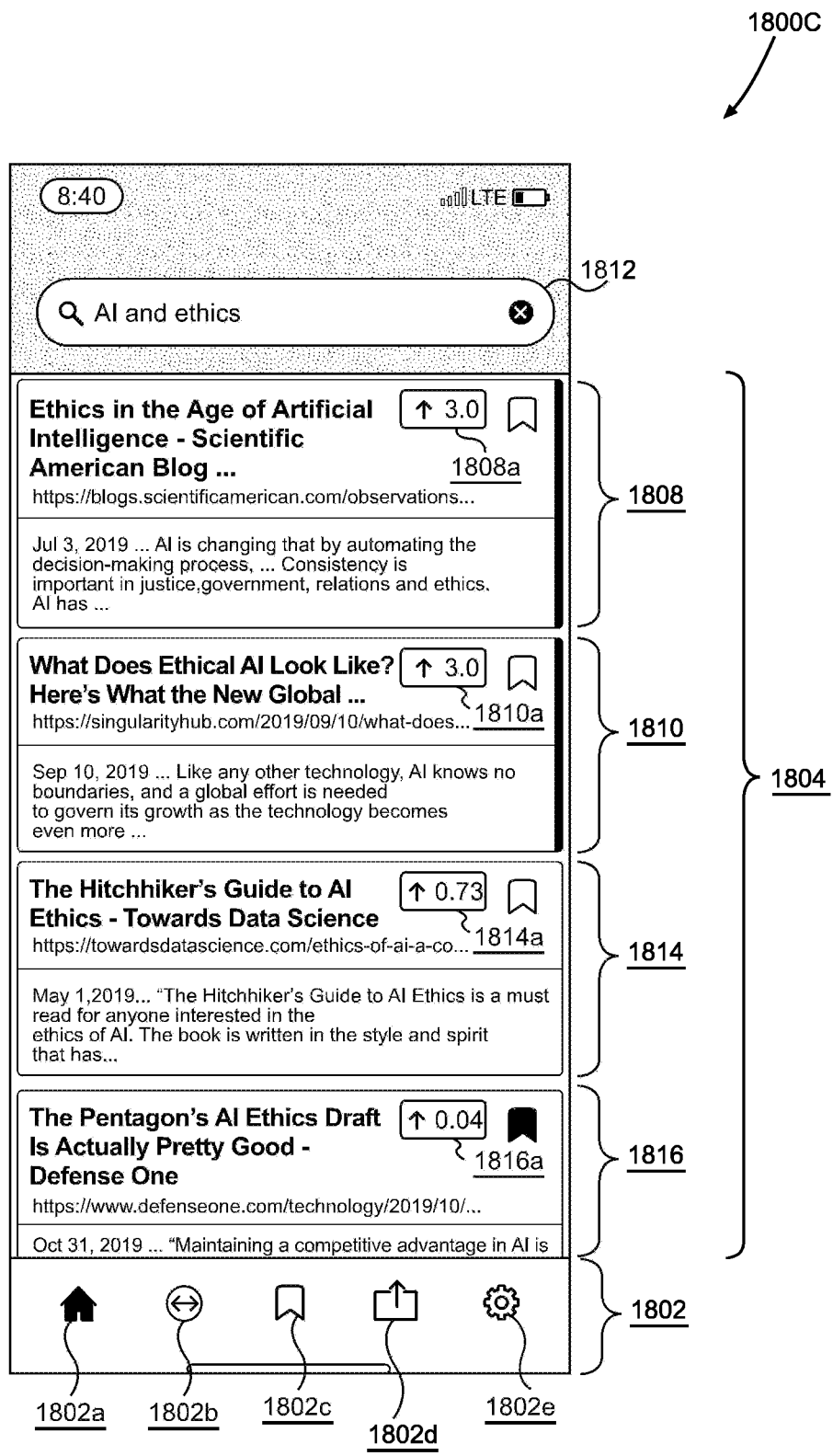

Turning now to FIGS. 18A-18C, illustrated therein are consecutive screens that may be output to a user of a search tool app, in accordance with some embodiments related to allowing a user to view and/or utilize his/her input history for past searches. It should be noted that, for any of the screens illustrated in FIGS. 18A-18C (or for other screens or GUIs described herein), it may be assumed that the user may be able to scroll down and view additional information that is not visible on the illustrated part of the screen. For purposes of simplicity, the user input format will be assumed to be a "swipe" such that the user can swipe (using a touch screen) a search result in a first direction (e.g., left) to indicate (s)he does not want the search result (sometimes referred to as a "negative swipe" herein) and swipe the search result in a second direction to indicate (s)he does want the search result (sometimes referred to as a positive swipe herein). Of course, other types of input or input mechanisms may be implemented without departing from the spirit and scope of the embodiments described herein. For example, a user may be allowed to check off or "cross out" unwanted search results.

Illustrated in FIG. 18A is an example screen 1800A that may be output to a user who indicates a desire to view his/her search and swipe history. In accordance with some embodiments, a search tool app as described herein may provide a user an ability to access different functions related to searching, such as the user's search and/or input (e.g., swipe) history for past searches. In the non-limiting and illustrative embodiment of FIG. 18A, the screen 1800A area 1802 includes various virtual buttons or selectable indicators via which the user may access certain screens or GUIs (collectively "page") of available features or function: (i) a selectable indicator 1802a for accessing a Home page that allows the user to access search functionality; (ii) a selectable indicator 1802b for accessing a History page that allows the user to view and access information related to prior searches he/she has done using the search tool; (iii) a selectable indicator 1802c for accessing a Bookmarks page that allows the user to view and access search results the user has previously bookmarked; (iv) a selectable indicator 1802d for accessing a Share page that allows the user to share searches or search results with other users (as described in more detail herein with respect to FIGS. 20A-20D); and (v) a selectable indicator 1802e for accessing a Settings page 1 that allows the user to select and/or modify various settings of the search tool app. In accordance with some embodiments, the page the user is currently viewing on his/her screen is indicated by the corresponding virtual button being shown in a manner that renders it distinct from the other virtual buttons. Thus, since in the example of FIG. 18A the example screen 1800A is illustrating a history of the user's prior searches, the selectable indicator 1802b for the History page is shown as darker than the other selectable indicators in area 1802.

In accordance with some embodiments, the system may be operable to store a history of a given user's inputs for a given search and/or for a given search result. For example, the system may store a record in a database for a given search string or search term(s) input by the user, and some indication of the input history (e.g., "swipe" history) for the search results that were output to the user as a result of the search string or search terms. In some embodiments, the input history may be made available to the user such that the user may review the input (s)he previously provided for a given search result (e.g., in the context of a given search that was conducted responsive to a specific search string) and/or the relative value assigned to the search results of that search based on the user input. In some embodiments, the user may be allowed to modify the input (e.g., change a "swipe" to indicate that a particular search result is now a wanted search result rather than an unwanted search result). The "swipe" history may be considered a memory tool that helps refresh the user's recollection to what they were thinking the last time they made a search for similar information. Such an embodiment is envisioned as a time saver for users, helping to minimize time required in recalling or recreating details of user indicated analysis of prior search results. Some embodiments would allow the search to be reproduced and then modified, if desired by the user. Turning again to screen 1800A of FIG. 18A, area 1804 illustrates an example interface via which a list of the user's prior searches 1804a-1804g are output to the user. For each prior search 1804a-1804g, the date of the search and the search string utilized for the search are indicated. For example, prior search 1804a was performed on Jan. 14, 2020 and utilized the search string "AI and ethics reznik" while prior search 1804b, while also performed on Jan. 14, 2020, utilized the search string "AI and ethics."

The date of a prior search and search string utilized are just two non-limiting examples of the type of information about prior searches that may be output to a user. Additional examples of information about prior searches that may be output to a user when viewing his/her swipe or search result input history include: (i) a summary of input for the search (e.g., a number of swipes or a number of search results for which an input had been provided by the user; this type of information is include for each search 1804a-1804g in screen 1800A via an indication of the total number of swipes or the number of search results that the user had provided input for when first reviewing the search results of the corresponding search); and (ii) an indication of the type of input provided (e.g., positive swipes indicated in a first manner (e.g., with a striped side bar/marker) and negative swipes indicated in a second manner (e.g., with a solid side bar/marker; an example of which is illustrated in FIG. 18B).

In accordance with some embodiments, the app may be programmed to use the prior swipe history to sort the results and allow the user to use the app to change or add swipes to modify the search. FIG. 18B, for example, illustrates an example screen that may be output to the user who had viewed the history of search results in FIG. 18A and selected search 1804b. Once the user clicks on or otherwise selects the prior search 1804b, screen 1800B of FIG. 18B may be output to the user (it should be noted that since the user is still utilizing the History feature of the app, the selective indicator 1802b is still shown in a darkened manner). As had been indicated in area 1804 of screen 1800A, prior search 1804b is associated with 2 swipes (meaning the user had provided input for 2 search results when reviewing the search results output as a result of the search string "AI and ethics."). Thus, screen 1800B show "AI and ethics" in area 1806, indicating the search string of the prior search that the user is viewing information for. Additionally, screen 1800B shows to the user the two search results that the user had provided input for when previously reviewing the search results. The two search results 1808 and 1810 are shown with an indication of whether the user had provided a positive swipe/input or a negative swipe/input for each respective search result. In the illustrative example of FIG. 18B, a positive swipe is indicated with a solid thick border along the right side of a search result and it may be assumed that a negative swipe may be indicated with a different visual effect (e.g., a dotted or striped border on the right side) or be shown in a different area of the screen. For purposes of the example of FIG. 18B, it may be assumed that the user had previously input a positive swipe for each of the search results 1808 and 1810. The particular manner of indicating a positive input or swipe vs. a negative input or swipe is not limited and various methods of indicating to the user which search results (s)he had provided positive inputs for and which (s)he had provided negative inputs for without departing from the spirit and scope of the present invention.

In accordance with some embodiments, a user may desire to re-run or refresh a search utilizing the same search string and the same inputs (s)he had previously provided. Turning now to FIG. 18C, illustrated therein is an example screen 1800C that may be output to the user who had been viewing screen 1800B of FIG. 18B and selected the "search" button or selectable indicator in area 1806, thus providing a request to re-run a search using the search string "AI and ethics" (the search string that had been used in the prior search the user was reviewing) and the user inputs as indicated in area 1804 of the screen 1800B. In accordance with some embodiments, when the search is re-run using the search string and input(s) from the prior search, the resulting list of search results that is output may be output with an indication of a relative value of each search result, as determined by the system based on the user input provided in the prior search (or, in embodiments in which the user is allowed to modify the input(s) for the search results prior to re-running the search, as determined by the system based on the user's modified input(s)). Screen 1800C illustrates, in area 1804, the list of search results that a search engine or search tool has returned using (i) the search string indicated in area 1812 (which search string, in some embodiments, the user may be able to modify when re-running the prior search) and (ii) the user's input(s) as indicated in area 1804 of screen 1800B (or the input(s) as modified by the user). In the embodiment of FIG. 18C, the relative value assigned to each search result by the search tool is indicated as a numerical value and the higher the value the more relevant or desired the search result is to the user (as assessed by the system based on the user's input(s)). Thus, as illustrated in the example of FIG. 18C, the two search results 1808 and 1810 determined to be the most desirable to the user in accordance with the methodologies described herein (e.g., based on a process such as that described with respect to FIG. 16 or FIG. 17) have a numerical value of "3.0" (as indicated by indicator 1808a and 1810a, respectively). These are the same search results 1808 and 1810 output to the user in screen 1800B. Search result 1814 has a relatively lower desirability rating, as indicated by indicator 1814a and search result 1816 has the lowest desirability ranking, as indicated by indicator 1816a. It should be noted that, because the user has now requested a new search be performed, the search tool app is implementing a search routine and is in a search mode, thus the selectable indicator 1802a of area 1802 is indicated in a darkened form to indicate that the user is in a Home page of the app rather than a History page as in screen 1800B (FIG. 18B) or screen 1800A (FIG. 18A).

In accordance with some embodiments, a user may be allowed to bookmark a search result, such that the URL of the search results is stored for future access of the user. This feature may, in some embodiments, a functionality that is distinct from a historic swipe or search feature because a user may be allowed to bookmark a particular search result for future accessibility without it necessarily being associated with the search string or other indicator of the search that resulted in this search result being discovered by the user. As an example of one manner in which previously bookmarked search results may be indicated to a user, area 1804 of screen 1800C includes, for each respective search result, a ribbon icon on the right-hand side. A darkened or filled-in ribbon indicates, in accordance with one example implementation, that the corresponding search result has been bookmarked by the user such that it may be subsequently and easily found by the user. In the particular example of screen 1800C, search result 1816, even though it is ranked relatively low in the particular list of search results being shown, has an indication that it was bookmarked by the user (either in the current search or previously, when it appeared as a search result in a prior search).

Figure 19:
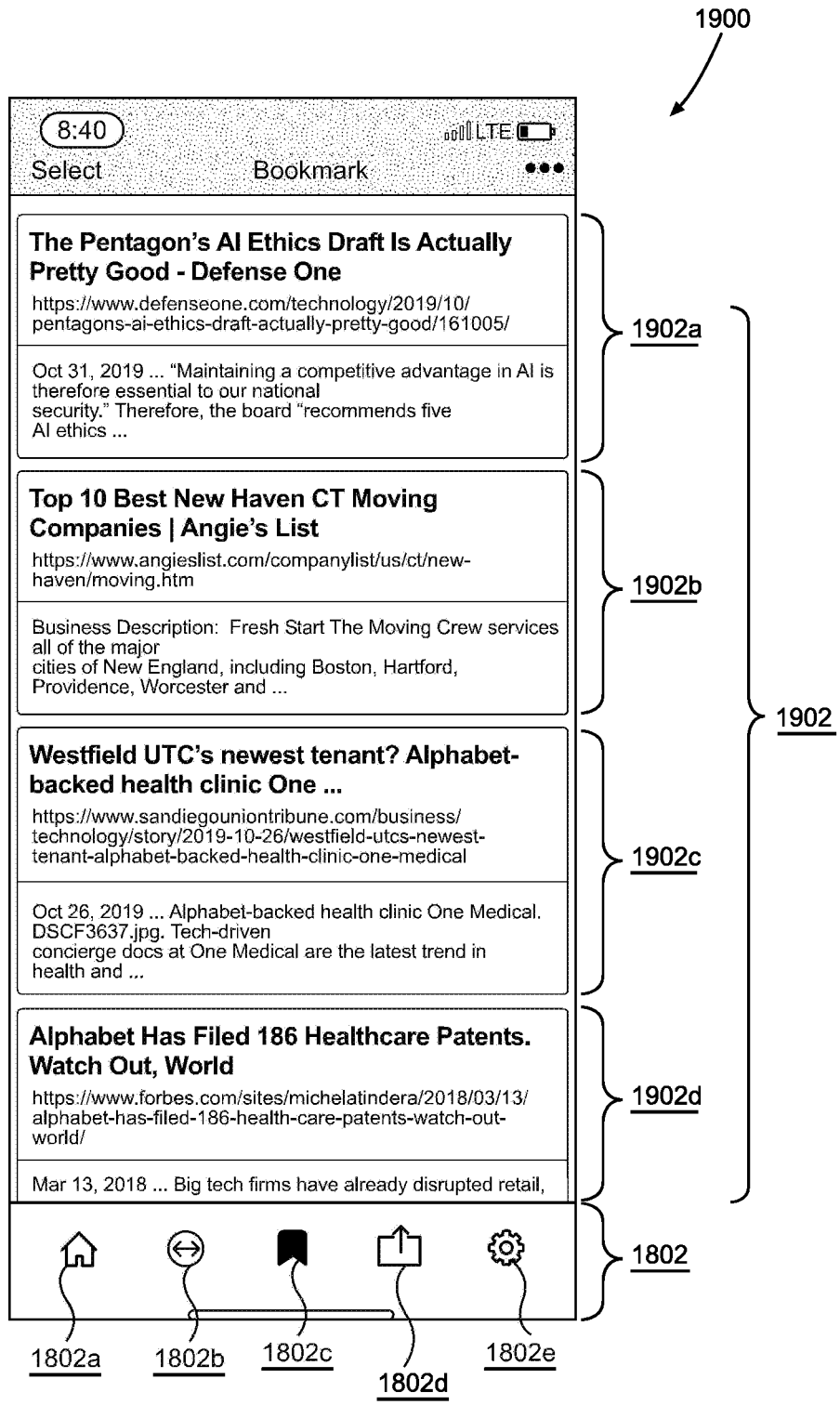
FIG. 19 comprises an example screen of an example GUI of an app that allows a user to view book marked search results, in accordance with some embodiments described herein.

Turning now to FIG. 19, illustrated therein is an example of a screen 1900 that may be output via a search tool app in accordance with some embodiments described herein in which the app may allow a user to bookmark one or more search results. As described elsewhere herein, in some embodiments a user may be allowed to bookmark individual search results in a bookmark interface or feature of the search tool app (area 1802 of screen 1900 indicates, via the darkened form of selectable indicator 1802c corresponding to the Bookmark page, that the user is now viewing the Bookmark page of the app). Area 1902 of screen 1900 lists various search results 1902a-1902d that have been bookmarked by the user. In some embodiments, bookmarks may be listed in a particular order (e.g., from most recently bookmarked to oldest, in alphabetical order, etc.) and/or may be sorted into categories (e.g., based on topic, type of search result, date range of when bookmarked, or into personalized categories created by the user, etc.).

Figure 20A:
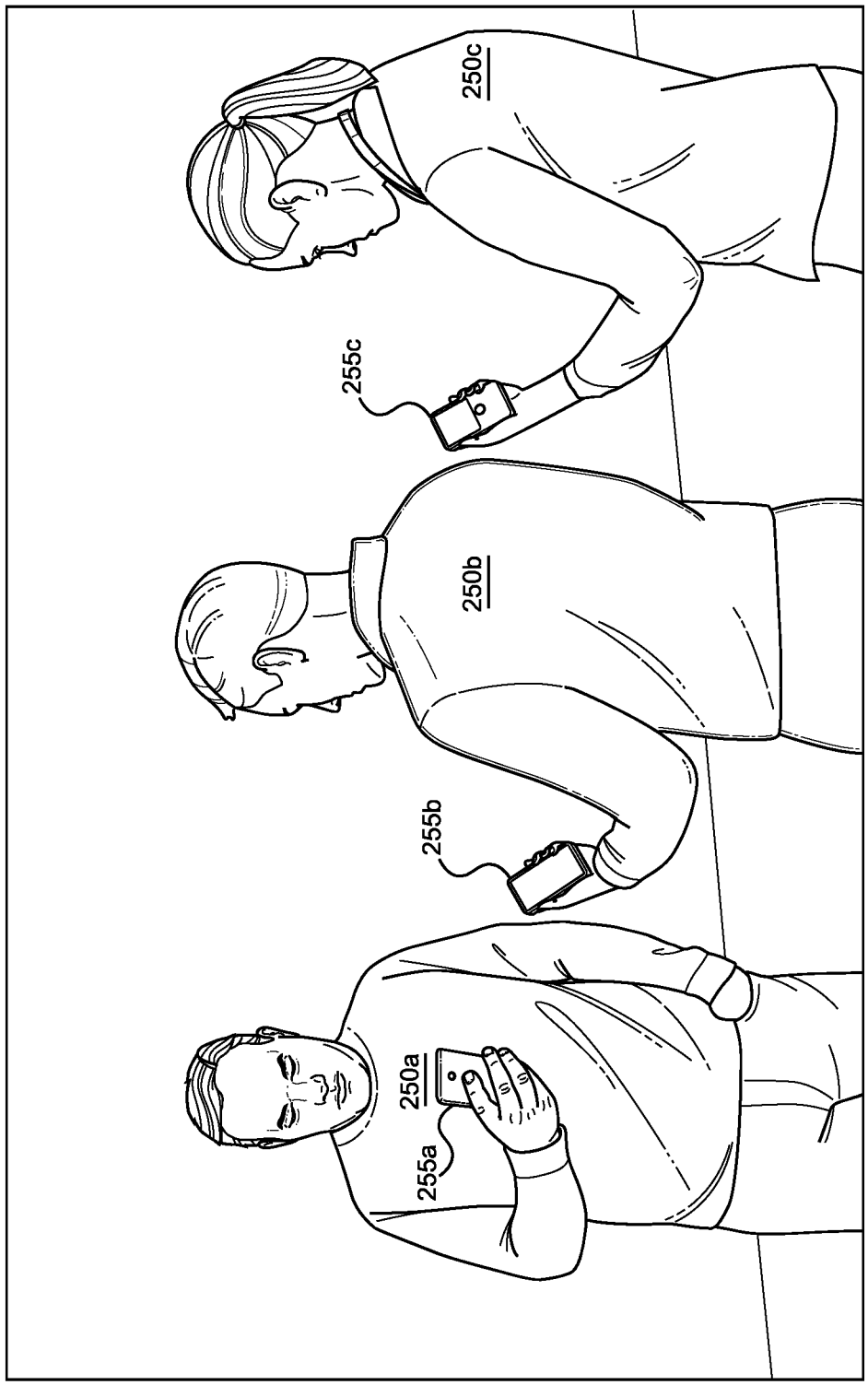
FIG. 20A comprises an illustration of a group of users using devices to view one or more interfaces of a search tool app, in accordance with some embodiments described herein.
Figure 20B:
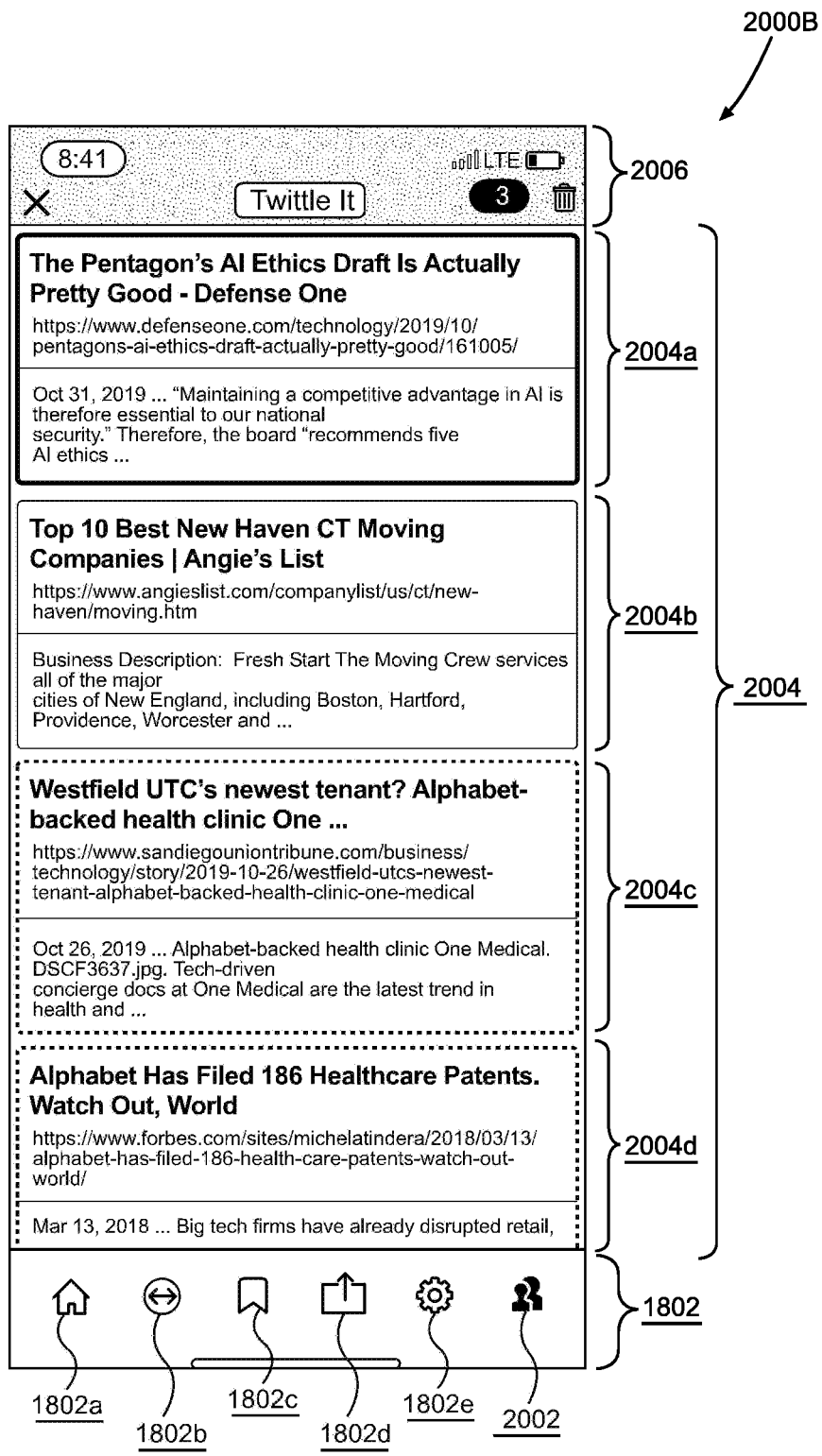
FIGS. 20B-20D comprise various example screens of example GUIs that may be output to one or more users of a group of users participating in a group search, in accordance with some embodiments described herein.
Figure 20C:
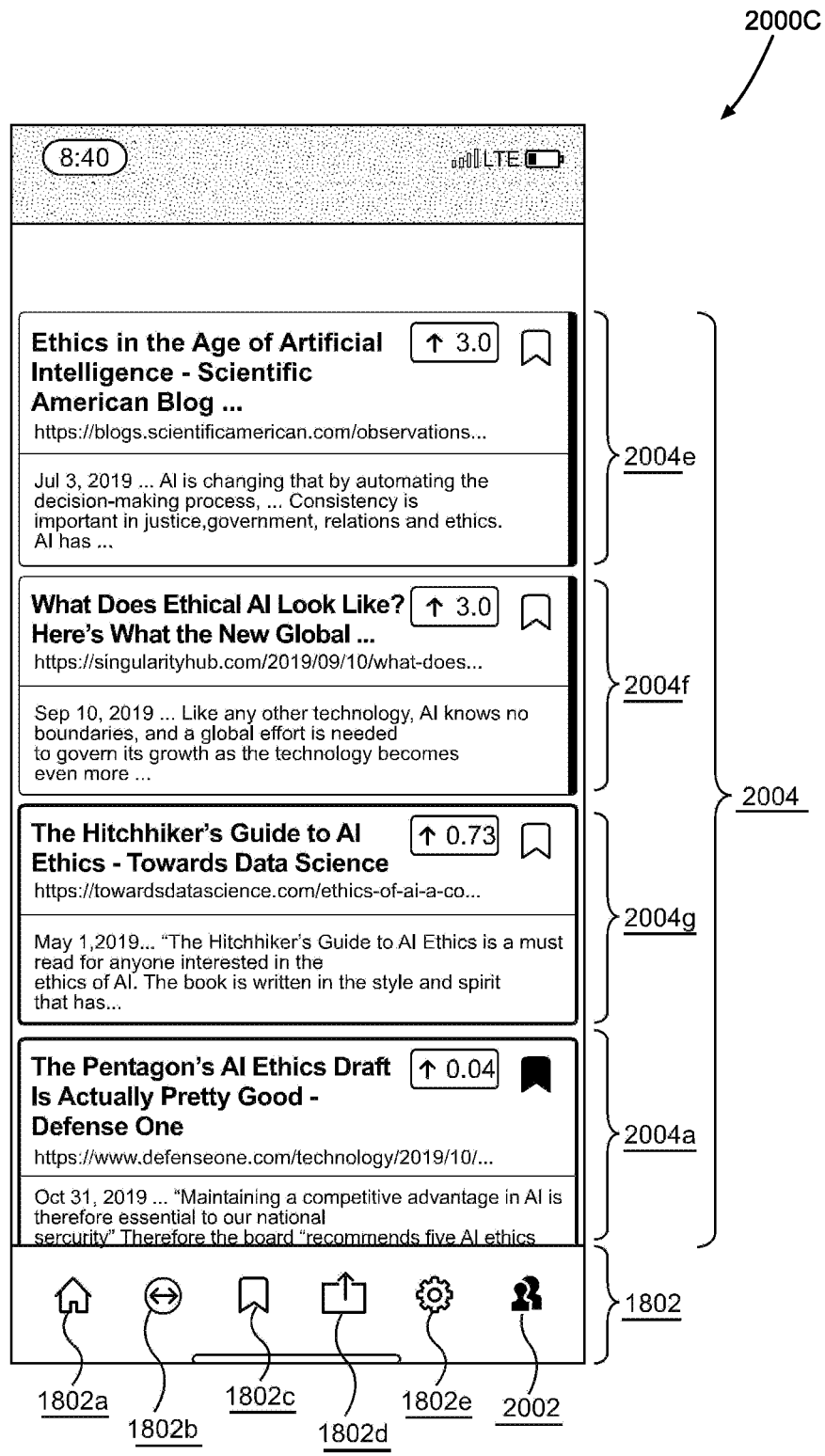
Figure 20D:
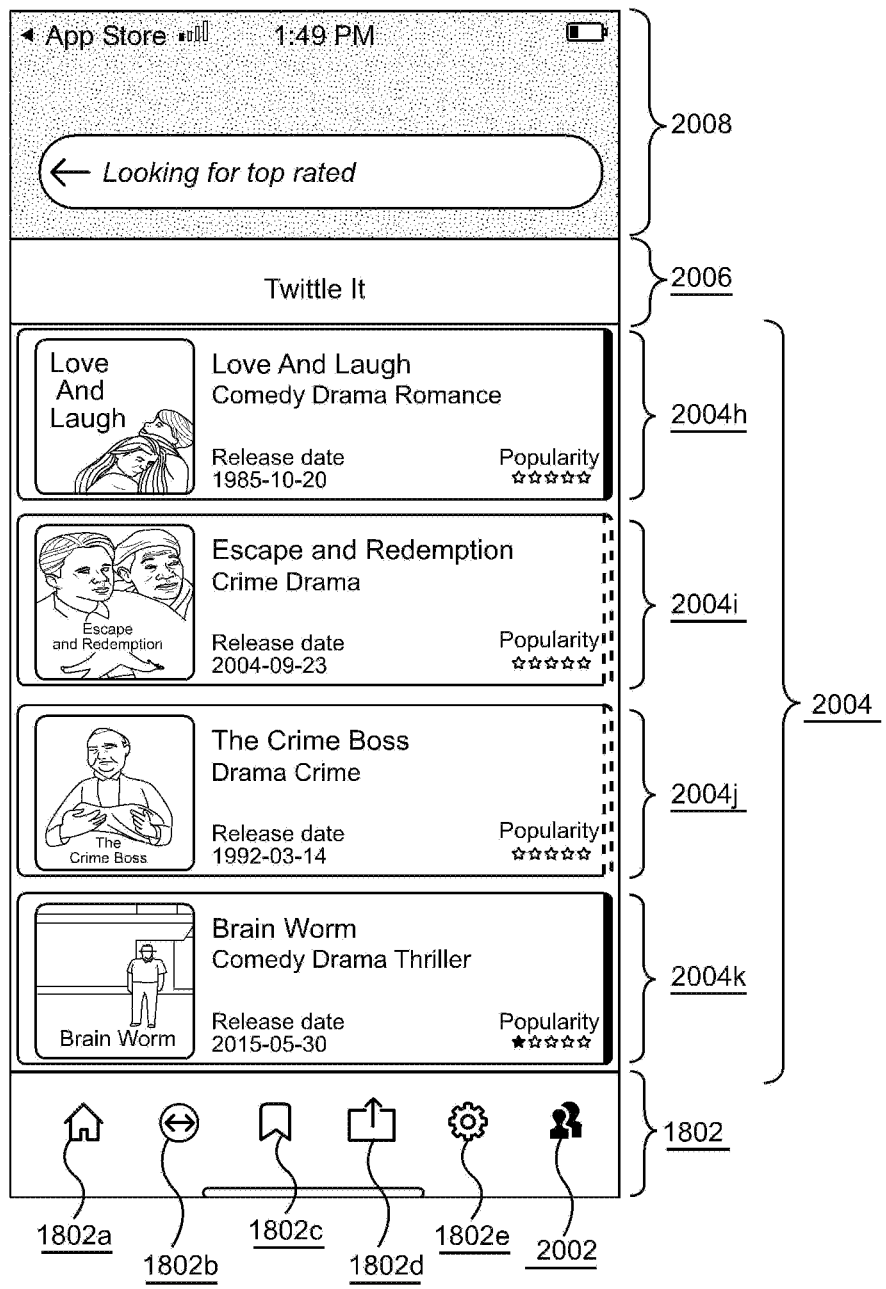

Turning now to FIGS. 20A-20D, illustrated therein are embodiments of a group search implementation of some embodiments described herein. A group search implementation may comprise a research group implementation (e.g., as described with reference to FIG. 6 herein) or a more casual or social group setting (e.g., a group of friends or family may utilize some group search features to decide on a movie, restaurant, travel destination, etc.). An example of an interface appropriate for a casual search such as selecting a movie is illustrated in FIG. 20D. In one embodiment, the search tool features described herein may be implemented in a group setting such that a plurality of users may utilize the search tool to re-sort, re-rank or otherwise modify a list of search results (e.g., have search results deleted from a list of search results), based on respective input(s) from a plurality of users (e.g., each of the users in the group). Such a group search tool feature may be useful in scenarios involving a group of users who are trying to find a commonly desirable search result or wanted subset of search results within a larger set of search results that may otherwise be too overwhelming to be meaningful.

For example, a group of users 250a-250c, such as illustrated in FIG. 20A, may each use a respective user device 255a-255c to participate in a group search. The respective user devices 255a-255c may comprise smart phones, tablets, or similar mobile devices. In some embodiments, one or more of the users in a group may participate in a group search via a user device that is not a mobile device (e.g., a desktop PC). The group of users may be using a search tool as described herein to find mutually agreeable search results in a long list of search results, such as when trying to decide on which restaurant to eat at or which movie to see. The users may find it difficult to identify the subset or restaurants or movies that may be considered acceptable or wanted by all (or a majority of) the users in the group. In one example embodiment, a group of users searching for a restaurant in a certain town or area that may be acceptable to all or most members of the group may have trouble deciding or figuring out which of the many restaurants in the area to go to. One of the users may thus initiate a search using a search tool such as described herein, for restaurants in the desired geographical area. It should be noted that although FIG. 20A illustrates the group of users who are participating in a group search as being within relatively close physical proximity to one another, such proximity is not required. It is anticipated that users participating in a group search may often not be within the same geographical location or within close physical proximity to one another (e.g., a group of friends trying to decide on a movie and using the group search feature of the search tool may be remote from each other at the time of the search).

Referring to FIG. 20B, illustrated therein is an example screen or interface 2000B which may be output to one or more users of a group of users who are utilizing the search tool to re-sort or re-rank a list of search results, or have search results deleted from a list of search results in order to shorten the list to mutually agreeable search results, based on respective input(s) from a plurality of users (e.g., each of the users in the group). Area 1802 of the screen 2000B is similar to area 1802 of FIGS. 18A-18C but includes an additional selectable indicator: selectable indicator 2002 for accessing a Group Search page that allows the user to view and access search results along with other users who are part of a group for the particular group search being performed. The selectable indicator 2002 is darkened in FIG. 20B, to indicate that the user is currently viewing a Group Search page of the app. Although not illustrated in FIG. 20B, in some embodiments a Group Search page may indicate additional information to the user regarding a group search, such as one or more of: (i) a number of users participating in the group search; (ii) user identifying information (e.g., user name, picture, e-mail, etc.) for each user participating in the group search; (iii) a group chat feature that allows the users to type in messages to one another while viewing the group search results and provided input therefore; (iv) an indication of which user of the group is the manager or administrator for the group search; and (v) an indication of the search string, category, filter or other mechanism or data utilized for identifying the list of search results being output to the group for consideration. being utilized for the search. With respect to item (iv) in the preceding list, it should be noted that in some embodiments one of the users may be the lead or managing user for the group search and may in that role view a different screen, such as a group search dashboard, and/or have access to different or additional functionality for managing the group search than do the other users of the group.

In accordance with some embodiments, each user of a group search may be presented with the same initial list of search results resulting from a search string or other search parameters selected by at least one member of the group. Each user of the group may then provide an input (e.g., swiping a given search result in a first direction to indicate it as a desired or wanted search result and swiping a given search result in a second direction to indicate it as an undesired or unwanted search result). In some embodiments, an indication of the inputs from each of the users may be output to all of the users in the group (e.g., the list of search results may be dynamically updated on each of the users' screens as inputs are received by the system or when a given users selects a refresh option on their screen). In other embodiments, only a subset of the group of users (e.g., the manager of the group) may have access to, or the ability to view, all of the other users' inputs.

In accordance with some embodiments, the screen 2000B indicates input from users participating in a group search as it may be presented to a user of the group (e.g., a user designated as a manager of the group search or to any of the users of the group). The inputs for individual search results are indicated as (i) a solid thick border around a search result that a user of the group has indicated as being undesirable or unwanted; and (ii) a hash-lined border around a search result that a user of the group has indicated as being desirable or wanted. In some embodiments, different visual indicators may be output to indicate how many users in a given group indicated a given search result as desirable or undesirable. For example, the app may output an indication of the number of users or a relative number of the users who have provided a particular input for a given search result (e.g., the border around a given search result indicated as undesirable by one or more users may become thicker or brighter in color as more users indicate that same search result as undesirable). It is anticipated that in some circumstances different users of a group may provide conflicting inputs for a given search result (e.g., a first user of the group may indicate a given search result as desirable while a second user of the group may indicate that same search result as undesirable). In some embodiments, such a search result that has received conflicting inputs from different users may be represented in a visually distinct manner that indicates to the user viewing the list of search results that conflicting inputs have been received for the search result (e.g., the search result may be output with a different border, in a different font, as brighter, in a different area of the screen, etc.). In the example of screen 2000B, it is indicated that (i) at least one user of the group has indicated search result 2004a as being undesirable, (ii) at least one user of the group has indicated each of search results 2004c and 2004d as being undesirable; and (iii) no input has been received for search result 2004b.

In accordance with some embodiments, one or more users (e.g., a managing user, in embodiments in which there is a managing user, or any of the users of the group in other embodiments) may request that the search results be re-sorted or re-ranked (or, in some embodiments, that the search be re-run) using the input from the users of the group. In the example of FIG. 20B, a user may request that the users' inputs as indicated in screen 2000B be utilized to re-sort or re-rank the list of search results such that search results the system determines to be desirable to all or most of the users in the group by selecting the "Twittle It" selectable indicator in area 2006 of the screen. The system may then analyze the users' inputs that have been received thus far and utilize one or more processes to re-sort the list of search results (e.g., using a process such as described with respect to FIG. 16 or FIG. 17, but utilizing inputs from multiple users rather than a single user).

Turning now to FIG. 20C, illustrated therein is a successive screen 2000C that may be output to the user once the "Twittle It" selectable indicator in area 2006 has been selected. The search results output in area 2004 of screen 2000C are output such that search results determined by the system to be desirable to the group of users are ranked higher and search results determined by the system to be undesirable to the group of users are ranked lower (as indicated by the numerical values shown for the respective search results 2004e, 2004f, 2004g and 2004a. The system may analyze the search results in the original list of search results that had been output to the users of the group in screen 2000B, take into account any negative or positive inputs for some of the search results, analyze remaining search results on the list that input has not been received for (e.g., using one of the processes described herein, such as that described with respect to FIG. 4, 5, 6, 16 or 17) and generate a re-ranked or re-sorted list of search results.

In one embodiment, the system may be programmed to place lower on the list, or assign a lower score or numerical value to, search results that have at least one characteristic in common with any search result for which a user of the group of users has provided a negative input (i.e., the user has indicated the search result as unwanted). Similarly, the system may be programmed to place higher on the list, or assign a higher score or numerical value to, search results that have at least one characteristic in common with any search result for which a user of the group of users has provided a positive input (i.e., the user has indicated the search result as wanted). In some embodiments, if more than one of the users provides a negative input for a first search result of the list of search results, the system may weight more heavily any impact on a score or numerical value of other search results that share a common characteristic with the first search result such that the resulting score ore numerical value of the other search results is lower than if only one of the users had provided the negative input on the first search result (this may be also be applied for positive inputs, such that any impact on a score or numerical value of additional search results is amplified if more than one user provides positive input for the first search result). The system may also, in some embodiments, be programmed to (i) identify any additional search results that do not have any characteristics in common with (or have fewer than a predetermined number of characteristics in common with)

search results that any users of the group provided a negative input for; and (ii) assign a higher score or numerical value to such additional search results.

In the example illustrated in FIG. 20C, it can be seen that search result 2004a (for which at least one user provided a negative input, as indicated by the solid line border around the search result in FIG. 20B), is now lower on the list of search results and some search results that were not previously at the top of the list when it was first output to the users in screen 2000B (such as search result 2004e) are now at the top of the list of search results such that the users in the group are more likely to become aware of them.

As described herein, a group search tool feature may be useful in scenarios involving a group of users who are trying to find a commonly desirable or wanted subset of search results within a larger set of search results that may otherwise be too overwhelming to be meaningful. For example, a group of users who are trying to decide on which restaurant to eat at or which movie to see may find it difficult to identify the subset or restaurants or movies that may be considered acceptable or wanted by all (or a majority of) the users in the group. In one example application of a group search, a group of users searching for a restaurant in a certain town or area that may be acceptable to all or most members of the group may have trouble deciding or figuring out which of the many restaurants in the area to go to. One of the users may thus initiate a search using a search tool such as described herein, for restaurants in the desired geographical area. A search tool app such as described herein may output an initial list of search results (in this case a list of restaurants) and the users may then each provide their input as to which restaurant they do not want to go to (e.g., by swiping away a few of the restaurants on the list that they definitely do not want to go to). The search tool algorithm may then utilize this input from each of the users to re-sort the list such that the swiped away restaurants (and other similar restaurants) are either removed or moved further down on the list, and such that other restaurants (e.g., restaurants which were further down on the initial list, which may not otherwise have been considered or noticed by the users due to their placement on the list) may rise to the top of the list and be considered as options that are likely to be acceptable to the group.

Another example of an example application of a social group search may be a family trying to decide which movie to rent for a family movie night. Likewise, for example, a group of professionals (e.g., teachers, engineers, scientists, etc.) who are working together on a search for a piece of technical data or scholarly material may utilize the group search tool to coordinate their efforts and utilize their collective knowledge to help focus in on the right search result(s). Each member of the team knows some specific knowledge about the problem at hand. Once the search is initiated, each team member can indicate which particular search results they think are of little value to the group by indicating them as unwanted and/or indicate which particular search results as useful by indicating them as wanted. The system may then re-sort the list of search results based on the collective input of all the users, with the modified list of search results providing at the top of the list the search results that might otherwise have been buried towards the bottom of the list or been unrecognized as particularly relevant by the group of users.

Accordingly, in one embodiment each user of a plurality of users may be provided with an initial list of search results that meet certain search criteria entered by the group or a representative of the group (e.g., a list of restaurants in a certain geographical area that have availability on a given date/time or a list of movies available for rental that are of a certain genre or otherwise within a certain category (e.g., new releases or most popular)). Screen 2000D of FIG. 20D comprises an example of a screen that may be output to one or more users of a group of users who are trying to decide on a movie to rent. Screen 2000D comprises an output of an initial list of search results that are movies in a particular category. The category (the search criteria) is indicated in area 2008 of the screen as "top rated" movies. The initial list of search results may be output on a single user device (e.g., a user device of one of the users in the group, who enters the search string for the search into the search tool) or via multiple user devices (e.g., user devices of more than one user of the group). For example, in one embodiment the same initial list of search results may be output to all users associated with the group via their individual user devices. In one embodiment, the first user who initiated the search may invite the other users in a group of users to view the initial list of search results and provide their input(s). The first user may so invite the other users via various mechanisms, such as by providing their e-mail addresses or search tool identifiers to the search tool app or forwarding a link to the search results to the other users. Although not illustrated in FIG. 20D, in some embodiments an interface such as illustrated in FIG. 20D may include an "invite" feature or mechanism via which a user may invite others to view the initial list of search results being output on a screen. For example, the interface may include an "invite" selectable mechanism which, when selected by the user, will cause a field or menu of options to be output to the user, via which the user may provide information identifying other users that the user would like to share the search results with (e.g., e-mail addresses or user names within the system).

Other users invited to view an initial list of search results by a first user may, in accordance with some embodiments, access the initial list of search results using a link to the initial list of search results that is generated by the system and provided by the first user or sent to the other users by the system on behalf of the user who initiated the search. In another embodiment, the other users may access the initial list of search results via the search tool app on their own mobile device after the first user provides their e-mail address or other identifier to the search tool, such that the search tool makes the initial list of search results available via the search tool app to the other users (e.g., the other users may receive a message or pop-up that informs them there is a list of search results waiting for them that another user has invited them to view and provide input for).

Each of the users (or at least a plurality of the users) of the group may then provide input regarding a subset of the search results of the initial list of search results. For example, a given user of the group of users may indicate a few of the search results that are not wanted or desired by that user (e.g., a given user of the group of users may swipe away some of the search results that are considered unwanted by that user). Area 2004 of FIG. 20B and area 2004 of FIG. 20D each indicate inputs received from users of a group. For example, in area 2004 of FIG. 20D, search results 2004h and 2004k are shown with a solid, thick bar on the right side to indicate that these search results have been indicated as unwanted by one or more users while search results 2004i and 2004j are shown with a hashed-line bar on the right side to indicate that these search results have been indicated as wanted by one or more users.

After receiving the inputs from the one or more users of a group, the system may utilize each of the inputs provided by respective users of the group of users to analyze the initial list of search results. Based on this analysis, the system may be operable to identify which search results should be placed lower on the list of search results or removed from the list of search results, thus generating a revised list of search results. In accordance with some embodiments, a goal of the system may be to find "common ground" or identify which of the search results on the initial list of search results may be wanted or desirable to all, or most, of the users of the group (meaning which search results of all the search results that were identified based on the original search, not just search results on this list for which an input was received from one or more users), based on inputs from the users of the group indicating some of the search results that are considered unwanted by one or more of the users. The revised list of search results may comprise the same search results as the initial list of search results but re-ordered or re-sorted in a different manner (e.g., with some of the search results that initially appeared towards the top of the list being re-ranked or downgraded to lower on the list and vice-versa) or may comprise a shorter list of search results, with a subset of the search results from the initial list having been removed. The system may utilize, for example, one or more of the processes described with respect to FIGS. 4, 5, 6, 16 and 17 herein to generate the revised list. Accordingly, search results of the initial list that were not reviewed by any of the users of the group or for which no input was received from any of the users of the group (e.g., because they were very low on the initial list such that they may have appeared on a subsequent page of the search result list and the users may not have scrolled down far enough to even consider them) may be re-ranked and brought higher up on the list even though none of the users of the group had previously considered them, and may now be more likely to see and consider them.

In one embodiment, in order to identify which search results may be acceptable to all or most of the users of the group (based on the input such as swipes indicating unwanted search results as provided to the system by the individual users of the group), the system may be operable to use an AI algorithm to identify one or more characteristics that are not shared by any of the search results that any of the users of the group indicated as undesirable, and then raise these search results towards the top of the list of search results. Alternately, the AI algorithm may remove or downgrade in ranking not only all of the search results any of the users of the group indicated were undesirable but also any additional search results (the additional search results being search results from the initial list of search results for which no input was received from any of the users) that share at least one characteristic with one or more of the search results that one or more of the users indicated as undesirable.

Various mechanisms for identifying a common characteristic between a search result for which an input was received from one of the users of the group (e.g., a search result one of the users indicated as unwanted) and another search result for which no input was received from a user have been described in detail herein and will not be repeated for purposes of brevity. Such methodologies may likewise be utilized to identify similarities among search results identified as unwanted (e.g., swiped away) by different users of a given group of users in order to identify which additional search results should also be removed or ranked lower on the list of search results, thus allowing the group to more easily identify which search results that none of the users provided input for (e.g., search results that appeared lower on the list of initial search results or on a page of the search results the users have not yet reviewed) may be acceptable or wanted by the users. This is because once the unwanted or undesirable search results (as indicated by the individual users of the group) are removed or ranked lower on the list, other search results may move up towards the top of the list as a result of the reordering or resorting. For example, A Similarity Measuring Engine or other module that uses rare tokens, NLP methodologies or other AI word string analysis methods may be utilized to calculate similarities between search results that were indicated as unwanted by the various users of the group and/or calculate and compare similarity scores of each search result with the swiped results.

Also similarly to embodiments described for a single user search tool feature, in a group search embodiment the system may be operable to dynamically update or modify a score or rank for each search results on the initial list of search results as it receives input (e.g., swiping away) from each user of the group. As described herein, in accordance with some embodiments search results are output (and re-ordered, as appropriate based on updated scores) in an order based on the score associated with each search result (e.g., a search result corresponding to a higher score will appear closer to the top or beginning of a list of search results than a search result corresponding to a lower score). In accordance with some embodiments, search results are output (and re-ordered, as appropriate based on updated scores) in an order based on the score associated with each search result (e.g., a search result corresponding to a higher score will appear closer to the top or beginning of a list of search results than a search result corresponding to a lower score). In accordance with some embodiments, a list of search results may be modified or re-ordered as the scores for the search results are updated based on user input and/or inferences made by the system using NLP and user input or other methodologies described herein. In accordance with some embodiments, the values or rankings assigned may be static or dynamic pending on envisioned embodiments. For example, a combination of inputs can be used to revalue prior values based on an improved NLP or machine-learned assessment of the prior values. This may cause a revision of rankings and/or the order or the output with the goal of improving the cognitive or perceived value of the results presented to the users of the group.

In some embodiments, as a first user of a group indicates that a particular search result is undesirable, that input causes the search result to be removed or re-ranked such that other users of the group that look at the list of search results after the first user has provided that input (e.g., swiped away the particular search result) may not see that particular search result (e.g., either because it is removed or because it is ranked so low on the list as to be unlikely to be reviewed or noticed by the other users). In other embodiments, while the system collects inputs from the various users as to which search results are unwanted, it may not modify the list by resorting the list of search results in accordance with modified rankings for each search result based on the users' inputs until an "update" or "refresh" command is received from one of the users. In some embodiments any of the users may be able to provide the refresh command while in other embodiments only the first user who initiated the group search may be able to initiate the search command. In either case, if the resorted list is not provided until the refresh command is provided, a given search result may be visible in its original placement on the initial list even if one or more of the users has provided an input indicating it as unwanted. In accordance with some embodiments, search results are output (and re-ordered, as appropriate based on updated scores) in an order based on the score associated with each search result (e.g., a search result corresponding to a higher score will appear closer to the top or beginning of a list of search results than a search result corresponding to a lower score). In accordance with such embodiments, a combination of inputs from different users of the group can thus be used to determine a new ranking or score for a given search result, such that a search result that is indicated as unwanted by multiple users of the group may end up being ranked lower on the modified list of search results than a search result that was indicated as unwanted by just a single user of the group.

In some embodiments, the more users indicate that a given search results is unwanted (e.g., the more users of a given group swipe away the search result), the lower the resulting rank or score of that search result will be. In other embodiments, the number of users who indicated that a particular search result is unwanted may be irrelevant to determining the ranking or score of the search result.

In one embodiment, a first user of the group may initiate a search on his/her user device by inputting certain search terms and then review the resulting initial list of search results. The first user may then provide an input indicating a few (e.g., one to five) of the search results as unwanted or undesirable. The first user may then pass his user device around to other users of the group and each of those users in turn may provide their respective input indicating a few of the search results as undesirable. Alternately, the first user may share the initial list of search results (e.g., using a link or other mechanism of the search tool that allows the user to share with others a specific list of search results) with the other users of a group and each user of the group (including the first user) may then view the initial list of search results on his/her own user device and provide input indicating unwanted search results on his/her own user device.

In one embodiment, each user may be able to see which search results the other users of the group have indicated as unwanted. In other embodiments, each user may only see the initial list of search results and his/her own inputs but not the inputs of the other users of the group. In still other embodiments, each user may be able to toggle on/off an option as to whether he/she is able to see the inputs of the other users. In embodiments in which each user is able to see the input(s) of the other users of the group, the system may be operable to update in real time or semi-real time (e.g., with a few seconds delay) the initial list of search results to indicate the input(s) from the other users of the group (e.g., the system may show which search results the other users swiped away).

In some embodiments, a group search and/or input history (e.g., swipe history) of the individual users in the group may be stored for future access by one or more users of the group (e.g., similarly to how a search or swipe history may be stored and output to a single user, as described with reference to FIGS. 18A-18C). For example, one or more users of the group may desire to access the group search in the future to jar his/her memory as to what the preferences of individual users were for the search (e.g., Joe did not like Asian restaurants and Ann did not like Italian restaurants). For example, each user of the group of users (or, in other embodiments, the first user who initiated the group search) may have the group search or a link to the group search stored and accessible via the search tool app stored on his/her mobile device.

In one embodiment, a particular search (e.g., search string or search criteria used, initial list of search results and the user's indications of which search results on the initial list of search results are wanted or unwanted) may be saved in a search tool app such that the user can look back to prior searches and see their own input(s) (e.g., indications of which search results are unwanted), as provided to the search term on a prior date. The saved information for the search may comprise the search term(s) or search string used to initiate the search and the particular search results indicated as wanted or unwanted. The user would then have information about what they were thinking when reviewing the prior search and the particular results generated for that search. The modified list of search results (e.g., the resorted list or list with some search results removed, based on user input) may likewise be saved and accessible at a later date by the user.

In accordance with some embodiments, a user may access a prior search (which, as described above, may comprise the search string or other search criteria used to initiate the search, the initial list of search results, the input from the user indicating which particular search results are unwanted and/or which particular search results are wanted, and/or a modified list of search results that was generated based on the user's input(s) to the initial list of search results; collectively referred to as a "stored prior search"). In some embodiments, the user may then interact with the stored prior search and manipulate it by providing new inputs. For example, the user may be provided with an input mechanism for changing prior inputs (e.g., change an input previously provided for a particular search result that indicates that search result as unwanted to either not indicate it as either wanted or unwanted or to now indicate it as wanted). In another example, the user may modify one or more search terms used to initiate the search and have the search re-run using the modified search terms. There may be no limit to then number or types of modifications that can be tried, used or tested to modify or manipulate a stored prior search.

In another embodiment, the user can select a subset of search results from a search, for example result number 2, 5, 9, 24 and 28, and send it and/or share it, or the web site URLs, to another person or group using any number of methods used to digitally communicate such as e-mail, text or an app such as Slack™, WhatsApp™ and others. For example, an interface similar to that illustrated in FIG. 20B may be utilized, in which the user selects specific search results on the list and then shares them (e.g., using a "share" button such as selectable indicator 1802d of FIG. 20B.

Although various embodiments and search tool enhancement features have been described herein, additional features or modifications are also contemplated that would allow for such embodiments to be added to or overlaid onto currently available search features. For example, an app as described herein may further include a feature results sideways slide bar that allows a user to first narrow or filter search results (e.g., in a search for movies you get to click on top ten, new releases, most viewed, etc. or for restaurants you get some tops like top rated, near me, etc.) and then the user may be provided with the ability to swipe away or otherwise indicate unwanted search results. In another example, the search tool or app may enable e-mailing of top X (e.g., 5) results to allow for sharing/collaboration (e.g., by sending a link or other clickable link format).

Applicant has recognized various applications and environments in which one or more of the embodiments described herein may be implemented as a benefit to users. For example, the improved search methodologies described herein can be applied in a retail environment to help a user identify products available in a store (e.g., to identify products in a store's inventory that may be of interest to the user based on one or more search terms the user enters into a search tool affiliated with the store). For example, a database of products in inventory of a particular store location may be provided and a search app may allow a user to utilize a search engine or search tool implementing one or more of the search features to identify a product available at that store location (e.g., if a user wants to buy a TV at the store, he just types in TV (and some extra features if need be) then he is provided with a plurality of search results on the basis of the store inventory database; the user can swipe right and left narrowing down what he wants). Thus, in one embodiment an improved search engine may make easier the whole process of navigating through a store catalog with the use of an AI engine consistent with embodiments described herein. In one retail embodiment, search results may comprise products available for sale in a retail store (online or brick-and-mortar), where the underlying data comprises the available inventory (for online the data is a catalog of available items, for brick-and-mortar the data is available inventory currently in a particular store or nearby stores). A user can swipe-away unwanted products to more easily view relevant available products and be able to view his swipe history to undo/redo search results if he/she changes their mind.

In another example of yet another context or environment in which at least some of the embodiments described herein may be applied comprises the field of medical diagnosis. Medical diagnosis embodiment: instead of search results, the list of items the user swipes is a list of symptoms. Swiping away symptoms that the user does not have or indicating symptoms the user does have allows for a more accurate diagnosis of the user's potential medical condition and/or provide for a faster way for people to fill in a health history form. In one embodiment, the search tool could allow a user to drill down on symptom areas that are positive (relevant or true) and decrease the negative ones (ones that are not relevant or not true), thus emulating an MD, PA or nurse when taking a medical history. For example, the search tool may begin by providing to the user a broad list of symptoms or potential medical conditions and then narrow these using a system that creates progressive questioning (searched by using the swipes or input provided by the user). This may, in some embodiments, be facilitated by active real time processing or and refreshing of search results as the user provides inputs and updating the symptoms seen based on the prior inputs (e.g., "swipes").

A similar app feature may be provided to allow a user to select movies (e.g., movies available for purchase or rental), menu items available in a restaurant, a restaurant in a particular geographical area, hotel room inventory, etc. Additional examples of applications include, without limitation, x-rays of implants, phrases, quotes, stocks, video libraries, etc. With respect to the x-ray of implants embodiment, the swipe search feature may be used to identify implants on an x-ray, such as to narrow down what is there instead of guessing, thus allowing for an improved method of sorting x-ray images.

In accordance with some embodiments, a search tool or app may be built such that it can analyze or enhance the search experience across a plurality of different platforms, databases or domains. In such an embodiment, one of the first steps the search tool may undertake is to identify which domain or category type the search results or search string relates to (e.g., movies, restaurants, store product inventory, medical diagnosis, etc.). The search tool may then extract, identify or tag relevant features or characteristics based on the identified domain or category type. For example, if the domain is identified as movies, the relevant tags or features may be title, director, genre, cast members, etc. A Similarity Measuring Engine or other module of the search tool may then calculate the similarities between two documents (e.g., using rare tokens and NLP tools such as word mover distance algorithms). A Similarity Measuring Engine or other module may then be utilized to calculate similarities between search results and/or calculate and compare similarity scores of each search result with the swiped results. Of course it should be understood that some of the foregoing steps or modules may likewise be utilized in embodiments in which the search tool is dedicated to a single domain (e.g., just movies or just product inventory), in which case there would be no need to first identify the domain of the search.

In some embodiments, at least some of the functionality described herein may be applied in an environment other than a search of data conducted by a search engine. For example, at least some of the embodiments described herein may be applied to other lists of data elements in order to: (i) allowing a user to provide input indicating wanted and unwanted data elements in a list of data elements, wherein the user provides input for only a subset of data elements in the list; and (ii) analyze the entire list of data elements (i.e., both data elements that the user has provided input for and other data elements that the user has not provided input for) utilizing the user's input, along with a subroutine operable to find similarities between the data elements the user provided input for and other data elements in the list of data elements that the user did not provide input (e.g., a process similar to that described with respect to FIGS. 4, 5, 6, 16 and/or 17). For example, in one example application, an AI algorithm may be provided with instructions to generate song lyrics, poems, recipes, logos, images or other data elements and may output a list of resulting data elements to a user. The user may provide inputs indicating which data elements are wanted or desirable and which ones are not and then have the AI algorithm either re-sort the dataset based on the input and in accordance with embodiments described herein or generate a new set of data elements based on the input (e.g., after the AI algorithm utilizes the input to analyze the data elements that the user did not provide input for). Thus, the embodiments described herein may be utilized to train an AI algorithm or refine or improve the results of an AI algorithm without the user needing to review all of the initial data elements generated by the AI algorithm.

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or sub-component from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A non-transitory computer-readable medium comprising instructions for directing a processor to modify a sequence of a list of data elements output via a Graphical User Interface (GUI) of at least one electronic computing device, the instructions when executed by the processor causing the processor to perform a method of facilitating a group search, the method comprising:

generate, by the processor and based on information stored in a database accessible to the processor, a list of a plurality of data elements, the list being output to a plurality of users via the GUI and in a first sequence;

receiving, from a first user of the plurality of users and via an input mechanism of the GUI, a first input identifying a first data element of the plurality of data elements as being either wanted or unwanted;

receiving, from a second user of the plurality of users and via the input mechanism of the GUI, a second input identifying a second data element of the list of the plurality of data elements as being either wanted or unwanted; and automatically modifying the first sequence of the list, by the processor and dynamically based on at least the first input, the second input and data generated by the processor based on an analysis of the list and the first sequence in view of the first input and the second input and after the list has been output to the plurality of users, thereby generating a second sequence in which the plurality of data elements comprising the list are output to the plurality of users via the GUI by:

(i) identifying a first characteristic of the first data element;

(ii) identifying a second characteristic of the second data element;

(iii) analyzing a remainder of the plurality of data elements, the remainder comprising data elements of the plurality of data elements other than the first data element and the second data element and for which an input has not been received from any user of the plurality of users, to identify at least one third data element that would be wanted by both the first user and the second user, based on the first input, the second input, the first characteristic and the second characteristic; and (iv) re-sorting the list comprising the plurality of data elements into the second sequence based on whether the additional data elements share the first characteristic with the first data element and share the second characteristic with the second data element, thereby generating a re-sorted list wherein the plurality of data elements are output in the second sequence and wherein the at least one third data element is moved to a front of the second sequence; and (v) outputting, via the GUI, the re-sorted list to each of the plurality of users.

2. The non-transitory computer-readable medium of claim 1, wherein the list and the re-sorted list are output on respective user devices of the users.

3. The non-transitory computer-readable medium of claim 1, wherein each of the plurality of data elements are placed in the list based on a corresponding numerical value and wherein re-sorting the list of the plurality of data elements comprises generating a revised numerical value for each data element of the plurality of data elements by:

lowering the corresponding numerical value of any of the additional data elements that share the first characteristic with the first data element if the first input indicates the first data element is unwanted;

lowering the corresponding numerical value of any of the additional data elements that share the second characteristic with the second data element if the second input indicates the second data element is unwanted;

raising the corresponding numerical value of any of the additional data elements that share the first characteristic with the first data element if the first input indicates the first data element is wanted; and raising the corresponding numerical value of any of the additional data elements that share the second characteristic with the second data element if the second input indicates the second data element is wanted.

4. The non-transitory computer-readable medium of claim 3, wherein:

the corresponding numerical value of any additional data elements that share both the first characteristic and the second characteristic is additionally lowered if both the first input and the second input indicate both the first data element and the second element is unwanted; and the corresponding numerical value of any additional data elements that share both the first characteristic and the second characteristic is additionally raised if both the first input and the second input indicate both the first data element and the second element is wanted.

5. The non-transitory computer-readable medium of claim 3, wherein the method further comprises:

identifying any additional data elements that do not share the first characteristic if the first input indicates the first data element is unwanted; and raising the corresponding numerical value of such additional data elements.

6. The non-transitory computer-readable medium of claim 1, wherein:

one of the users of the plurality of users is designated as a manager of the group search; and wherein the re-sorting of the list is performed in response to a request from the manager of the group search.

7. The non-transitory computer-readable medium of claim 6, wherein the method further comprises:

receiving from the manager of the search group a request to invite the additional users comprising the plurality of users to view the initial list of data elements; and outputting to the additional users the initial list as a result of the request.

8. The non-transitory computer-readable medium of claim 1, wherein the method further comprises:

outputting to each user of the plurality of users an indication of the first input and the second input.

9. The non-transitory computer-readable medium of claim 1, wherein the first input indicates the first data element as unwanted by the first user and analyzing the remainder of the plurality of data elements comprises:

processing the remainder of the plurality of data elements using natural language processing to identify at least one word feature characteristic of each data element of the remainder, thereby generating word feature data;

storing in a database the word feature data, including (i) an indication of each processed data element, and (ii) at least one word feature corresponding to each such processed data element;

determining, based on the word feature data stored in the database, a first word feature corresponding to the first data element for which the first input had been received;

accessing the word feature data in the database to identify at least one data element of the remainder of the plurality of data elements that also corresponds to the first word feature, thereby identifying a third data element; and identifying the third data element, based on its correspondence to the first word feature and prior any user of the plurality of users providing an input corresponding to the third data element, as also being unwanted by the first user.

10. The non-transitory computer-readable medium of claim 9, wherein the natural language processing comprises utilization of a word-to-vector model.

11. The non-transitory computer-readable medium of claim 9, wherein the at least one word feature characteristic comprises an indication of at least one rare word included in a corresponding search result.

12. The non-transitory computer-readable medium of claim 1, wherein each of the data elements comprises a search result and the plurality of data elements comprises a list of search results resulting from a search performed in response to search parameters input by a user of the plurality of users.

13. The non-transitory computer-readable medium of claim 1, wherein the method further comprises:

providing, to at least one user of the plurality of users, historical information indicative of prior searches initiated by the at least one user.

14. The non-transitory computer-readable medium of claim 13, wherein the historical information includes, for a respective prior search, an indication of the search parameters utilized for the prior search.

15. The non-transitory computer-readable medium of claim 13, wherein the historical information further includes an indication of at least one input provided by at least one user for a given data element of a given prior search.

16. The non-transitory computer-readable medium of claim 15, wherein the method further comprises:

receiving from a user of the plurality of users a request to refresh a prior search; and cause the prior search to be re-run using the at least one input as a parameter.

17. The non-transitory computer-readable medium of claim 13, wherein the historical information includes, for a respective prior search, an indication of at least one input provided by the at least one user for a data element output as a result of the prior search.

18. The non-transitory computer-readable medium of claim 13, wherein the method further comprises:

receiving, from at least one user of the plurality of users, a request to bookmark one of the data elements of the plurality of data elements; and storing, in association with a profile of the at least one user, the requested data element in a list of bookmarked data elements associated with the at least one user.

19. A non-transitory computer-readable medium comprising instructions for directing a processor to modify an output of data elements output via a Graphical User Interface (GUI) of at least one electronic computing device, the instructions when executed by the processor causing the processor to perform a method of facilitating a refinement of a search, the method comprising:

receiving from a first user at least a first search parameter for a search being initiated by the fir user;

generating, by the processor based on information stored in a database accessible to the processor and responsive to the at least one initial search term, an initial list of search results for the search;

outputting, via the GUI, to the first user and a second user the initial list of search results;

obtaining, from the user and via an input mechanism of the GUI, at least one first input indicating that a first search result of the initial list of search results is not wanted by the user;

obtaining, from the second user and via a second input mechanism of the GUI, at least one second input indicating that a second search result of the initial list of search results is not wanted by the second user; and automatically modifying the initial list of search results, by the processor and dynamically based on at least the first input, the at least one second input and data generated by the processor based on an analysis of the initial list in view of the at least one first input and the at least one second input and after the initial list has been output to the first user and the second user, thereby generating a modified list of search results that is output to the first user and the second user via the GUI by:

(i) determining, by the processor and based on the at least one first input and the at least one second input, at least one common characteristic shared by the first search result and the second search result;

(ii) generating, by the processor and based on the at least one common characteristic, a modified search parameter that would, upon the search being rerun using the modified search parameter, result in a modified list of search results, the modified list of search results omitting the first search result, the second search result and at least one additional search result of the initial list of search results that also shares the at least one common characteristic but that has not yet been reviewed by the first user and the second user;

(iii) automatically generating on behalf of the first user and the second user and without additional input from the first user and the second user, using the modified search parameter, the modified list of search results as a replacement for the initial list of search results; and (iv) outputting, via the GUI, the modified list of search results to the first user and the second user, thereby replacing the initial list of search results output to the first user and the second user for the search.

20. The non-transitory computer-readable medium of claim 19, wherein the at least one first input and the at least one second input is a passive input from the first user, from which passive input an inference is made that the first search result and the second search result is not wanted by the first user.

21. The non-transitory computer-readable medium of claim 19, wherein the method further comprises:

obtaining, from the first user, at least one third input indicating that the second search result of the initial list of search results is wanted by the first user, the third input thus changing the second input for the second search result; and wherein the modified search parameter comprises generating the modified search parameter based at least on the first user's input for the second search result having been changed from the second input to the third input.

* * * * *